(12) United States Patent
Si et al.

(10) Patent No.: US 11,070,412 B2
(45) Date of Patent: Jul. 20, 2021

(54) METHOD AND APPARATUS FOR SYNCHRONIZATION SIGNAL DESIGN

(71) Applicant: Samsung Electronics Co., Ltd., Suwon-si (KR)

(72) Inventors: Hongbo Si, Plano, TX (US); Young-Han Nam, Plano, TX (US); Eko Onggosanusi, Coppell, TX (US); Yuguang Gao, Ithaca, NY (US); Le Liu, Fremont, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/788,136

(22) Filed: Feb. 11, 2020

(65) Prior Publication Data

US 2020/0186404 A1 Jun. 11, 2020

Related U.S. Application Data

(63) Continuation of application No. 16/544,143, filed on Aug. 19, 2019, now Pat. No. 10,951,448, which is a continuation of application No. 15/796,558, filed on Oct. 27, 2017, now Pat. No. 10,389,567.

(Continued)

(51) Int. Cl.
*H04L 27/26* (2006.01)
*H04J 11/00* (2006.01)
*H04L 27/18* (2006.01)

(52) U.S. Cl.
CPC ...... *H04L 27/2613* (2013.01); *H04J 11/0073* (2013.01); *H04J 11/0076* (2013.01); *H04L 27/2675* (2013.01); *H04L 27/18* (2013.01)

(58) Field of Classification Search
CPC . H04L 27/2613; H04L 27/2675; H04L 27/18; H04J 11/0073; H04J 11/0076
See application file for complete search history.

(56) References Cited

U.S. PATENT DOCUMENTS 8,649,401 B2 2/2014 Luo et al.
9,480,006 B2 10/2016 Malladi et al.
(Continued)

FOREIGN PATENT DOCUMENTS

CN 103428846 A 12/2013
CN 103701733 A 4/2014
(Continued)

OTHER PUBLICATIONS

"3rd Generation Partnership Project; Technical Specification Group Access Network; LTE Advanced Inter-band Carrier Aggregation (CA) (3DL/3UL) (Release 13)," 3GPP TR 36.899-13, V13.0.0, Jan. 2016, 16 pages.

(Continued)

*Primary Examiner* — Natasha W Cosme

(57) ABSTRACT

A method of a base station (BS) for transmitting synchronization signals in a wireless communication system. The method comprises generating a primary synchronization signal (PSS) including one of multiple PSS sequences that is generated based on a M-sequence of length 127 in a frequency domain, wherein the PSS indicates part of cell identification (ID) information using a cyclic shift performed on the M-sequence generating the PSS; generating a secondary synchronization signal (SSS) including one of multiple SSS sequences that is generated based on multiple BPSK modulated M-sequences of length 127 in the frequency domain, wherein the SSS indicates the cell ID information using cyclic shifts performed on the M-sequences generating the SSS; and transmitting, to a user equipment (UE), the PSS and SSS over downlink channels.

20 Claims, 28 Drawing Sheets

Related U.S. Application Data

(60) Provisional application No. 62/417,069, filed on Nov. 3, 2016, provisional application No. 62/420,961, filed on Nov. 11, 2016, provisional application No. 62/428,633, filed on Dec. 1, 2016, provisional application No. 62/432,360, filed on Dec. 9, 2016, provisional application No. 62/450,756, filed on Jan. 26, 2017, provisional application No. 62/458,787, filed on Feb. 14, 2017, provisional application No. 62/463,295, filed on Feb. 24, 2017, provisional application No. 62/466,771, filed on Mar. 3, 2017, provisional application No. 62/482,423, filed on Apr. 6, 2017, provisional application No. 62/506,848, filed on May 16, 2017, provisional application No. 62/552,750, filed on Aug. 31, 2017.

(56) References Cited

U.S. PATENT DOCUMENTS

| | | | |
|---|---|---|---|
| 2009/0122839 A1* | 5/2009 | Luo | H04J 11/0069 375/145 |
| 2010/0261472 A1* | 10/2010 | Han | H04W 48/16 455/434 |
| 2010/0296429 A1 | 11/2010 | Han et al. | |
| 2015/0023448 A1 | 1/2015 | Han et al. | |
| 2015/0289216 A1 | 10/2015 | Xing et al. | |
| 2016/0218821 A1 | 7/2016 | Adhikary et al. | |
| 2016/0270015 A1 | 9/2016 | Lin et al. | |
| 2017/0078998 A1 | 3/2017 | Li | |

FOREIGN PATENT DOCUMENTS

| | | |
|---|---|---|
| WO | 2015168829 A1 | 11/2015 |
| WO | 2018164414 A1 | 9/2018 |

OTHER PUBLICATIONS

"3rd Generation Partnership Project; Technical Specification Group Radio Access Network; Evolved Universal Terrestrial Radio Access (E-UTRA); Physical Channels and Modulation (Release 13)," 3GPP TS 36.211, V13.2.0, Jun. 2016, 168 pages.

"3rd Generation Partnership Project; Technical Specification Group Radio Access Network; Evolved Universal Terrestrial Radio Access (E-UTRA); Multiplexing and Channel Coding (Release 13)," 3GPP TS 36.212, V13.2.0, Jun. 2016, 140 pages.

"3rd Generation Partnership Project; Technical Specification Group Radio Access Network; Evolved Universal Terrestrial Radio Access (E-UTRA); Physical Layer Procedures (Release 13)," 3GPP TS 36.213, V13.2.0, Jun. 2016, 6 pages.

"Foreword," 3GPP TS 36.213, Release 13, V13.2.0, Jun. 2016, pp. 7-44.

"Random Access Procedure," 3GPP TS 36.213, Release 13, V13. 2.0, Jun. 2016, pp. 45-254.

"Physical Uplink Control Channel Procedures," 3GPP TS 36.213, Release 13, V13.2.0, Jun. 2016, pp. 255-334.

"UE Procedures Related to Sidelink," 3GPP TS 36.213, Release 13, V13.2.0, Jun. 2016, pp. 335-370.

"Annex A (informative): Change history," 3GPP TS 36.213, Release 13, V13.2.0, Jun. 2016, pp. 371-381.

"3rd Generation Partnership Project; Technical Specification Group Radio Access Network; Evolved Universal Terrestrial Radio Access (E-UTRA); Medium Access Control (MAC) Protocol Specification (Release 13)," 3GPP TS 36.321, V13.2.0, Jun. 2016, 91 pages.

"3rd Generation Partnership Project; Technical Specification Group Radio Access Network; Evolved Universal Terrestrial Radio Access (E-UTRA); Radio Access Control (RRC) Protocol Specification (Release 13)," 3GPP TS 36.331, V13.2.0, Jun. 2016, 623 pages.

International Search Report regarding International Application No. PCT/KR2017/012410, dated Feb. 6, 2018, 4 pages.

Extended European Search Report regarding Application No. 17867466. 9, dated May 25, 2020, 7 pages.

Ericsson, "NR synchronization signal design", 3GPP TSG-RAN WG1 Meeting #89, R1-1708719, May 2017, 6 pages.

China National Intellectual Property Administration, First Office Action regarding Application No. 201780067767.8, dated Jun. 15, 2020, 29 pages.

Huawei et al., "Synchronization Signal Design in NR", 3GPP TSG RAN WG1 Meeting #86bis, R1-1608846, Oct. 2016, 6 pages.

\* cited by examiner

METHOD AND APPARATUS FOR SYNCHRONIZATION SIGNAL DESIGN

CROSS-REFERENCE TO RELATED APPLICATIONS

This application is a continuation of U.S. patent application Ser. No. 16/544,143, filed Aug. 19, 2019, which is a continuation of U.S. patent application Ser. No. 15/796,558, filed Oct. 27, 2017, now U.S. Pat. No. 10,389,567, which claims priority to U.S. Provisional Patent Application No. 62/417,069, filed Nov. 3, 2016; U.S. Provisional Patent Application No. 62/420,961, filed Nov. 11, 2016; U.S. Provisional Patent Application No. 62/428,633, filed Dec. 1, 2016; U.S. Provisional Patent Application No. 62/432,360, filed Dec. 9, 2016; U.S. Provisional Patent Application No. 62/450,756, filed Jan. 26, 2017; U.S. Provisional Patent Application No. 62/458,787, filed Feb. 14, 2017; U.S. Provisional Patent Application No. 62/463,295, filed Feb. 24, 2017; U.S. Provisional Patent Application No. 62/466,771, filed Mar. 3, 2017; U.S. Provisional Patent Application No. 62/482,423, filed Apr. 6, 2017; U.S. Provisional Patent Application No. 62/506,848, filed May 16, 2017; and U.S. Provisional Patent Application No. 62/552,750, filed Aug. 31, 2017. The content of the above-identified patent documents are incorporated herein by reference.

TECHNICAL FIELD

The present application relates generally to synchronization signal design. More specifically, this disclosure relates to NR-SS sequence design in an advanced wireless communication system.

BACKGROUND

In a wireless communication network, a network access and a radio resource management (RRM) are enabled by physical layer synchronization signals and higher (MAC) layer procedures. In particular, a UE attempts to detect the presence of synchronization signals along with at least one cell identification (ID) for initial access. Once the UE is in the network and associated with a serving cell, the UE monitors several neighboring cells by attempting to detect their synchronization signals and/or measuring the associated cell-specific reference signals (RSs). For next generation cellular systems such as third generation partnership—new radio access or interface (3GPP-NR), efficient and unified radio resource acquisition or tracking mechanism which works for various use cases such as enhanced mobile broadband (eMBB), ultra reliable low latency (URLLC), massive machine type communication (mMTC), each corresponding to a different coverage requirement and frequency bands with different propagation losses is desirable. Most likely designed with a different network and radio resource paradigm, seamless and low-latency RRM is also desirable.

SUMMARY

Embodiments of the present disclosure provide a synchronization signal design in an advanced wireless communication system.

In one embodiment, a base station (BS) for transmitting synchronization signals in a wireless communication system is provided. The BS comprises at least one processor configured to generate a primary synchronization signal (PSS) including one of multiple PSS sequences that is generated based on a M-sequence of length 127 in a frequency domain, wherein the PSS includes part of cell identification (ID) information using a cyclic shift performed on the M-sequence generating the PSS; and generate a secondary synchronization signal (SSS) including one of multiple SSS sequences that is generated based on multiple M-sequences of length 127 in the frequency domain, wherein the SSS includes the cell identification (ID) information using cyclic shift performed on the multiple M-sequence generating the SSS. The BS further comprises a transceiver configured to transmit, to a user equipment (UE), the PSS and the SSS over downlink channels.

In another embodiment, a method of a base station (BS) for transmitting synchronization signals in a wireless communication system is provided. The method comprises generating a primary synchronization signal (PSS) including one of multiple PSS sequences that is generated based on a M-sequence of length 127 in a frequency domain, wherein the PSS includes part of cell identification (ID) information using a cyclic shift performed on the M-sequence generating the PSS; generating a secondary synchronization signal (SSS) including one of multiple SSS sequences that is generated based on multiple M-sequences of length 127 in the frequency domain, wherein the SSS indicates the cell identification (ID) information using cyclic shifts performed on the multiple M-sequences generating the SSS; and transmitting, to a user equipment (UE), the PSS and SSS over downlink channels.

In yet another embodiment, a user equipment (UE) for transmitting synchronization signals in a wireless communication system is provided. The UE comprises a transceiver configured to receive and detect, from a base station (BS), a primary synchronization signal (PSS) and a secondary synchronization signal (SSS) over downlink channels. The UE further comprises at least one processor configured to determine the PSS including one of multiple PSS sequences that is generated based on a M-sequence of length 127 in a frequency domain, wherein the PSS includes part of cell identification (ID) information using a cyclic shift performed on the M-sequence generating the PSS; and determine the SSS including one of multiple SSS sequences that is generated based on multiple M-sequences of length-127 in the frequency domain, wherein the SSS indicates the cell identification (ID) information using cyclic shifts performed on the multiple M-sequences generating the SSS.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 28, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: 3GPP TS 36.211 v13.2.0, "E-UTRA, Physical channels and modulation;" 3GPP TS 36.212 v13.2.0, "E-UTRA, Multiplexing and Channel coding;" 3GPP TS 36.213 v13.2.0, "E-UTRA, Physical Layer Procedures;" 3GPP TS 36.321 v13.2.0, "E-UTRA, Medium Access Control (MAC) protocol specification;" and 3GPP TS 36.331 v13.2.0, "E-UTRA, Radio Resource Control (RRC) protocol specification."

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 1:
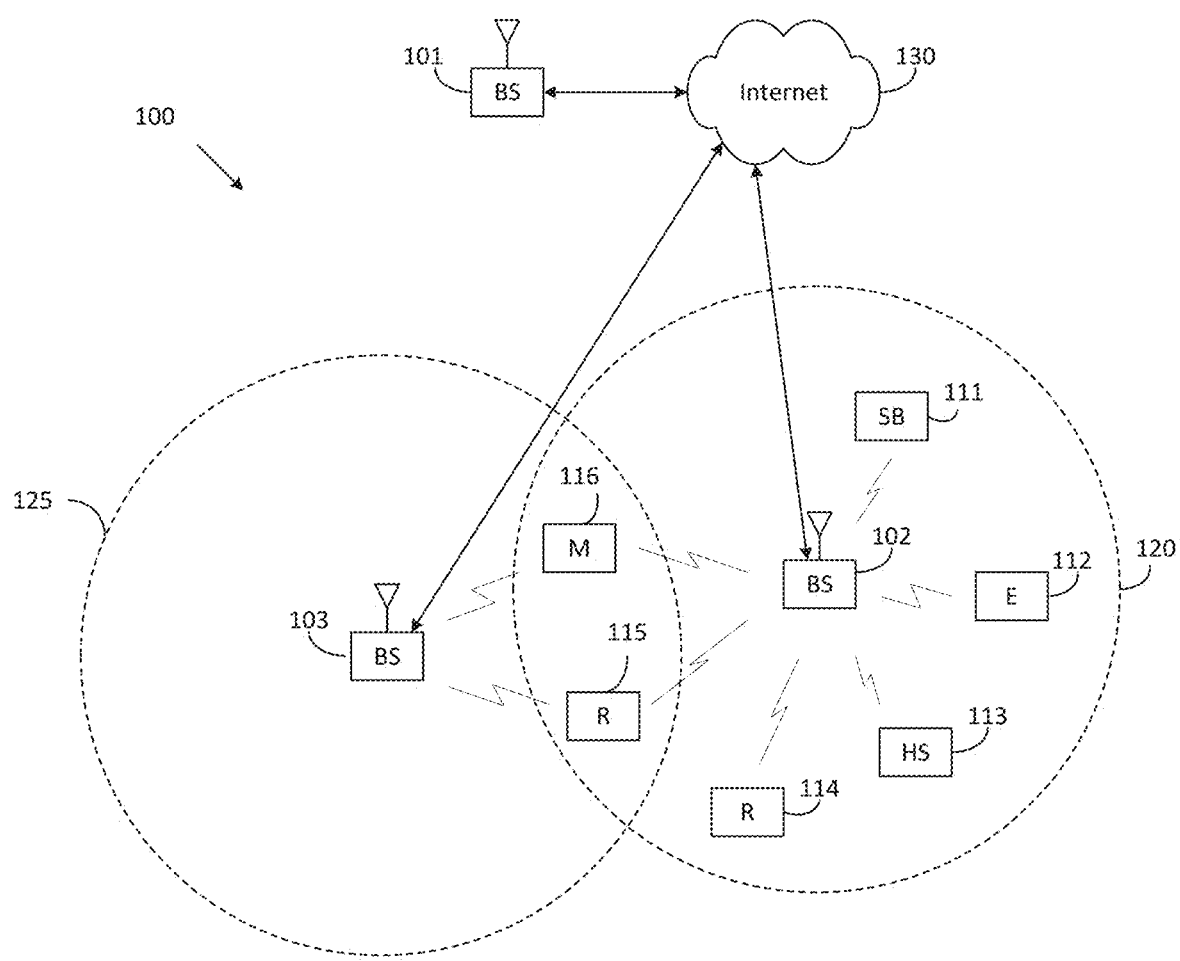
FIG. 1 illustrates an example wireless network according to embodiments of the present disclosure.
Figure 2:
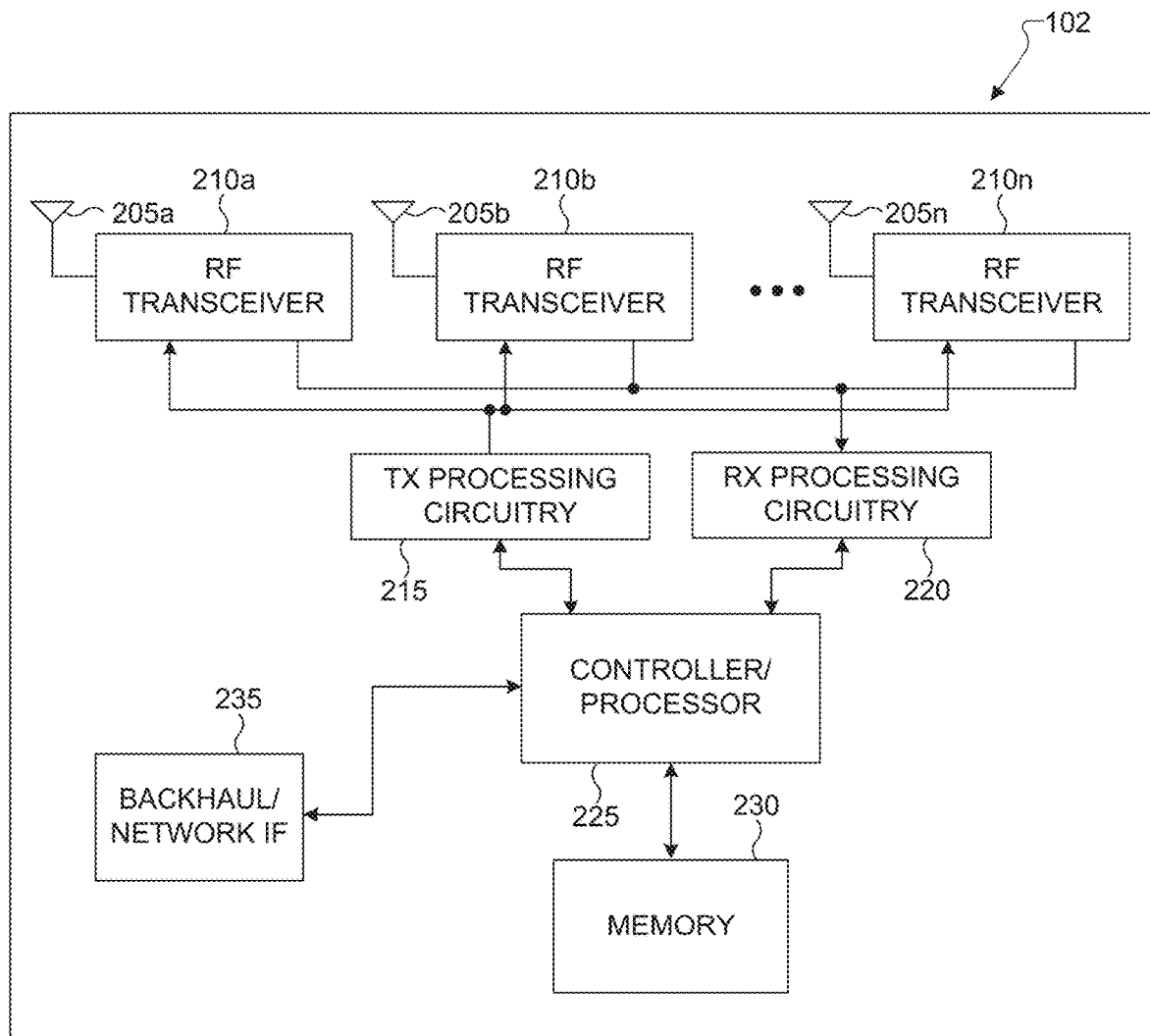
FIG. 2 illustrates an example eNB according to embodiments of the present disclosure.
Figure 3:
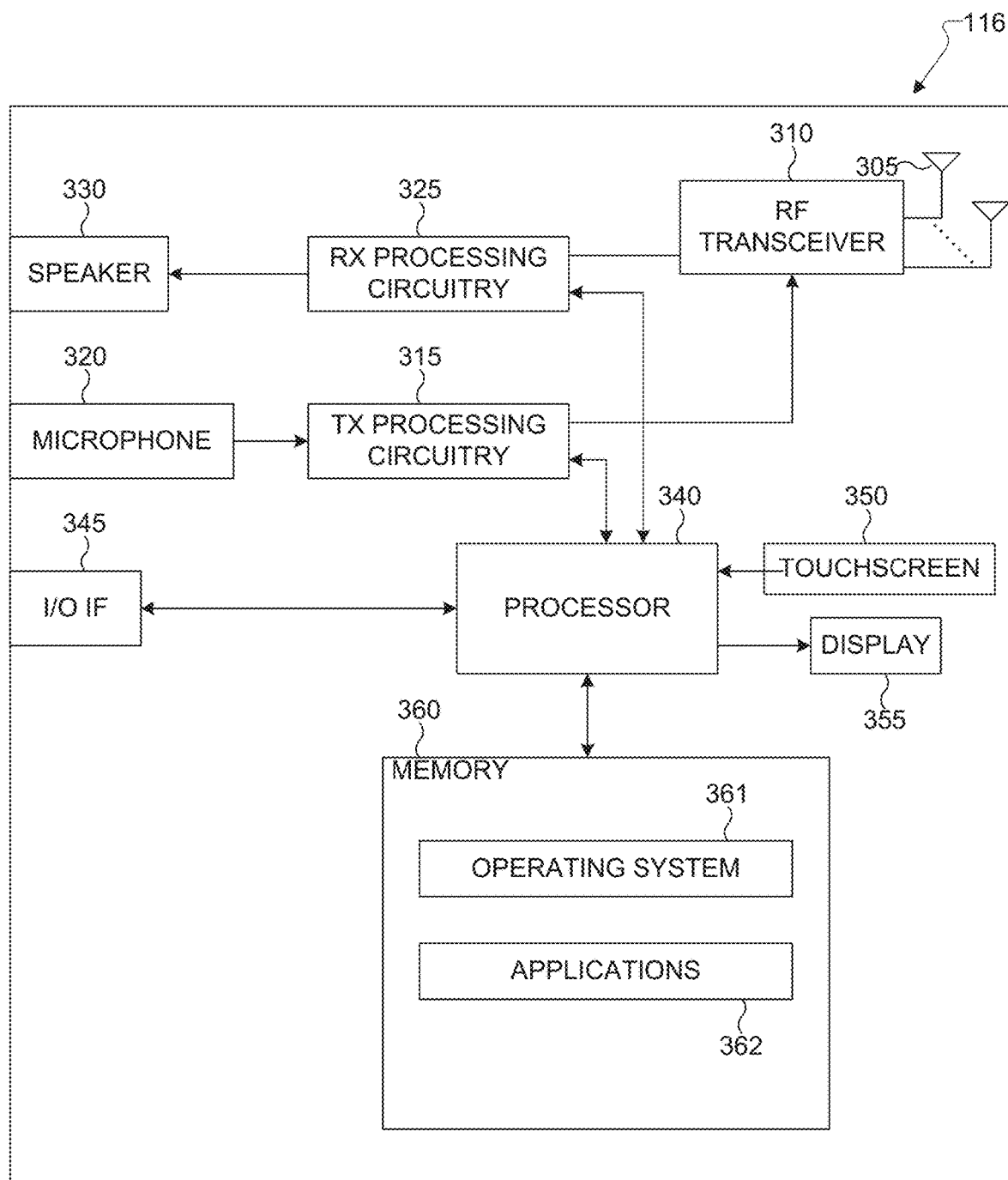
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes an eNB 101, an eNB 102, and an eNB 103. The eNB 101 communicates with the eNB 102 and the eNB 103. The eNB 101 also communicates with at least one network 130, such as the Internet, a proprietary Internet Protocol (IP) network, or other data network.

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of the UEs 111-116 include circuitry, programming, or a combination thereof, for efficient CSI reporting on PUCCH in an advanced wireless communication system. In certain embodiments, and one or more of the eNBs 101-103 includes circuitry, programming, or a combination thereof, for receiving efficient CSI reporting on PUCCH in an advanced wireless communication system.

Although FIG. 1 illustrates one example of a wireless network, various changes may be made to FIG. 1. For example, the wireless network could include any number of eNBs and any number of UEs in any suitable arrangement. Also, the eNB 101 could communicate directly with any number of UEs and provide those UEs with wireless broadband access to the network 130. Similarly, each eNB 102-

103 could communicate directly with the network 130 and provide UEs with direct wireless broadband access to the network 130. Further, the eNBs 101, 102, and/or 103 could provide access to other or additional external networks, such as external telephone networks or other types of data networks.

FIG. 2 illustrates an example eNB 102 according to embodiments of the present disclosure. The embodiment of the eNB 102 illustrated in FIG. 2 is for illustration only, and the eNBs 101 and 103 of FIG. 1 could have the same or similar configuration. However, eNBs come in a wide variety of configurations, and FIG. 2 does not limit the scope of this disclosure to any particular implementation of an eNB.

As shown in FIG. 2, the eNB 102 includes multiple antennas 205a-205n, multiple RF transceivers 210a-210n, transmit (TX) processing circuitry 215, and receive (RX) processing circuitry 220. The eNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

In some embodiments, the RF transceiver 210a-201n is capable of transmitting the PSS and SSS over downlink channels.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the eNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the eNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the eNB 102 to communicate with other devices or systems over a backhaul connection or over a network. The interface 235 could support communications over any suitable wired or wireless connection(s). For example, when the eNB 102 is implemented as part of a cellular communication system (such as one supporting 5G, LTE, or LTE-A), the interface 235 could allow the eNB 102 to communicate with other eNBs over a wired or wireless backhaul connection. When the eNB 102 is implemented as an access point, the interface 235 could allow the eNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

In some embodiments, the controller/processor 225 is capable of generating a primary synchronization signal (PSS) including one of multiple PSS sequences that is generated based on a binary phase shift keying (BPSK) modulated length-127 M-sequence in a frequency domain, wherein the PSS includes part of cell identification (ID) information.

In some embodiments, the controller/processor 225 is capable of generating a secondary synchronization signal (SSS) including one of multiple SSS sequences that is generated based on multiple BPSK modulated length-127 M-sequences in the frequency domain, wherein the SSS includes the cell identification (ID) information.

In some embodiments, the controller/processor 225 is capable of determining a number of PSS sequences corresponding to a number of cell ID hypotheses carried by PSS, respectively and a number of SSS sequences corresponding to the number of cell ID hypotheses carried by the PSS and SSS, respectively.

In some embodiments, the controller/processor 225 is capable of determining a polynomial for an M-sequence generating the PSS sequence and a cyclic shift for the M-sequence based on the cell ID information carried by PSS, and generating the PSS sequence by performing the cyclic shift to the M-sequence for a cell ID.

In some embodiments, the controller/processor 225 is capable of determining a polynomial for a first M-sequence generating the SSS sequence, a first cyclic shift for the first M-sequence based on the cell ID information carried by PSS and SSS, the polynomial for a second M-sequence generating the SSS sequence, a second cyclic shift for the second M-sequence based on the cell ID information carried by PSS and SSS, and generating the SSS sequence by performing a product of the first and second M-sequences, wherein each of the first and second M-sequences is generated by the first and second cyclic shifts, respectively, for the cell ID.

In such embodiments, the polynomial for the M-sequence is given by $x^7+x^4+1$ and a corresponding recursive construction scheme is given by $d_M(i+7)=[d_M(i+4)+d_M(i)] \mod 2$, $0 \leq i \leq 119$, the polynomial for the first M-sequence is given by $x^7+x^4+1$ and a corresponding recursive construction scheme is given by $d_M(i+7)=[d_M(i+4)+d_M(i)] \mod 2$, $0 \leq i \leq 119$, and the polynomial for the second M-sequence is given by $x^7+x+1$ and a corresponding recursive construction scheme is given by $d_M(i+7)=[d_M(i+1)+d_M(i)] \mod 2$, $0 \leq i \leq 119$.

The memory 230 is coupled to the controller/processor 225. Part of the memory 230 could include a RAM, and another part of the memory 230 could include a Flash memory or other ROM.

Although FIG. 2 illustrates one example of eNB 102, various changes may be made to FIG. 2. For example, the eNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the eNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

In some embodiments, the RF transceiver 310 is capable of receiving a primary synchronization signal (PSS) and a secondary synchronization signal (SSS) over downlink channels.

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for CSI reporting on PUCCH. The processor 340 can move data into or out of the memory 360 as required by an executing process. In some embodiments, the processor 340 is configured to execute the applications 362 based on the OS 361 or in response to signals received from eNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

In some embodiments, the processor 340 is capable of determining the PSS including one of multiple PSS sequences that is generated based on a binary phase shift keying (BPSK) modulated length-127 M-sequence in a frequency domain, wherein the PSS includes part of cell identification (ID) information and the SSS including one of multiple SSS sequences that is generated based on multiple BPSK modulated length-127 M-sequences in the frequency domain, wherein the SSS includes the cell identification (ID) information.

In some embodiments, the processor 340 is capable of determining a number of PSS sequences corresponding to a number of cell ID hypotheses carried by PSS, respectively; and a number of SSS sequences corresponding to the number of cell ID hypotheses carried by the PSS and SSS, respectively.

In some embodiments, the processor 340 is capable of determining a polynomial for an M-sequence generating the PSS sequence, a cyclic shift for the M-sequence based on the cell ID information carried by PSS, and generating the PSS sequence by performing the cyclic shift to the M-sequence for a cell ID.

In some embodiments, the processor 340 is capable of determining a polynomial for a first M-sequence generating the SSS sequence, a first cyclic shift for the first M-sequence based on the cell ID information carried by PSS and SSS, the polynomial for a second M-sequence generating the SSS sequence, a second cyclic shift for the second M-sequence based on the cell ID information carried by PSS and SSS, and generating the SSS sequence by performing a product of the first and second M-sequences, wherein each of the first and second M-sequences is generated by the first and second cyclic shifts, respectively, for the cell ID.

In such embodiments, the polynomial for the M-sequence is given by $x^7+x^4+1$ and a corresponding recursive construction scheme is given by $d_M(i+7)=[d_M(i+4)+d_M(i)] \mod 2$, $0 \leq i \leq 119$, the polynomial for the first M-sequence is given by $x^7+x^4+1$ and a corresponding recursive construction scheme is given by $d_M(i+7)=[d_M(i+4)+d_M(i)] \mod 2$, $0 \leq i \leq 119$, and the polynomial for the second M-sequence is given by $x^7+x+1$ and a corresponding recursive construction scheme is given by $d_M(i+7)=[d_M(i+1)+d_M(i)] \mod 2$, $0 \leq i \leq 119$.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs).

Also, while FIG. 3 illustrates the UE 116 configured as a mobile telephone or smartphone, UEs could be configured to operate as other types of mobile or stationary devices.

Figure 4A:
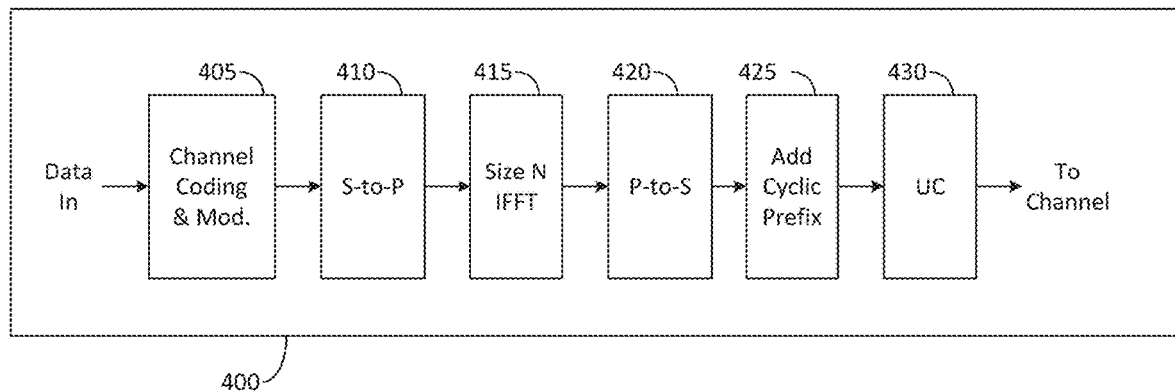
FIG. 4A illustrates a high-level diagram of an orthogonal frequency division multiple access transmit path according to embodiments of the present disclosure.
Figure 4B:
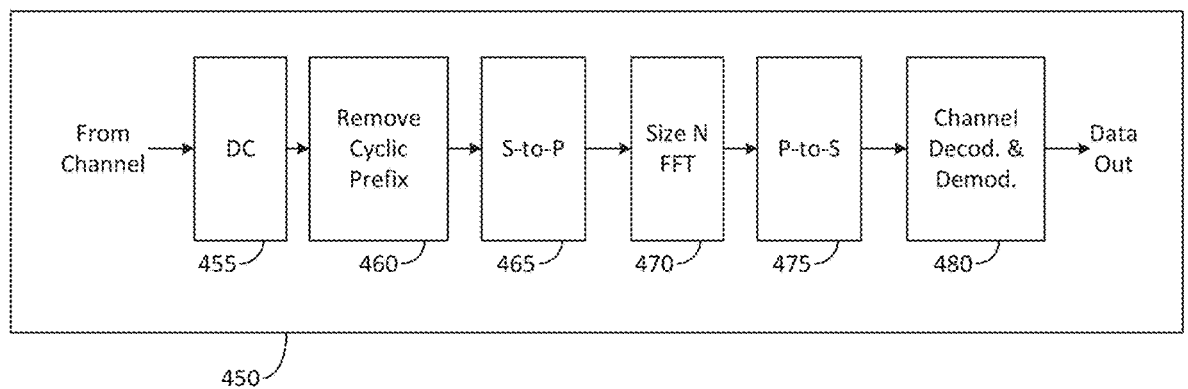
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (eNB) 102 or a relay station, and the receive path circuitry may be implemented in a user equipment (e.g. user equipment 116 of FIG. 1). In other examples, for uplink communication, the receive path circuitry 450 may be implemented in a base station (e.g. eNB 102 of FIG. 1) or a relay station, and the transmit path circuitry may be implemented in a user equipment (e.g. user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at UE 116 after passing through the wireless channel, and reverse operations to those at eNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of eNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to eNB s 101-103 and may implement a receive path corresponding to the architecture for receiving in the downlink from eNBs 101-103.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption should be minimized as possible.

A communication system includes a Downlink (DL) that conveys signals from transmission points such as Base Stations (BSs) or NodeBs to User Equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH).

An eNodeB transmits acknowledgement information in response to data transport block (TB) transmission from a UE in a physical hybrid ARQ indicator channel (PHICH). An eNodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when it conveys a master information block (MIB) or to a DL shared channel (DL-SCH) when it conveys a System Information Block (SIB). Most system information is included in different SIBs that are transmitted using DL-SCH. A presence of system information on a DL-SCH in a subframe can be indicated by a transmission of a corresponding PDCCH conveying a codeword with a cyclic redundancy check (CRC) scrambled with special system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $N_{sc}^{RB}$ sub-carriers, or resource elements (REs), such as 12 REs. A unit of one RB over one subframe is referred to as a PRB. A UE can be allocated $M_{PDSCH}$ RBs for a total of $M_{sc}^{PDSCH} = M_{PDSCH} \cdot N_{sc}^{RB}$ REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, it may multiplex both in a PUSCH. UCI includes Hybrid Automatic Repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH.

An UL subframe includes two slots. Each slot includes $N_{symb}^{UL}$ symbols for transmitting data information, UCI, DMRS, or SRS. A frequency resource unit of an UL system BW is a RB. A UE is allocated $N_{RB}$ RBs for a total of $N_{RB} \cdot N_{RB}$ REs for a transmission BW. For a PUCCH, $N_{RB}=1$. A last subframe symbol can be used to multiplex SRS transmissions from one or more UEs. A number of subframe symbols that are available for data/UCI/DMRS transmission is $N_{symb} = 2N_{symb}^{UL} - 1) - N_{SRS}$, where $N_{SRS}=1$ if a last subframe symbol is used to transmit SRS and $N_{SRS}=0$ otherwise.

Figure 5:
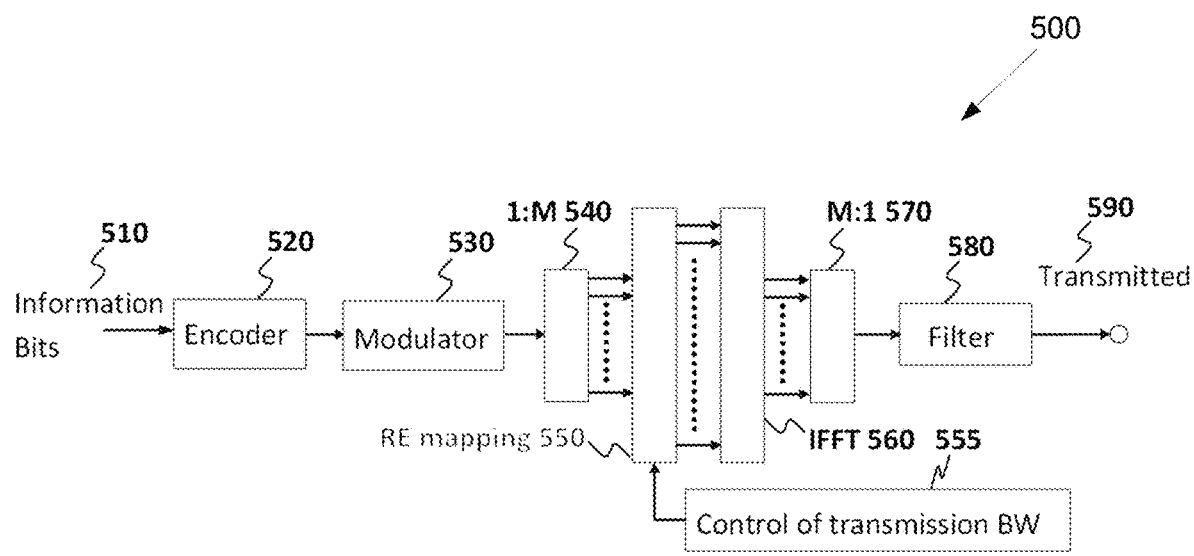
FIG. 5 illustrates a transmitter block diagram for a PDSCH in a subframe according to embodiments of the present disclosure.

FIG. 5 illustrates a transmitter block diagram 500 for a PDSCH in a subframe according to embodiments of the present disclosure. The embodiment of the transmitter block diagram 500 illustrated in FIG. 5 is for illustration only. FIG. 5 does not limit the scope of this disclosure to any particular implementation of the transmitter block diagram 500.

As shown in FIG. 5, information bits 510 are encoded by encoder 520, such as a turbo encoder, and modulated by modulator 530, for example using quadrature phase shift keying (QPSK) modulation. A serial to parallel (S/P) converter 540 generates M modulation symbols that are subsequently provided to a mapper 550 to be mapped to REs selected by a transmission BW selection unit 555 for an assigned PDSCH transmission BW, unit 560 applies an Inverse fast Fourier transform (IFFT), the output is then serialized by a parallel to serial (P/S) converter 570 to create a time domain signal, filtering is applied by filter 580, and a signal transmitted 590. Additional functionalities, such as data scrambling, cyclic prefix insertion, time windowing, interleaving, and others are well known in the art and are not shown for brevity.

Figure 6:
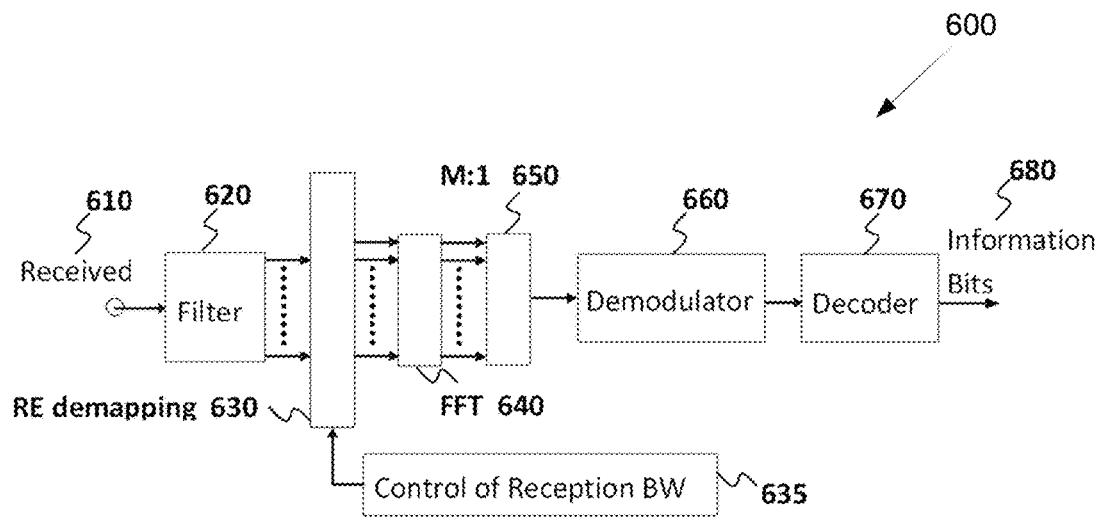
FIG. 6 illustrates a receiver block diagram for a PDSCH in a subframe according to embodiments of the present disclosure.

FIG. 6 illustrates a receiver block diagram 600 for a PDSCH in a subframe according to embodiments of the present disclosure. The embodiment of the diagram 600 illustrated in FIG. 6 is for illustration only. FIG. 6 does not limit the scope of this disclosure to any particular implementation of the diagram 600.

As shown in FIG. 6, a received signal 610 is filtered by filter 620, REs 630 for an assigned reception BW are selected by BW selector 635, unit 640 applies a fast Fourier transform (FFT), and an output is serialized by a parallel-to-serial converter 650. Subsequently, a demodulator 660 coherently demodulates data symbols by applying a channel estimate obtained from a DMRS or a CRS (not shown), and a decoder 670, such as a turbo decoder, decodes the demodulated data to provide an estimate of the information data bits 680. Additional functionalities such as time-windowing, cyclic prefix removal, de-scrambling, channel estimation, and de-interleaving are not shown for brevity.

Figure 7:
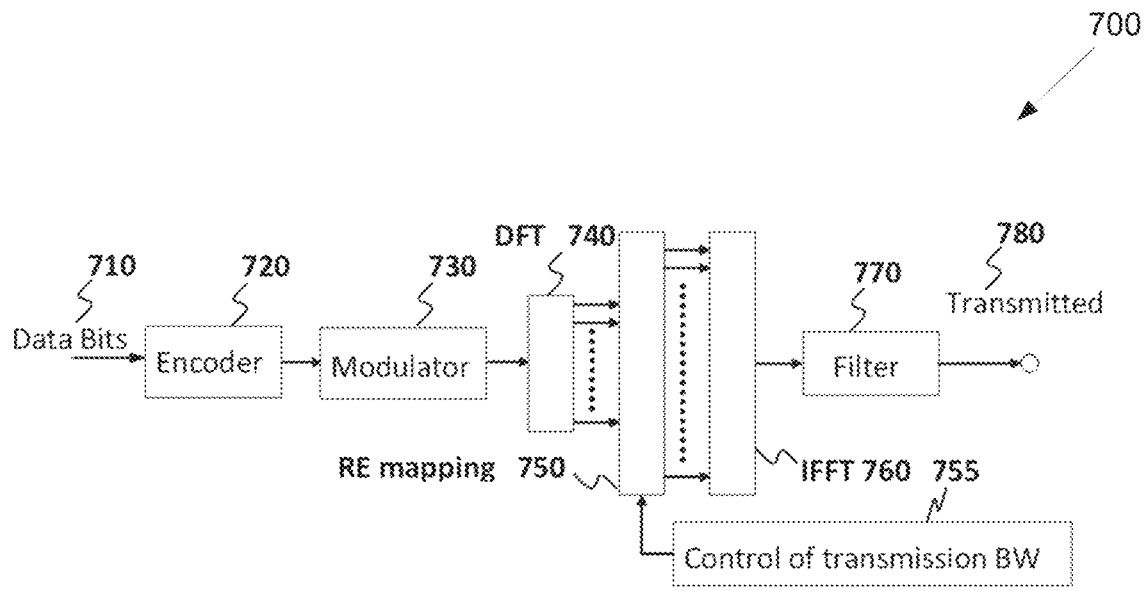
FIG. 7 illustrates a transmitter block diagram for a PUSCH in a subframe according to embodiments of the present disclosure.

FIG. 7 illustrates a transmitter block diagram 700 for a PUSCH in a subframe according to embodiments of the present disclosure. The embodiment of the block diagram 700 illustrated in FIG. 7 is for illustration only. FIG. 7 does not limit the scope of this disclosure to any particular implementation of the block diagram 700.

As shown in FIG. 7, information data bits 710 are encoded by encoder 720, such as a turbo encoder, and modulated by modulator 730. A discrete Fourier transform (DFT) unit 740 applies a DFT on the modulated data bits, REs 750 corresponding to an assigned PUSCH transmission BW are selected by transmission BW selection unit 755, unit 760 applies an IFFT and, after a cyclic prefix insertion (not shown), filtering is applied by filter 770 and a signal transmitted 780.

Figure 8:
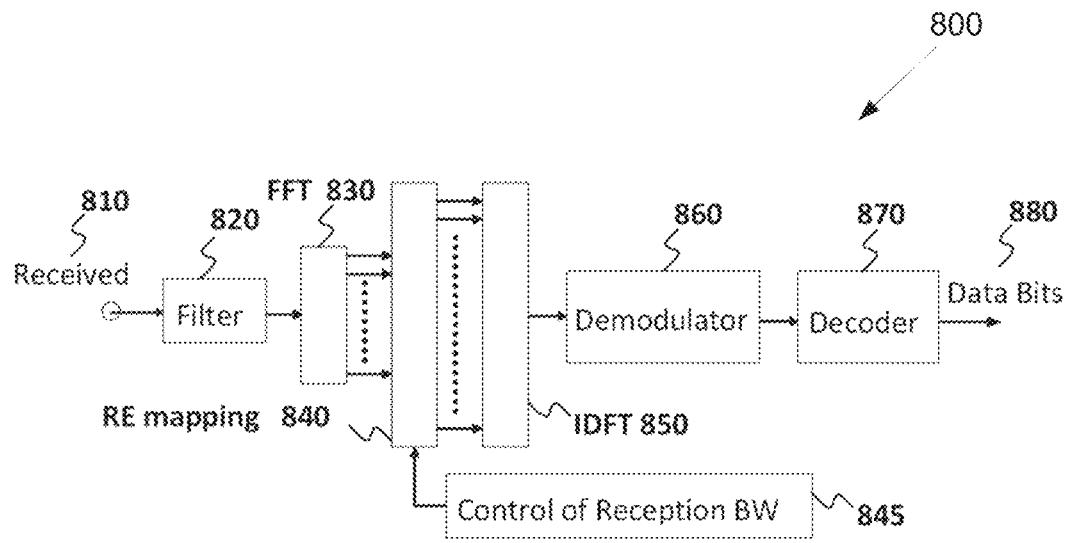
FIG. 8 illustrates a receiver block diagram for a PUSCH in a subframe according to embodiments of the present disclosure.

FIG. 8 illustrates a receiver block diagram 800 for a PUSCH in a subframe according to embodiments of the present disclosure. The embodiment of the block diagram 800 illustrated in FIG. 8 is for illustration only. FIG. 8 does not limit the scope of this disclosure to any particular implementation of the block diagram 800.

As shown in FIG. 8, a received signal 810 is filtered by filter 820. Subsequently, after a cyclic prefix is removed (not shown), unit 830 applies a FFT, REs 840 corresponding to an assigned PUSCH reception BW are selected by a reception BW selector 845, unit 850 applies an inverse DFT (IDFT), a demodulator 860 coherently demodulates data symbols by applying a channel estimate obtained from a DMRS (not shown), a decoder 870, such as a turbo decoder, decodes the demodulated data to provide an estimate of the information data bits 880.

In next generation cellular systems, various use cases are envisioned beyond the capabilities of LTE system. Termed 5G or the fifth generation cellular system, a system capable of operating at sub-6 GHz and above-6 GHz (for example, in mmWave regime) becomes one of the requirements. In 3GPP TR 22.891, 74 5G use cases has been identified and described; those use cases can be roughly categorized into three different groups. A first group is termed 'enhanced mobile broadband' (eMBB), targeted to high data rate services with less stringent latency and reliability requirements. A second group is termed "ultra-reliable and low latency (URLL)" targeted for applications with less stringent data rate requirements, but less tolerant to latency. A third group is termed "massive MTC (mMTC)" targeted for large number of low-power device connections such as 1 million per $km^2$ with less stringent the reliability, data rate, and latency requirements.

In order for the 5G network to support such diverse services with different quality of services (QoS), one method has been identified in LTE specification, called network slicing. To utilize PHY resources efficiently and multiplex various slices (with different resource allocation schemes, numerologies, and scheduling strategies) in DL-SCH, a flexible and self-contained frame or subframe design is utilized.

Figure 9:
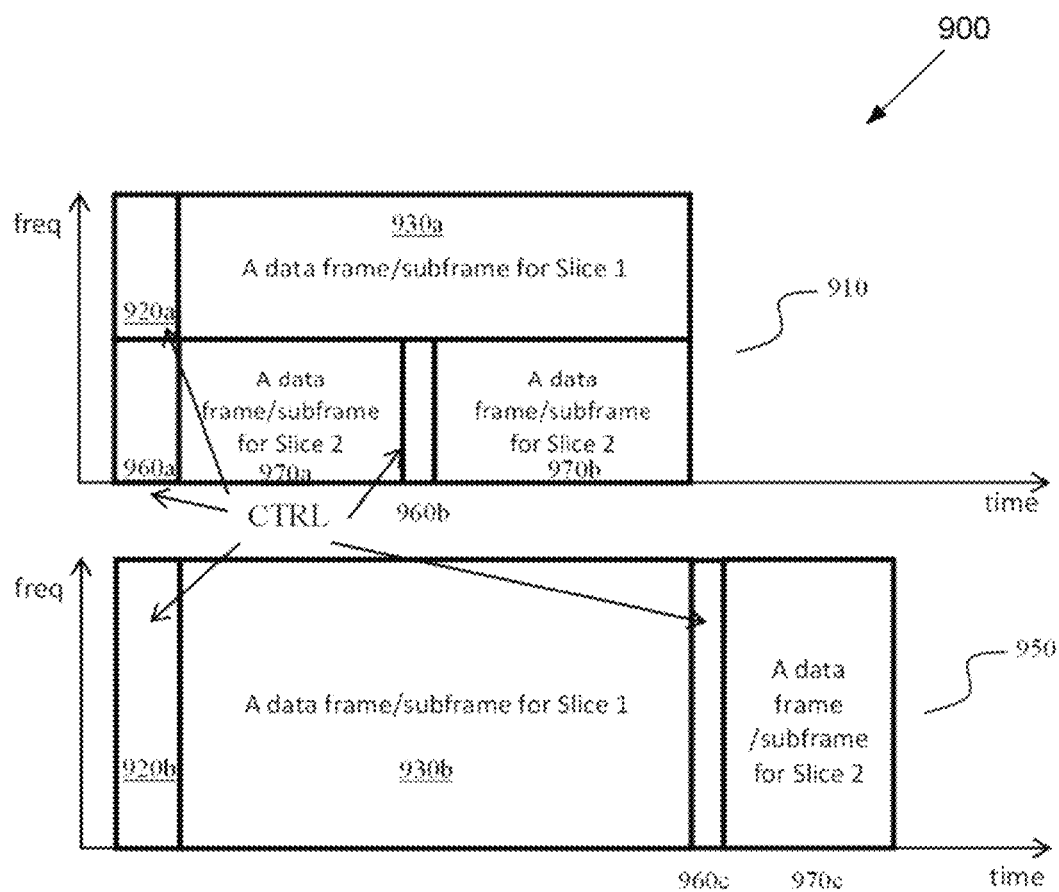
FIG. 9 illustrates an example multiplexing of two slices according to embodiments of the present disclosure.

FIG. 9 illustrates an example multiplexing of two slices 900 according to embodiments of the present disclosure. The embodiment of the multiplexing of two slices 900 illustrated in FIG. 9 is for illustration only. FIG. 9 does not limit the scope of this disclosure to any particular implementation of the multiplexing of two slices 900.

Two exemplary instances of multiplexing two slices within a common subframe or frame are depicted in FIG. 9. In these exemplary embodiments, a slice can be composed of one or two transmission instances where one transmission instance includes a control (CTRL) component (e.g., 920a, 960a, 960b, 920b, or 960c) and a data component (e.g., 930a, 970a, 970b, 930b, or 970c). In embodiment 910, the two slices are multiplexed in frequency domain whereas in embodiment 950, the two slices are multiplexed in time domain. These two slices can be transmitted with different sets of numerology.

LTE specification supports up to 32 CSI-RS antenna ports which enable an eNB to be equipped with a large number of antenna elements (such as 64 or 128). In this case, a plurality of antenna elements is mapped onto one CSI-RS port. For next generation cellular systems such as 5G, the maximum number of CSI-RS ports can either remain the same or increase.

Figure 10:
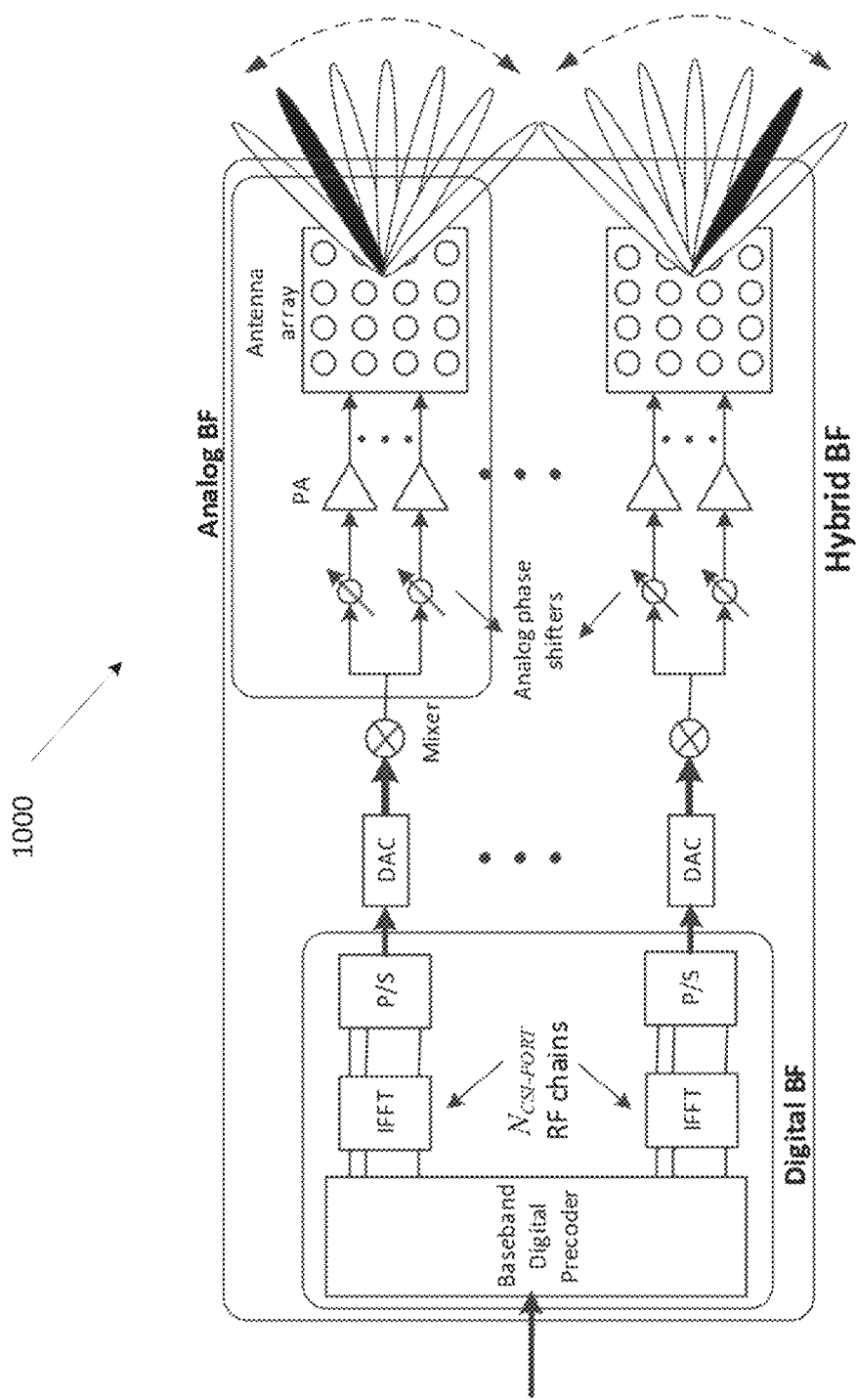
FIG. 10 illustrates an example antenna blocks according to embodiments of the present disclosure.

FIG. 10 illustrates an example antenna blocks 1000 according to embodiments of the present disclosure. The embodiment of the antenna blocks 1000 illustrated in FIG. 10 is for illustration only. FIG. 10 does not limit the scope of this disclosure to any particular implementation of the antenna blocks 1000.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 10. In this case, one CSI-RS port is mapped onto a large number of antenna elements which can be controlled by a bank of analog phase shifters. One CSI-RS port can then correspond to one sub-array which produces a narrow analog beam through analog beamforming. This analog beam can be configured to sweep across a wider range of angles by varying the phase shifter bank across symbols or subframes. The number of sub-arrays (equal to the number of RF chains) is the same as the number of CSI-RS ports $N_{CSI-PORT}$. A digital beamforming unit performs a linear combination across $N_{CSI-PORT}$ analog beams to further increase precoding gain. While analog beams are wideband (hence not frequency-selective), digital precoding can be varied across frequency sub-bands or resource blocks.

In a 3GPP LTE communication system, network access and radio resource management (RRM) are enabled by physical layer synchronization signals and higher (MAC) layer procedures. In particular, a UE attempts to detect the presence of synchronization signals along with at least one cell ID for initial access. Once the UE is in the network and associated with a serving cell, the UE monitors several neighboring cells by attempting to detect their synchronization signals and/or measuring the associated cell-specific RSs (for instance, by measuring their RSRPs). For next generation cellular systems such as 3GPP NR (new radio access or interface), efficient and unified radio resource acquisition or tracking mechanism which works for various use cases (such as eMBB, URLLC, mMTC, each corresponding to a different coverage requirement) and frequency bands (with different propagation losses) is desirable. Most likely designed with a different network and radio resource paradigm, seamless and low-latency RRM is also desirable. Such goals pose at least the following problems in designing an access, radio resource, and mobility management framework.

First, since NR is likely to support even more diversified network topology, the notion of cell can be redefined or replaced with another radio resource entity. As an example, for synchronous networks, one cell can be associated with a plurality of TRPs (transmit-receive points) similar to a COMP (coordinated multipoint transmission) scenario in LTE specification. In this case, seamless mobility is a desirable feature.

Second, when large antenna arrays and beamforming are utilized, defining radio resource in terms of beams (although possibly termed differently) can be a natural approach. Given that numerous beamforming architectures can be utilized, an access, radio resource, and mobility management framework which accommodates various beamforming architectures (or, instead, agnostic to beamforming architecture) is desirable.

Figure 11:
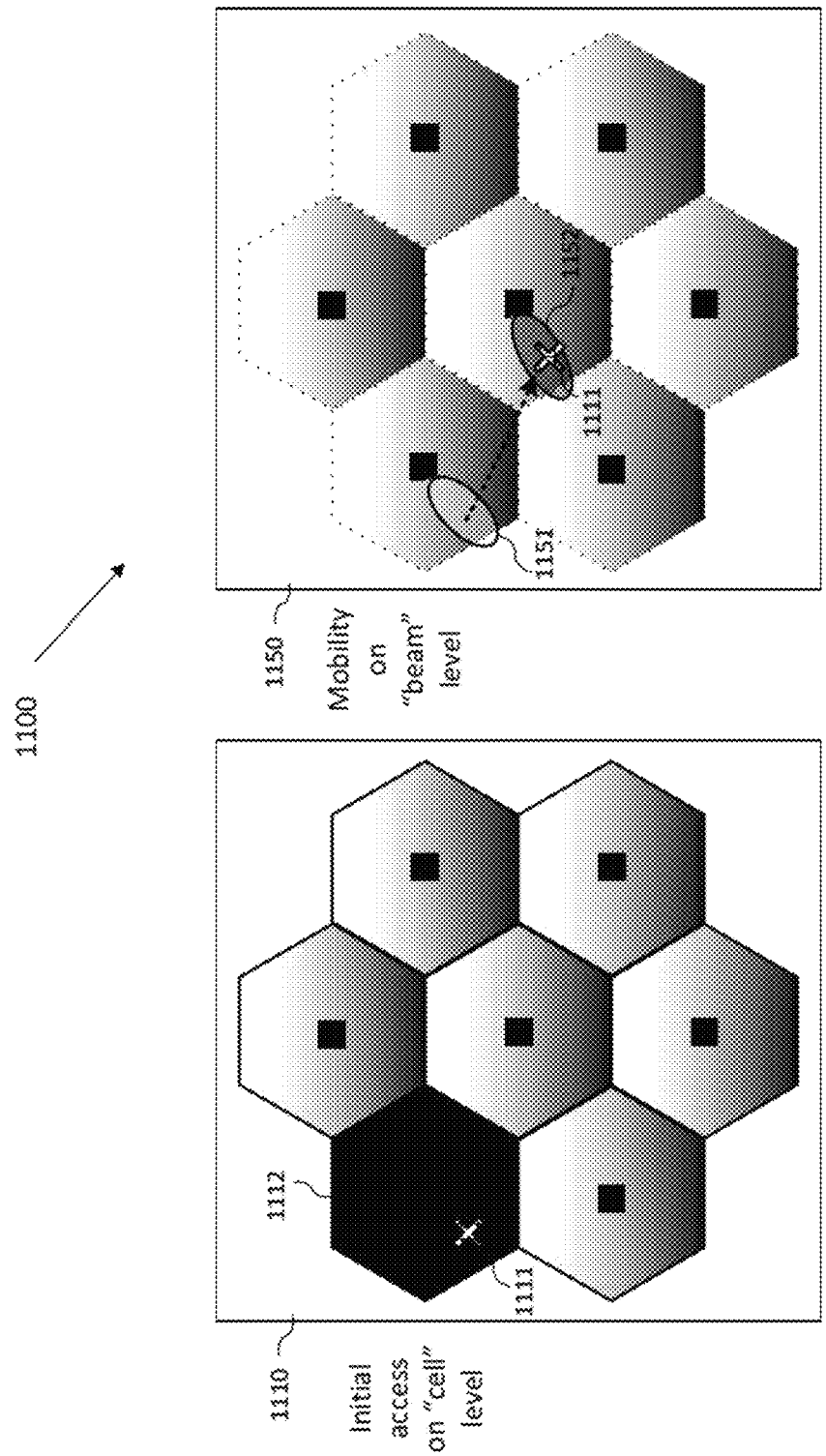
FIG. 11 illustrates an example UE mobility scenario according to embodiments of the present disclosure.

FIG. 11 illustrates an example UE mobility scenario 1100 according to embodiments of the present disclosure. The embodiment of the UE mobility scenario 1100 illustrated in FIG. 11 is for illustration only. FIG. 11 does not limit the scope of this disclosure to any particular implementation of the UE mobility scenario 1100.

For instance, the framework may be applicable for or agnostic to whether one beam is formed for one CSI-RS port (for instance, where a plurality of analog ports are connected to one digital port, and a plurality of widely separated digital ports are utilized) or one beam is formed by a plurality of CSI-RS ports. In addition, the framework may be applicable whether beam sweeping (as illustrated in FIG. 11) is used or not.

Third, different frequency bands and use cases impose different coverage limitations. For example, mmWave bands impose large propagation losses. Therefore, some form of coverage enhancement scheme is needed. Several candidates include beam sweeping (as shown in FIG. 10), repetition, diversity, and/or multi-TRP transmission. For mMTC where transmission bandwidth is small, time-domain repetition is needed to ensure sufficient coverage.

A UE-centric access which utilizes two levels of radio resource entity is described in FIG. 11. These two levels can be termed as "cell" and "beam". These two terms are exemplary and used for illustrative purposes. Other terms such as radio resource (RR) 1 and 2 can also be used. Additionally, the term "beam" as a radio resource unit is to be differentiated with, for instance, an analog beam used for beam sweeping in FIG. 10.

As shown in FIG. 11, the first RR level (termed "cell") applies when a UE enters a network and therefore is engaged in an initial access procedure. In 1110, a UE 1111 is connected to cell 1112 after performing an initial access procedure which includes detecting the presence of synchronization signals. Synchronization signals can be used for coarse timing and frequency acquisitions as well as detecting the cell identification (cell ID) associated with the serving cell. In this first level, the UE observes cell boundaries as different cells can be associated with different cell IDs. In FIG. 11, one cell is associated with one TRP (in general, one cell can be associated with a plurality of TRPs). Since cell ID is a MAC layer entity, initial access involves not only physical layer procedure(s) (such as cell search via synchronization signal acquisition) but also MAC layer procedure(s).

The second RR level (termed "beam") applies when a UE is already connected to a cell and hence in the network. In this second level, a UE 1111 can move within the network without observing cell boundaries as illustrated in embodiment 1150. That is, UE mobility is handled on beam level rather than cell level, where one cell can be associated with N beams (N can be 1 or >1). Unlike cell, however, beam is a physical layer entity. Therefore, UE mobility management is handled solely on physical layer. An example of UE mobility scenario based on the second level RR is given in embodiment 1150 of FIG. 11.

After the UE 1111 is associated with the serving cell 1112, the UE 1111 is further associated with beam 1151. This is achieved by acquiring a beam or radio resource (RR) acquisition signal from which the UE can acquire a beam identity or identification. An example of beam or RR acquisition signal is a measurement reference signal (RS). Upon acquiring a beam (or RR) acquisition signal, the UE 1111 can report a status to the network or an associated TRP. Examples of such report include a measured beam power (or measurement RS power) or a set of at least one recommended "beam identity (ID)" or "RR-ID". Based on this report, the network or the associated TRP can assign a beam (as a radio resource) to the UE 1111 for data and control transmission. When the UE 1111 moves to another cell, the boundary between the previous and the next cells is neither observed nor visible to the UE 1111. Instead of cell handover, the UE 1111 switches from beam 1151 to beam 1152. Such a seamless mobility is facilitated by the report from UE 711 to the network or associated TRP—especially when the UE 1111 reports a set of M>1 preferred beam identities by acquiring and measuring M beam (or RR) acquisition signals.

Figure 12:
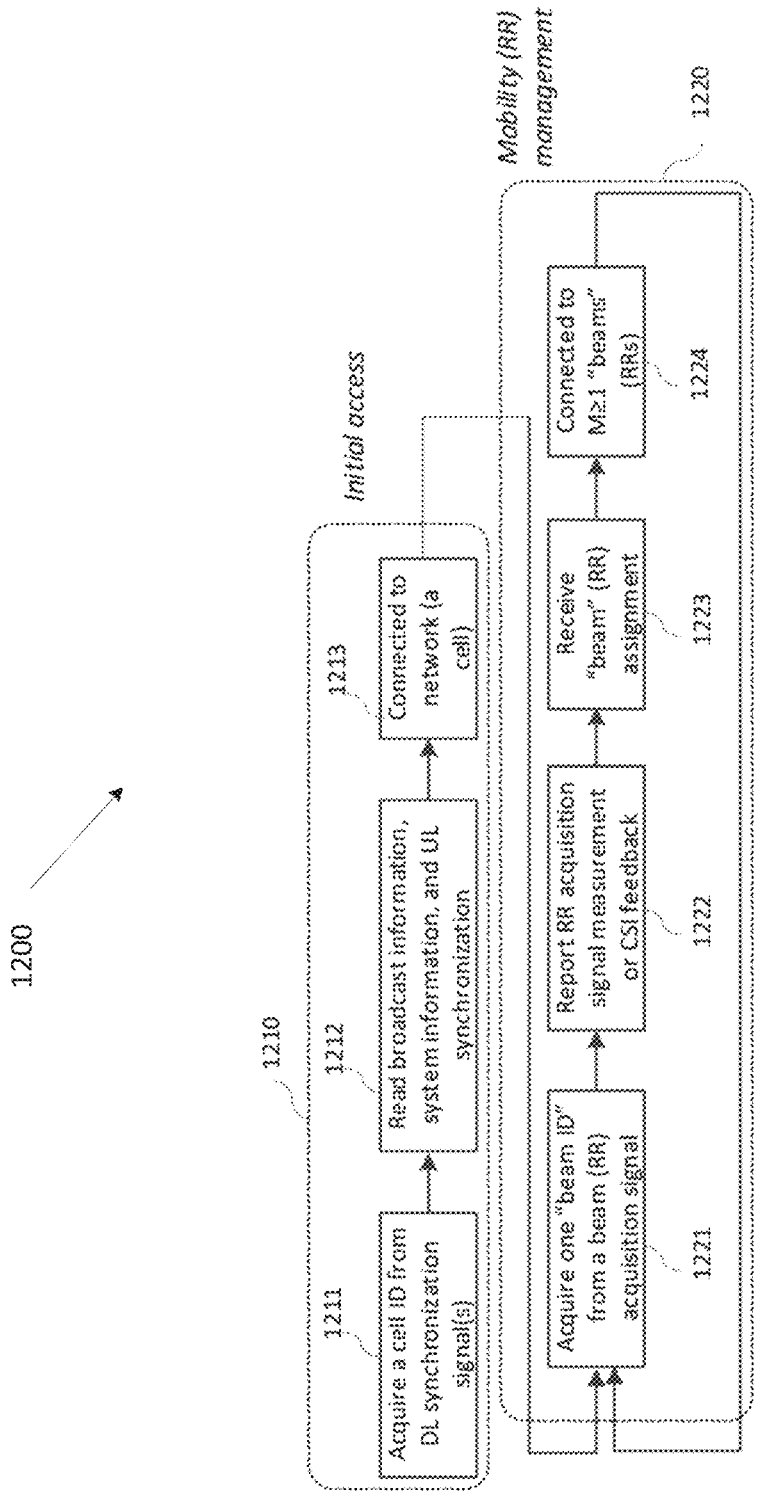
FIG. 12 illustrates an example beam sweeping operation according to embodiments of the present disclosure.

FIG. 12 illustrates an example beam sweeping operation 1200 according to embodiments of the present disclosure. The embodiment of the beam sweeping operation 1200 illustrated in FIG. 12 is for illustration only. FIG. 12 does not limit the scope of this disclosure to any particular implementation of the beam sweeping operation 1200.

As shown in FIG. 12, the aforementioned initial access procedure 1210 and the aforementioned mobility or radio resource management 1220 from the perspective of a UE are described. The initial access procedure 1210 includes cell ID acquisition from DL synchronization signal(s) 1211 as well as retrieval of broadcast information (along with system information required by the UE to establish DL and UL connections) followed by UL synchronization (which can include random access procedure) 1212. Once the UE completes 1211 and 1212, the UE is connected to the network and associated with a cell. Following the completion of initial access procedure, the UE, possibly mobile, is in an RRM state described in 1220. This state includes, first, an acquisition stage 1221 where the UE can periodically (repeatedly) attempt to acquire a "beam" or RR ID from a "beam" or RR acquisition signal (such as a measurement RS).

The UE can be configured with a list of beam/RR IDs to monitor. This list of "beam"/RR IDs can be updated or reconfigured by the TRP/network. This configuration can be signaled via higher-layer (such as RRC) signaling or a dedicated L1 or L2 control channel. Based on this list, the UE can monitor and measure a signal associated with each of these beam/RR IDs. This signal can correspond to a measurement RS resource such as that analogous to CSI-RS resource in LTE system. In this case, the UE can be configured with a set of K>1 CSI-RS resources to monitor. Several options are possible for measurement report 1222. First, the UE can measure each of the K CSI-RS resources, calculate a corresponding RS power (similar to RSRP or RSRQ in LTE system), and report it to the TRP (or network). Second, the UE can measure each of the K CSI-RS resources, calculate an associated CSI (which can include CQI and potentially other CSI parameters such as RI and PMI), and report it to the TRP (or network). Based on the report from the UE, the UE is assigned M≥1 "beams" or RRs either via a higher-layer (RRC) signaling or an L1/L2 control signaling 1223. Therefore the UE is connected to these M "beams"/RRs.

For certain scenarios such as asynchronous networks, the UE can fall back to cell ID based or cell-level mobility management similar to 3GPP LTE system. Therefore, only one of the two levels of radio resource entity (cell) is applicable. When a two-level ("cell" and "beam") radio resource entity or management is utilized, synchronization signal(s) can be designed primarily for initial access into the network. For mmWave systems where analog beam sweeping (as shown in FIG. 12) or repetition may be used for enhancing the coverage of common signals (such as synchronization signal(s) and broadcast channel), synchronization signals can be repeated across time (such as across OFDM symbols or slots or subframes). This repetition factor, however, is not necessarily correlated to the number of supported "beams" (defined as radio resource units, to be differentiated with the analog beams used in beam sweeping) per cell or per TRP. Therefore, beam identification (ID) is not acquired or detected from synchronization signal(s). Instead, beam ID is carried by a beam (RR) acquisition signal such as measurement RS. Likewise, beam (RR) acquisition signal does not carry cell ID (hence, cell ID is not detected from beam or RR acquisition signal).

Therefore, considering the above new challenges in initial access procedure and RRM for the new radio access technology (NR), there is a need for designing synchronization signals (along with their associated UE procedures) and primary broadcast channel which carries broadcast information (e.g., master information block or MIB).

In the present disclosure, numerology refers to a set of signal parameters which can include subframe duration, sub-carrier spacing, cyclic prefix length, transmission bandwidth, or any combination of these signal parameters.

For LTE system, primary and secondary synchronization signals (PSS and SSS, respectively) are used for coarse timing and frequency synchronization and cell ID acquisition. Since PSS/SSS is transmitted twice per 10 ms radio frame and time-domain enumeration is introduced in terms of system frame number (SFN, included in the MIB), frame timing is detected from PSS/SSS to avoid the need for increasing the detection burden from PBCH. In addition, cyclic prefix (CP) length and, if unknown, duplexing scheme can be detected from PSS/SSS. The PSS is constructed from a frequency-domain ZC sequence of length 63, with the middle element truncated to avoid using the d.c. subcarrier.

Three roots are selected for PSS to represent the three physical layer identities within each group of cells. The SSS sequences are based on the maximum length sequences (also known as M-sequences). Each SSS sequence is constructed by interleaving two length-31 BPSK modulated sequences in frequency domain, where the two source sequences before modulation are different cyclic shifts of the same M-sequence. The cyclic shift indices are constructed from the physical cell ID group. Since PSS/SSS detection can be faulty, for example, due to non-idealities in the auto- and cross-correlation properties of PSS/SSS and lack of CRC protection, cell ID hypotheses detected from PSS/SSS may occasionally be confirmed via PBCH detection. PBCH is primarily used to signal the master block information (MIB) which includes DL and UL system bandwidth information (3 bits), PHICH information (3 bits), and SFN (8 bits).

Adding 10 reserved bits (for other uses such as MTC), the MIB payload amounts to 24 bits. After appended with a 16-bit CRC, a rate-1/3 tail-biting convolutional coding, 4× repetitions and QPSK modulation are applied to the 40-bit codeword. The resulting QPSK symbol stream is transmitted across 4 subframes spread over 4 radio frames. Other than detecting MIB, blind detection of the number of CRS ports is also needed for PBCH.

However, the two-stage cell ID detection via PSS (1 out of 3 hypotheses) and SSS (1 out of 168 hypotheses) in LTE system suffers from the false alarm issue especially for neighboring cell search. The UE ends up detecting many false cell ID candidates and needs PBCH detection to remove the false candidates. Moreover, for NR, the transmission bandwidth containing synchronization signals is supposed to be larger than LTE system, such that a new design of NR synchronization signals, aiming for robustness against initial frequency offset and auto-correlation profile, is possible.

This disclosure focuses on the design of NR synchronization signals, termed the NR-SS including NR-PSS and NR-SSS. Some of the embodiments are also related to NR broadcast signals and channels, termed the NR-PBCH.

The present disclosure relates generally to wireless communication systems and, more specifically, to the design of NR synchronization signals, along with their associated mapping and procedures. NR synchronization signals, termed the NR-SS, include NR-PSS and NR-SSS in the present disclosure.

In some embodiments of component I, the functionality of PSS is to provide coarse time domain and frequency domain synchronization, as well as part of the physical cell ID detection. The PSS is constructed from a frequency-domain Zadoff-Chu (ZC) sequence of length 63, with the middle element truncated to avoid using the d.c. subcarrier. 3 roots are selected for PSS to represent the 3 physical layer identities within each group of cells. The PSS is transmitted in the central 6 resource blocks (RB s), invariant to the system bandwidth to enable the UE to synchronize without a priori information of the system bandwidth.

For NR, one of the basic functionalities of NR-PSS is still to provide coarse time domain and frequency domain synchronization, and the frequency location of NR-PSS can still be independent from the system bandwidth. However, other functionalities and designs of the sequence can be different from LTE system in the following aspects. Note that any combination of the following aspects is covered in the present disclosure.

In one embodiment of NR-PSS sequence type: the NR-PSS sequence can still use at least one of the ZC sequences as in LTE system; and the NR-PSS sequence can use at least one of other sequences with the constant amplitude zero autocorrelation (CAZAC) property, for example, generalized ZC sequences as defined in some embodiments of component III.

In one embodiment of NR-PSS sequence length, the sequence length of NR-PSS can be based on the available number of resource elements/subcarriers for NR-PSS transmission within a SS block. In one example, if the synchronization transmission bandwidth is 5 MHz with 60 kHz subcarrier spacing, or 10 MHz with 120 kHz subcarrier spacing, or 20 MHz with 240 kHz subcarrier spacing, or 40 MHz with 480 kHz subcarrier spacing, or 80 MHz with 960 kHz subcarrier spacing, the available number of resource elements can be up to $N_{RE}=72$, then if NR-PSS occupies the whole synchronization transmission bandwidth, the NR-PSS sequence length $L_{PSS}$ can be up to $L_{PSS} \leq N_{RE}=72$, e.g. $L_{PSS}=61$ or 63, and if NR-PSS occupies part of the transmission bandwidth to be multiplexed with other signals (e.g. NR-SSS, and/or NR-PBCH, and/or repetition of NR-PSS, and or zero sequence), the NR-PSS sequence length can be up to 36 (for occupying half of the REs, e.g. $L_{PSS}=23$ or 29) or 24 (for occupying one third of the REs, e.g. $L_{PSS}=13$ or 17) or 18 (for occupying quarter of the REs, e.g. $L_{PSS}=11$ or 13).

In another example, if the synchronization transmission bandwidth is 5 MHz with 30 kHz subcarrier spacing, or 10 MHz with 60 kHz subcarrier spacing, or 20 MHz with 120 kHz subcarrier spacing, or 40 MHz with 240 kHz subcarrier spacing, or 80 MHz with 480 kHz subcarrier spacing, the available number of resource elements can be up to $N_{RE}=144$, then if NR-PSS occupies the whole synchronization transmission bandwidth, the NR-PSS sequence length $L_{PSS}$ can be up to $L_{PSS} \leq N_{RE}=144$, e.g. $L_{PSS}=127$ or 131 or 133, and if NR-PSS occupies part of the transmission bandwidth to be multiplexed with other signals (e.g. NR-SSS, and/or NR-PBCH, and/or repetition of NR-PSS, and/or zero sequence), the NR-PSS sequence length $L_{PSS}$ can be up to $N_{RE}/2=72$ (for occupying half of the REs, e.g. $L_{PSS}=61$ or 63) or $N_{RE}/3=48$ (for occupying one third of the REs, e.g. $L_{PSS}=37$ or 39 or 41) or 36 (for occupying quarter of the REs, e.g. $L_{PSS}=23$ or 29).

In yet another example, if the synchronization transmission bandwidth is 5 MHz with 15 kHz subcarrier spacing, or 10 MHz with 30 kHz subcarrier spacing, or 20 MHz with 60 kHz subcarrier spacing, or 40 MHz with 120 kHz subcarrier spacing, or 80 MHz with 240 kHz subcarrier spacing, the available number of resource elements can be up to $N_{RE}=288$, then if NR-PSS occupies the whole synchronization transmission bandwidth, the NR-PSS sequence length $L_{PSS}$ can be up to $L_{PSS} \leq N_{RE}=288$, e.g. $L_{PSS}=255$, or 263 or 271, and if NR-PSS occupies part of the transmission bandwidth to be multiplexed with other signals (e.g. NR-SSS, and/or NR-PBCH, and/or repetition of NR-PSS, and/or zero sequence), the NR-PSS sequence length can be up to 144 (for occupying half of the REs, e.g. $L_{PSS}=127$ or 131 or 133) or 96 (for occupying one third of the REs, e.g. $L_{PSS}=79$ or 83) or 72 (for occupying quarter of the REs, e.g. $L_{PSS}=61$ or 63).

In yet another example, if the synchronization transmission bandwidth is 20 MHz with 30 kHz subcarrier spacing, or 10 MHz with 15 kHz subcarrier spacing, the available number of resource elements can be up to $N_{RE}=576$, then if NR-PSS occupies the whole synchronization transmission bandwidth, the NR-PSS sequence length $L_{PSS}$ can be up to $L_{PSS} \leq N_{RE}=576$, e.g. $L_{PSS}=571$ or 569, and if NR-PSS occupies part of the transmission bandwidth to be multiplexed with other signals (e.g. NR-SSS, and/or NR-PBCH, and/or repetition of NR-PSS, and/or zero sequence), the NR-PSS sequence length can be up to 288 (for occupying half of the REs, e.g. $L_{PSS}=255$ or 263 or 271) or 192 (for occupying one third of the REs, e.g. $L_{PSS}=191$ or 187 or 181) or 144 (for occupying quarter of the REs, e.g. $L_{PSS}=127$ or 131 or 133).

In yet another example, if the synchronization transmission bandwidth is 20 MHz with 15 kHz subcarrier spacing, the available number of resource elements can be up to $N_{RE}=1152$, then if NR-PSS occupies the whole synchronization transmission bandwidth, the NR-PSS sequence length $L_{PSS}$ can be up to $L_{PSS} \leq N_{RE}=1152$, e.g. $L_{PSS}=1151$ or 1147, and if NR-PSS occupies part of the transmission bandwidth to be multiplexed with other signals (e.g. NR-SSS, and/or NR-PBCH, and/or repetition of NR-PSS, and/or zero sequence), the NR-PSS sequence length can be up to 576 (for occupying half of the REs, e.g. $L_{PSS}=571$ or 569) or 384 (for occupying one third of the REs, e.g. $L_{PSS}=383$ or 379) or 192 (for occupying quarter of the REs, e.g. $L_{PSS}=191$ or 187 or 181).

In some embodiments of time-domain or frequency-domain mapping, the NR-PSS sequence is mapped in frequency domain, which means the NR-PSS sequence is mapped across the resource elements or subcarriers in frequency domain, as in LTE system.

In one embodiment, the NR-PSS is mapped in time domain, which means the NR-PSS sequence is mapped across the OFDM samples in time domain.

In some embodiments of occupying the whole or part of the synchronization transmission bandwidth, the NR-PSS sequence can occupy all the resource elements available in frequency domain within the defined transmission bandwidth for NR-SS.

In one embodiment, the NR-PSS can only occupy part of the resource elements available in frequency domain within the defined transmission bandwidth for NR-SS (other signals like NR-SSS and/or NR-PBCH and/or NR-PSS's repetition and/or zero sequence can be multiplexed and/interleaved in the frequency domain as well).

In some embodiments of whether to include part of the physical cell ID, the indication of physical cell ID can be combined with other system parameters, e.g. CP type (normal CP or extended CP if supported) or numerology of data multiplexed with synchronization signals (see some embodiments of component VI).

In one embodiment, the NR-PSS sequence includes part of the physical cell IDs, as in LTE system. For example, if utilizing the ZC-sequences for NR-PSS, multiple roots corresponding to the number of part of the physical cell IDs are needed.

In another embodiment, the NR-PSS sequence includes no physical cell ID information, and the whole cell ID information is included in NR-SSS. Then, no hypothesis corresponding to the part of cell IDs is needed in the construction of NR-PSS, and NR-PSS is purely utilized for coarse timing and frequency domain offset acquisition.

In some embodiments of carrier frequency dependent or independent, the NR-PSS sequence can be common for all carrier frequencies supported in NR. For example, the design of NR-PSS is common for both >6 GHz system and <6 GHz system. In one embodiment, the NR-PSS sequence can be different for/dependent on the carrier frequency utilized in the system. For example, the design NR-PSS can be different for >6 GHz system and <6 GHz system.

In some embodiments of numerology dependent or independent (note numerology means subframe duration, subcarrier spacing, cyclic prefix length, transmission bandwidth, and/or any combination of these signal parameters), the NR-PSS sequence can be common/independent for all numerologies supported. For example, for a given range of carrier frequencies, if multiple numerologies are supported, NR-PSS has a common design using the default numerology chosen from the supported numerologies. In another embodiment, the NR-PSS sequence can be different for/dependent on the numerology adopted by the system. For example, for a given range of carrier frequencies, if multiple numerologies are supported, NR-PSS has a different design for each of the supported numerologies.

Combinations of the aforementioned embodiments are supported in this present disclosure. Examples of NR-PSS sequences showing the combination of above aspects are illustrated in TABLE 1, and other possible combinations are not excluded in the present disclosure. Note that systems within the same cell in the left column can use the same or different NR-PSS sequence in the right column. Systems supporting multiple numerologies (systems with the same carrier frequency and transmission bandwidth but different subcarrier spacing, corresponding to different cells within different rows in the left column in TABLE 1) can use a common NR-PSS sequence according the default numerology or a numerology-specific NR-PSS sequence listed in the right column. Also note that, the number of NR-PSS sequences (e.g. one ZC-sequence or multiple ZC-sequences) only refers to the number of sequences indicating part of the cell ID, and the number of NR-PSS sequences indicating other system parameters e.g. CP type (normal CP or extended CP if supported) or numerology of data multiplexed with synchronization signals, is discussed in some embodiments of component VI.

TABLE 1

NR-PSS sequence design

| Systems | NR-PSS Sequence Design Examples |
|---|---|
| <6 GHz carrier frequency with 5 MHz synchronization transmission bandwidth and 30 kHz subcarrier spacing or <6 GHz carrier frequency with 20 MHz synchronization transmission bandwidth and 120 kHz subcarrier spacing or >6 GHz carrier frequency with 40 MHz synchronization transmission bandwidth and 240 kHz subcarrier spacing or | One ZC-sequence with only one root ($M_{PSS} = 1$, no cell-ID information) and length $L_{PSS} \leq N_{RE}$ (e.g. $L_{PSS} = 127$ or 131 or 133, which is mapped accross the middle $L_{PSS} - 1$ (e.g. 126 or 130 or 132) subcarriers (middle element truncated) within the $N_{RE} = 144$ subcarriers available for the NR-PSS transmission in the frequency domain, where the NR-PSS is not multiplexed with other signals in the frequency domain. One ZC-sequency with only one root ($M_{PSS} = 1$, no cell-ID information) and length $L_{PSS} \leq \kappa_{PSS} \cdot N_{RE}$, which is mapped across thed middle $L_{PSS} - 1$ subcarriers (middle element truncated) within the $\kappa_{PSS} \cdot N_{RE}$ subcarriers available for the NR-PSS transmission in the frequency domain, where the NR-PSS is not multiplexed/interleaved with other signals (e.g. NR-SSS and/or NR-PBCH and/or |

TABLE 1-continued

NR-PSS sequence design

| Systems | NR-PSS Sequence Design Examples |
|---|---|
| >6 GHz carrier frequency with 80 MHz synchronization transmission bandwidth and 480 kHz subcarrier spacing (maximum number of REs/subcarriers for NR-PSS transmission $N_{RE}$ = 144) | repetition of NR-PSS and/or zero sequence) within the SS block (NR-PSS occupies ratio $\kappa_{PSS}$ of the transmission bandwidth, e.g. if $\kappa_{PSS}$ = 0.5, then NR-PSS sequence length is no longer than $\kappa_{PSS} \cdot N_{RE}$ = 72, and $L_{PSS}$ = 61 or 63; if $\kappa_{PSS}$ = 0.33, then NR-PSS sequence length is no longer than $\kappa_{PSS} \cdot N_{RE}$ = 48 and $L_{PSS}$ = 37 or 39 or 41; if $\kappa_{PSS}$ = 0.25, then NR-PSS sequence length is no longer than $\kappa_{PSS} \cdot N_{RE}$ = 36, and $L_{PSS}$ = 23 or 29).<br>One of the ZC-sequence with $M_{PSS}$ > 1 number of roots ($M_{PSS}$ corresponds to the number of the part of the cell IDs included in NR-PSS) and length $L_{PSS} \leq N_{RE}$ (e.g. $L_{PSS}$ = 127 or 131 or 133), which is mapped across the middle $L_{PSS}$ − 1 (e.g. 126 or 130 or 132) subcarriers (middle element truncated) within the $N_{RE}$ = 144 subcarriers available for the NR-PSS transmission in the frequency domain, where the NR-PASS is not multiplexed with other signals in the frequency domain.<br>One of the ZC-sequences with $M_{PSS}$ > 1 number of roots ($M_{PSS}$ corresponds to the number of the part of the cell IDs included in NR-PSS) length $L_{PSS} \leq \kappa_{PSS} \cdot N_{RE}$, which is mapped across the middle $L_{PSS}$ − 1 subcarriers (middle element truncated) within the $\kappa_{PSS} \cdot N_{RE}$ subcarriers available for the NR-PSS transmission in the frequency domain, where the NR-PSS is multiplexed/interleaved with other signals (e.g. NR-SSS and/or NR-PBCH and/or repetition of NR-PSS and/or zero sequence) within the SS block (NR-PSS occupies ratio $\kappa_{PSS}$ of the transmission bandwidth, e.g. if $\kappa_{PSS}$ = 0.5, then NR-PSS sequence length is no longer than $\kappa_{PSS} \cdot N_{RE}$ = 72, and $L_{PSS}$ = 61 or 63; if $\kappa_{PSS}$ = 0.33, then NR-PSS sequence length is no longer than $\kappa_{PSS} \cdot N_{RE}$ = 48, and $L_{PSS}$ = 37 or 39 or 41; if $\kappa_{PSS}$ = 0.25, then NR-PSS sequence length is no longer than $\kappa_{PSS} \cdot N_{RE}$ = 36, and $L_{PSS}$ = 23 or 29).<br>One generalized ZC sequence (see some embodiments of component III) with only one root ($M_{PSS}$ = 1, no cell-ID information) and length $L_{PSS} \leq \kappa_{PSS} \cdot N_{RE}$, which is mapped across the middle $L_{PSS}$ − 1 subcarriers (middle element truncated) within the $\kappa_{PSS} \cdot N_{RE}$ subcarriers available for the NR-PSS transmission in the frequency domain, where the NR-PSS is multiplexed/interleaved with other signals (e.g. NR-SSS and/or NR-PBCH and/or repetition of NR-PSS and/or zero sequence) within the SS block (NR-PSS occupies ratio $\kappa_{PSS}$ of the transmission bandwidth, e.g. if $\kappa_{PSS}$ = 0.5, then NR-PSS sequence length is no longer than $\kappa_{PSS} \cdot N_{RE}$ = 72, and $L_{PSS}$ = 61 or 63; if $\kappa_{PSS}$ = 0.33, then NR-PSS sequence length is no longer than $\kappa_{PSS} \cdot N_{RE}$ = 48, and $L_{PSS}$ = 37 or 39 or 41; if $\kappa_{PSS}$ = 0.25, then NR-PSS sequence length is no longer than $\kappa_{PSS} \cdot N_{RE}$ = 36, and $L_{PSS}$ = 23 or 29).<br>One of the generalized ZC sequences (see some embodiments of component III) with $M_{PSS}$ > 1 number of roots ($M_{PSS}$ corresponds to the number of the part of the cell IDs included in NR-PSS) and length $L_{PSS} \leq N_{RE}$ (e.g. $L_{PSS}$ = 127 or 131 or 133), which is mapped across the middle $L_{PSS}$ − 1 (e.g. 126 or 130 or 132) subcarriers (middle element truncated) within the $N_{RE}$ = 144 subcarriers available for the NR-PSS transmission in the frequency domain, where the NR-PSS is not multiplexed with other signals in the frequency domain.<br>One of the generalized ZC sequences (see some embodiments of component III) with $M_{PSS}$ > 1 number of roots ($M_{PSS}$ corresponds to the number of the part of the cell IDs included in NR-PSS) length $L_{PSS} \leq \kappa_{PSS} \cdot N_{RE}$, which is mapped across the middle $L_{PSS}$ − 1 subcarriers (middle element truncated) within the $\kappa_{PSS} \cdot N_{RE}$ subcarriers available for the NR-PSS transmission in the frequency domain. where the NR-PSS is multiplexed/interleaved with other signals (e.g. NR-SSS and/or NR-PBCH and/or repetition of NR-PSS and/or zero sequence) within the SS block (NR-PSS occupies ratio $\kappa_{PSS}$ of the transmission bandwidth, e.g. if $\kappa_{PSS}$ = 0.5, then NR-PSS sequence length is no longer than $\kappa_{PSS} \cdot N_{RE}$ = 72, and $L_{PSS}$ = 61 or 63; if $\kappa_{PSS}$ = 0.33, then NR-PSS sequence length is no longer than $\kappa_{PSS} \cdot N_{RE}$ = 48, |

TABLE 1-continued

NR-PSS sequence design

| Systems | NR-PSS Sequence Design Examples |
|---|---|
| | and $L_{PSS}$ = 37 or 39 or 41; if $\kappa_{PSS}$ = 0.25, then NR-PSS sequence length is no longer than $\kappa_{PSS} \cdot N_{RE}$ = 36, and $L_{PSS}$ = 23 or 29). |
| <6 GHz carrier frequency with 5 MHz synchronization transmission bandwidth and 60 kHz subcarrier spacing or <6 GHz carrier frequency with 20 MHz synchronization transmission bandwidth and 240 kHz subcarrier spacing or >6 GHz carrier frequency with 40 MHz synchronization transmission bandwidth and 480 kHz subcarrier spacing or >6 GHz carrier frequency with 80 MHz synchronization transmission bandwidth and 960 kHz subcarrier spacing (maximum number of REs/subcarriers for NR-PSS transmission $N_{RE}$ = 72) | One ZC-sequence with only one root ($M_{PSS}$ = 1, no cell-ID information) and length $L_{PSS} \leq N_{RE}$ (e.g. $L_{PSS}$ = 61 or 63), which is mapped across the middle $L_{PSS}$ − 1 (e.g. 60 or 62) subcarriers (middle element truncated) within the $N_{RE}$ = 72 subcarriers available for the NR-PSS transmission in the frequency domain, where the NR-PSS is not multiplexed with other signals in the frequency domain. One of the ZC-sequences with $M_{PSS}$ > 1 number of roots ($M_{PSS}$ corresponds to the number of the part of the cell IDs included in NR-PSS) and length $L_{PSS} \leq N_{RE}$ (e.g. $L_{PSS}$ = 61 or 63), which is mapped across the middle $L_{PSS}$ − 1 (e.g. 60 or 62) subcarriers (middle element truncated) within the $N_{RE}$ = 72 subcarriers available for the NR-PSS transmission in the frequency domain, where the NR-PSS is not multiplexed with other signals in the frequency domain. One generalized ZC-sequence (see some embodiments of component III) with only one root ($M_{PSS}$ = 1, no cell-ID information) and length $_{PSS} \leq N_{RE}$ (e.g. $L_{PSS}$ = 61 or 63), which is mapped across the middle $L_{PSS}$ − 1 (e.g. 60 or 62) subcarriers (middle element truncated) within the $N_{RE}$ = 72 subcarriers available for the NR-PSS transmission in the frequency domain, where the NR-PSS is not multiplexed with other signals in the frequency domain. One of the generalized ZC-sequences (see some embodiments of component III) with $M_{PSS}$ > 1 number of roots ($M_{PSS}$ corresponds to the number of the part of the cell IDs included in NR-PSS) and length $L_{PSS} \leq N_{RE}$ (e.g. $L_{PSS}$ = 61 or 63), which is mapped across the middle $L_{PSS}$ − 1 (e.g. 60 or 62) subcarriers (middle element truncated) within the $N_{RE}$ = 72 subcarriers available for the NR-PSS transmission in the frequency domain, where the NR-PSS is not multiplexed with other signals in the frequency domain. |
| <6 GHz carrier frequency with 5 MHz synchronization transmission bandwidth and 15 kHz subcarrier spacing or <6 GHz carrier frequency with 20 MHz synchronization transmission bandwidth and 60 kHz subcarrier spacing or >6 GHz carrier frequency with 40 MHz synchronization transmission bandwidth and 120 kHz subcarrier spacing or >6 GHz carrier frequency with 80 MHz synchronization transmission bandwidth and 240 kHz subcarrier spacing (maximum number of REs/subcarriers for NR-PSS transmission $N_{RE}$ = 288) | One ZC-sequence with only one root ($M_{PSS}$ = 1, no cell-ID information) and length $L_{PSS} \leq N_{RE}$ (e.g. $L_{PSS}$ = 255 or 263 or 271), which is mapped across the middle $L_{PSS}$ − 1 (e.g. 254 or 262 or 270) subcarriers (middle element truncated) within the $N_{RE}$ = 288 subcarriers available for the NR-PSS transmission in the frequency domain, where the NR-PSS is not multiplexed with other signals in the frequency domain. One ZC-sequence with only one root ($M_{PSS}$ = 1, no cell-ID information) and length $L_{PSS} \leq \kappa_{PSS} \cdot N_{RE}$, which is mapped across the middle $L_{PSS}$ − 1 subcarriers (middle element truncated) within the $\kappa_{PSS} \cdot N_{RE}$ subcarriers available for the NR-PSS transmission in the frequency domain, where the NR-PSS is multiplexed/interleaved with other signals (e.g. NR-SSS and/or NR-PBCH and/or repetition of NR-PSS and/or zero sequence) within the SS block (NR-PSS occupies ratio $\kappa_{PSS}$ of the transmission bandwidth, e.g. if $\kappa_{PSS}$ = 0.5, then NR-PSS sequence length is no longer than $\kappa_{PSS} \cdot N_{RE}$ = 144, and $L_{PSS}$ = 127 or 131 or 133; if $\kappa_{PSS}$ = 0.33, then NR-PSS sequence length is no longer than $\kappa_{PSS} \cdot N_{RE}$ = 96, and $L_{PSS}$ = 79 or 83; if $\kappa_{PSS}$ = 0.25, then NR-PSS sequence length is no longer than $\kappa_{PSS} \cdot N_{RE}$ = 72, and $L_{PSS}$ = 61 or 63). One of the ZC-sequences with $M_{PSS}$ > 1 number of roots ($M_{PSS}$ corresponds to the number of the part of the cell IDs included in NR-PSS) and length $L_{PSS} \leq \kappa_{PSS}$ (e.g. $L_{PSS}$ = 255 or 263 or 271), which is mapped across the middle $L_{PSS}$ − 1 (e.g. 254 or 262 or 270) subcarriers (middle element truncated) within the $N_{RE}$ = 288 subcarriers available for the NR-PSS transmission in the frequency domain, where the NR-PSS is not multiplexed with other signals in the frequency domain. One of the ZC-sequences with $M_{PSS}$ > 1 number of roots ($M_{PSS}$ corresponds to the number of the part of the cell IDs included in NR-PSS) and length $L_{PSS} \leq \kappa_{PSS} \cdot N_{RE}$, which is mapped across the middle $L_{PSS}$ − 1 subcarriers (middle element truncated) within the $\kappa_{PSS} \cdot N_{RE}$ subcarriers |

TABLE 1-continued

NR-PSS sequence design

| Systems | NR-PSS Sequence Design Examples |
|---|---|
| | available for the NR-PSS transmission in the frequency domain, where the NR-PSS is multiplexed/interleaved with other signals (e.g. NR-SSS and/or NR-PBCH and/or repetition of NR-PSS and/or zero sequence) within the SS block (NR-PSS occupies ratio $\kappa_{PSS}$ of the transmission bandwidth, e.g. if $\kappa_{PSS} = 0.5$, then NR-PSS sequence length is no longer than $\kappa_{PSS} \cdot N_{RE} = 144$, and $L_{PSS} = 127$ or 131 or 133; if $\kappa_{PSS} = 0.33$, then NR-PSS sequence length is no longer than $\kappa_{PSS} \cdot N_{RE} = 96$, and $L_{PSS} = 79$ or 83; if $\kappa_{PSS} = 0.25$, then NR-PSS sequence length is no longer than $\kappa_{PSS} \cdot N_{RE} = 72$, and $L_{PSS} = 61$ or 63). |
| | One generalized ZC-sequence (see some embodiments of component III) with only one root ($M_{PSS} = 1$, no cell-ID information) and length $L_{PSS} \leq N_{RE}$ (e.g. $L_{PSS} = 255$ or 263 or 271), which is mapped across the middle $L_{PSS} - 1$ (e.g. 254 or 262 or 270) subcarriers (middle element truncated) within the $N_{RE} = 288$ subcarriers available for the NR-PSS transmission in the frequency domain, where the NR-PSS is not multiplexed with other signals in the frequency domain. |
| | One generalized ZC-sequence (see some embodiments of component III) with only one root ($M_{PSS} = 1$, no cell-ID information) and length $L_{PSS} \leq \kappa_{PSS} \cdot N_{RE}$, which is mapped across the middle $L_{PSS} - 1$ subcarriers (middle element truncated) within the $\kappa_{PSS} \cdot N_{RE}$ subcarriers available for the NR-PSS transmission in the frequency domain, where the NR-PSS is multiplexed/interleaved with other signals (e.g. NR-SSS and/or NR-PBCH and/or repetition of NR-PSS and/or zero sequence) within the SS block (NR-PSS occupies ratio $\kappa_{PSS}$ of the transmission bandwidth, e.g. if $\kappa_{PSS} = 0.5$, then NR-PSS sequence length is no longer than $\kappa_{PSS} \cdot N_{RE} = 144$, and $L_{PSS} = 127$ or 131 or 133; if $\kappa_{PSS} = 0.33$, then NR-PSS sequence length is no longer than $\kappa_{PSS} \cdot N_{RE} = 96$, and $L_{PSS} = 79$ or 83; if $\kappa_{PSS} = 0.25$, then NR-PSS sequence length is no longer than $\kappa_{PSS} \cdot N_{RE} = 72$, and $L_{PSS} = 61$ or 63). |
| | One of the generalized ZC-sequences (see some embodiments of component III) with $M_{PSS} > 1$ number of roots ($M_{PSS}$ corresponds to the number of the part of the cell IDs included in NR-PSS) and length $L_{PSS} \leq N_{RE}$ (e.g. $L_{PSS} = 255$ or 263 or 271), which is mapped across the middle $L_{PSS} - 1$ (e.g. 254 or 262 or 270) subcarriers (middle element truncated) within the $N_{RE} = 288$ subcarriers available for the NR-PSS transmission in the frequency domain, where the NR-PSS is not multiplexed with other signals in the frequency domain. |
| | One of the generalized ZC-sequences (see some embodiments of component III) with $M_{PSS} > 1$ number of roots ($M_{PSS}$ corresponds to the number of the part of the cell IDs included in NR-PSS) and length $L_{PSS} \leq \kappa_{PSS} \cdot N_{RE}$, which is mapped across the middle $L_{PSS} - 1$ subcarriers (middle element truncated) within the $\kappa_{PSS} \cdot N_{RE}$ subcarriers available for the NR-PSS transmission in the frequency domain, where the NR-PSS is multiplexed/interleaved with other signals (e.g. NR-SSS and/or NR-PBCH and/or repetition of NR-PSS and/or zero sequence) within the SS block (NR-PSS occupies ratio $\kappa_{PSS}$ of the transmission bandwidth, e.g. if $\kappa_{PSS} = 0.5$, then NR-PSS sequence length is no longer than $\kappa_{PSS} \cdot N_{RE} = 144$, and $L_{PSS} = 127$ or 131 or 133; if $\kappa_{PSS} = 0.33$, then NR-PSS sequence length is no longer than $\kappa_{PSS} \cdot N_{RE} = 96$, and $L_{PSS} = 79$ or 83; if $\kappa_{PSS} = 0.25$, then NR-PSS sequence length is no longer than $\kappa_{PSS} \cdot N_{RE} = 72$, and $L_{PSS} = 61$ or 63). |

In some embodiments of component II, the functionality of SSS sequence is to detect the other part of cell ID based on the coarse time-domain and frequency-domain synchronization detection from PSS. CP size and duplexing mode information are also detected by SSS. The construction of SSS sequences are based on the maximum length sequences (also known as M-sequences). Each SSS sequence is constructed by interleaving two length-31 BPSK modulated subsequences in frequency domain, where the two subsequences are constructed from the same M-sequence using different cyclic shifts. The cyclic shift indices for both parts are functions of the physical cell ID group.

For NR, the basic functionalities of NR-SSS remain to detect the cell ID or part of the cell ID, as well as CP size and duplexing mode if supported in NR. However, with respective to the details of the design of NR-SSS, the following aspects can be considered. Note that the combinations of aspects are supported in this disclosure.

In some embodiments of NR-SSS sequence type, the NR-SSS sequence can still use the combination of two interleaved M-sequences as in LTE system. In another embodiment, the NR-SSS sequence can use ZC-sequences wherein a set of ZC sequences with different root indices and/or cyclic shifts are utilized. In yet another embodiment, the NR-SSS can use other sequences with the constant amplitude zero autocorrelation (CAZAC) property, for example, generalized ZC sequences as defined in some embodiments III. In yet another embodiment, the NR-SSS can be constructed by channel coding (possibly with a cyclic redundancy check (CRC)) with rate matching (see some embodiments component IV).

In some embodiments of NR-SSS sequence length, the sequence length of NR-PSS can be based on the available number of resource elements/subcarriers for NR-SSS transmission within a SS block. The length of NR-SSS can be either the same as NR-PSS, or different from NR-PSS. In one example, if the synchronization transmission bandwidth is 5 MHz with 60 kHz subcarrier spacing, or 10 MHz with 120 kHz subcarrier spacing, or 20 MHz with 240 kHz subcarrier spacing, or 40 MHz with 480 kHz subcarrier spacing, or 80 MHz with 960 kHz subcarrier spacing, the available number of resource elements can be up to $N_{RE}=72$, then if NR-SSS occupies the whole synchronization transmission bandwidth, the NR-SSS sequence length $L_{SSS}$ can be up to $L_{SSS} \leq N_{RE}=72$, e.g. $L_{SSS}=61$ or 63, and if NR-PSS occupies part of the transmission bandwidth to be multiplexed/interleaved with other signals (e.g. NR-PSS, and/or NR-PBCH, and/or repetition of NR-SSS, and/or zero sequence), the NR-SSS sequence length $L_{SSS}$ can be up to 36 (for occupying half of the REs, e.g. $L_{SSS}=23$ or 29) or 24 (for occupying one third of the REs, e.g. $L_{SSS}=13$ or 17) or 18 (for occupying quarter of the REs, e.g. $L_{SSS}=11$ or 13).

In another example, if the synchronization transmission bandwidth is 5 MHz with 30 kHz subcarrier spacing, or 10 MHz with 60 kHz subcarrier spacing, or 20 MHz with 120 kHz subcarrier spacing, or 40 MHz with 240 kHz subcarrier spacing, or 80 MHz with 480 kHz subcarrier spacing, the available number of resource elements can be up to $N_{RE}=144$, then if NR-SSS occupies the whole synchronization transmission bandwidth, the NR-SSS sequence length $L_{SSS}$ can be up to $L_{SSS} \leq N_{RE}=144$, e.g. $L_{SSS}=127$ or 131 or 133, and if NR-SSS occupies part of the transmission bandwidth to be multiplexed/interleaved with other signals (e.g. NR-PSS, and/or NR-PBCH, and/or repetition of NR-SSS, and/or zero sequence), the NR-SSS sequence length $L_{SSS}$ can be up to $N_{RE}/2=72$ (for occupying half of the REs, e.g. $L_{SSS}=61$ or 63) or $N_{RE}/3=48$ (for occupying one third of the REs, e.g. $L_{SSS}=37$ or 39 or 41) or 36 (for occupying quarter of the REs, e.g. $L_{SSS}=23$ or 29).

In yet another example, if the synchronization transmission bandwidth is 5 MHz with 15 kHz subcarrier spacing, or 10 MHz with 30 kHz subcarrier spacing, or 20 MHz with 60 kHz subcarrier spacing, or 40 MHz with 120 kHz subcarrier spacing, or 80 MHz with 240 kHz subcarrier spacing, the available number of resource elements can be up to $N_{RE}=288$, then if NR-PSS occupies the whole synchronization transmission bandwidth, the NR-SSS sequence length $L_{SSS}$ can be up to $L_{PSS} \leq N_{RE}=288$, e.g. $L_{SSS}=255$ or 263 or 271, and if NR-SSS occupies part of the transmission bandwidth to be multiplexed/interleaved with other signals (e.g. NR-PSS, and/or NR-PBCH, and/or repetition of NR-SSS, and/or zero sequence), the NR-SSS sequence length can be up to 144 (for occupying half of the REs, e.g. $L_{SSS}=127$ or 131 or 133) or 96 (for occupying one third of the REs, e.g. $L_{SSS}=79$ or 83) or 72 (for occupying quarter of the REs, e.g. $L_{SSS}=61$ or 63).

In yet another example, if the synchronization transmission bandwidth is 20 MHz with 30 kHz subcarrier spacing, the available number of resource elements can be up to $N_{RE}=576$, then if NR-SSS occupies the whole synchronization transmission bandwidth, the NR-PSS sequence length $L_{SSS}$ can be up to $L_{SSS} \leq N_{RE}=576$, e.g. $L_{SSS}=571$ or 569, and if NR-PSS occupies part of the transmission bandwidth to be multiplexed/interleaved with other signals (e.g. NR-PSS, and/or NR-PBCH, and/or repetition of NR-SSS, and/or zero sequence), the NR-SSS sequence length can be up to 288 (for occupying half of the REs, e.g. $L_{SSS}=255$ or 263 or 271) or 192 (for occupying one third of the REs, e.g. $L_{SSS}=191$ or 187 or 181) or 144 (for occupying quarter of the REs, e.g. $L_{SSS}=127$ or 131 or 133).

In yet another example, if the synchronization transmission bandwidth is 20 MHz with 15 kHz subcarrier spacing, the available number of resource elements can be up to $N_{RE}=1152$, then if NR-SSS occupies the whole synchronization transmission bandwidth, the NR-SSS sequence length $L_{SSS}$ can be up to $L_{SSS} \leq N_{RE}=1152$, e.g. $L_{SSS}=1151$ or 1147, and if NR-SSS occupies part of the transmission bandwidth to be multiplexed/interleaved with other signals (e.g. NR-PSS, and/or NR-PBCH, and/or repetition of NR-SSS, and/or zero sequence), the NR-SSS sequence length can be up to 576 (for occupying half of the REs, e.g. $L_{SSS}=571$ or 569) or 384 (for occupying one third of the bandwidth, e.g. $L_{SSS}=383$ or 379) or 192 (for occupying quarter of the bandwidth, e.g. $L_{SSS}=191$ or 187 or 181).

In some embodiments of time-domain or frequency-domain mapping, the NR-SSS sequence is mapped in frequency domain, which means the NR-SSS sequence is mapped across the resource elements or subcarriers in frequency domain, as in LTE system. In another embodiment, the NR-SSS is mapped in time domain, which means the NR-SSS sequence is mapped across the OFDM samples in time domain.

In some embodiments of occupying the whole or part of the synchronization transmission bandwidth, the NR-SSS sequence can occupy all the resource elements available in frequency domain within the defined transmission bandwidth for NR-SS. In another embodiment, the NR-SSS can only occupy part of the resource elements available in frequency domain within the defined transmission bandwidth for NR-SS (other signals like NR-PSS and/or NR-PBCH and/or NR-SSS's repetition can be multiplexed in the frequency domain as well).

In some embodiments of whether to include part of or entire physical cell ID, the NR-SSS sequence includes part of the physical cell IDs, as in LTE system. For example, NR-SSS carries the cell ID information not included in NR-PSS. In another embodiment, the NR-SSS sequence includes the entire physical cell ID information.

In some embodiments of Carrier frequency dependent or independent, the NR-SSS sequence can be common for all carrier frequencies supported in NR. For example, the design of NR-SSS is common for both >6 GHz system and <6 GHz system. In another embodiment, the NR-SSS sequence can be different for/dependent on the carrier frequency utilized in the system. For example, the design NR-SSS can be different for >6 GHz system and <6 GHz system.

In some embodiments of numerology dependent or independent (note numerology means subframe duration, subcarrier spacing, cyclic prefix length, transmission bandwidth, and/or any combination of these signal parameters), the NR-SSS sequence can be common/independent for all numerologies supported. For example, for a given range of carrier frequencies, if multiple numerologies are supported, NR-SSS has a common design using the default numerology chosen from the supported numerologies. In another embodiment, the NR-SSS sequence can be different for/ dependent on the numerology adopted by the system. For example, for a given range of carrier frequencies, if multiple numerologies are supported, NR-SSS has a different design for each of the supported numerologies.

In some embodiments of indication of transmission timing of NR-SS within the SS burst set, e.g. including subframe index and/or symbol index within a radio frame, transmission timing of NR-SS within the SS burst set can be detected from the NR-SSS sequence by adding hypotheses in addition to the cell ID (e.g. performing additional scrambling sequences). In another embodiment, transmission timing of NR-SS within the SS burst set can be detected from the NR-SSS sequence by decoding the transport block directly if the construction of NR-SSS sequence is based on coding (see some embodiments of component IV). In yet another embodiment, part of the transmission timing of NR-SS within the SS burst set is indicated by NR-SSS sequence (either explicitly or implicitly), and the remaining timing information is indicated by other signals/channels. In yet another embodiment, no transmission timing of NR-SS within the SS burst set is indicated by NR-SSS sequence.

In some embodiments of relation to the NR-PSS, the transmission bandwidth occupied by the NR-SSS can be the same as NR-PSS. In another embodiment, the transmission bandwidth occupied by the NR-SSS can be different from NR-PSS. In yet another embodiment, the SS block where the NR-SSS is transmitted can be the same as NR-PSS. In yet another embodiment, the SS block where the NR-SSS is transmitted can be different from NR-PSS (NR-PSS and NR-SSS can be transmitted in different SS blocks within a SS burst).

Note that some aspects on NR-SSS sequences can be related to/dependent on the aspects of NR-PSS sequences. For example, if NR-PSS contains part of the cell ID, NR-SSS only contains the other part of the cell ID, and if NR-PSS contains no cell ID information, NR-SSS contains the entire cell ID information. The other aspects on NR-SSS and NR-PSS can be unrelated or independent. For example, the design of sequence type and sequence length of NR-PSS and NR-SSS can be independent, either the same or different.

Also note that the aspects on NR-SSS sequence can be related. For example, if NR-SSS is constructed using channel coding and rate matching, transmission timing of NR-SS within the SS block can be explicitly adding extra information bits before encoding, and if NR-SSS is constructed using family of sequences with particular property (e.g. M-sequence, ZC-sequence, or other sequence with CAZAC property), transmission timing of NR-SS within the SS block can rely on adding extra number of hypotheses in addition to the cell ID.

Combinations of the aforementioned embodiments are supported in this disclosure. NR-SSS sequences showing the combination of above aspects are illustrated in TABLE 2, and other possible combinations are not excluded in the disclosure. Note that systems within the same cell in the left column can use the same or different NR-SSS sequence in the right column. Systems supporting multiple numerologies (systems with the same carrier frequency and transmission bandwidth but different subcarrier spacing, corresponding to different cells within different rows in the left column in TABLE 2) can use a common NR-SSS sequence according the default numerology or a numerology-specific NR-SSS sequence listed in the right column. TABLE 2 only shows example with maximum number of REs/subcarriers for NR-PSS transmission $N_{RE}=144$, and design for NR-SSS sequences in other systems with other value of the maximum number of subcarriers can be scaled (e.g. scale the sequence length and number of subcarriers mapped for NR-SSS) based on the one in TABLE 2, similar to the scaling method as shown in TABLE 1 for the design of NR-PSS.

TABLE 2

NR-SSS sequence design

| Systems | NR-SSS Sequence Design Examples |
|---|---|
| <6 GHz carrier frequency with 5 MHz synchronization transmission bandwidth and 30 kHz subcarrier spacing or 6 GHz carrier frequency with 10 MHz synchronization transmission bandwidth and 60 kHz subcarrier spacing or <6 GHz carrier frequency with 20 MHz synchronization transmission bandwidth and 120 kHz subcarrier spacing (maximum number of REs/subcarriers for NR-SSS transmission $N_{RE}=144$, no beam sweeping) | A sequence with length $L_{SSS} = 2 \cdot L_M$ is a combination of two M-sequences, each M-sequence with length $L_M$ (e.g. $L_M = 63$ or 65 or 66), which is mapped across the middle $2 \cdot L_M$ (e.g. 126 or 130 or 132) subcarriers within the $N_{RE} = 144$ subcarriers available for the NR-SSS transmission in the frequency domain, where the NR-SSS is not multiplexed with other signals in the frequency domain. Up to $L_M \cdot L_M$ (e.g. 3969 or 4225 or 4356) hypotheses are supported by this NR-SSS sequence to cover up to $C_{SSS} \leq L_M \cdot L_M/2$ cell IDs (e.g. $C_{SSS} = 504$ or 1008 cell IDs assuming no cell ID information in NR-PSS), if 2 possible locations of NR-SSS transmissions needs to be indicated within a SS burst; and to cover up to $C_{SSS} \leq L_M \cdot L_M$ cell IDs (e.g. $C_{SSS} = 504$ or 1008 or 2016 cell IDs assuming no cell ID information in NR-PSS), if only one possible location of NR-SSS transmission is supported within a SS burst (no indication). A sequence with length $L_{SSS} = 2 \cdot L_M$ is a combination of two M-sequences, each M-sequence with length $L_M$, which is mapped across the middle $2 \cdot L_M$ subcarriers within the $\kappa_{SSS} \cdot N_{RE}$ subcarriers available for the NR-SSS transmission in the frequency domain, where the NR-SSS is multiplexed with other signals (e.g. NR-PSS and/or NR-PBCH and/or repetition of NR-SSS) in the frequency domain. For example, $\kappa_{SSS} = 0.5$, $L_M = 30$ or 31, then up to $L_M \cdot L_M$ (e.g. 900 or 961) hypotheses are supported by this NR-SSS sequence to cover up to $C_{SSS} \leq L_M \cdot L_M/2$ cell IDs (e.g. $C_{SSS} = 168$ or 336 cell IDs assuming part of cell ID information in NR-PSS), if 2 possible locations of NR-SSS transmissions needs to be indicated within a SS burst; and to cover up to $C_{SSS} \leq L_M \cdot L_M$ cell IDs (e.g. $C_{SSS} = 168$ or 336 or 672 cell IDs assuming part of cell ID information in NR-PSS), if only one possible location of NR-SSS transmission is supported within a SS burst (no indication). One of the ZC-sequences with $1 < M_{SSS} \leq L_{SSS} - 1$ (e.g. $M_{SSS} = 126$) different root index and/or $S_{SSS} \geq 1$ ($S_{SSS} = 5$ or 10) cyclic shifts and length $L_{SSS} \leq N_{RE}$ (e.g. $L_{SSS} = 127$ or 131 or 133), which is mapped across the middle $L_{SSS} - 1$ subcarriers (middle element truncated) within the $N_{RE} = 144$ subcarriers available for the NR-PSS transmission in the frequency domain, where the NR-PSS is not multiplexed with other signals in the frequency domain. Up to $M_{SSS} \cdot S_{SSS}$ |

TABLE 2-continued

NR-SSS sequence design

| Systems | NR-SSS Sequence Design Examples |
|---|---|
| | hypotheses are supported by this NR-SSS sequence to cover up to $C_{SSS} \leq M_{SSS} \cdot S_{SSS}/2$ cell IDs (e.g. $C_{SSS}$ = 504 cell IDs assuming no cell ID information in NR-PSS), if 2 possible locations of NR-SSS transmissions needs to be indicated within a SS burst; and to cover up to $C_{SSS} \leq M_{SSS} \cdot S_{SSS}/2$ cell IDs (e.g. $C_{SSS}$ = 504 or 1008 cell IDs assuming no cell ID information in NR-PSS), if only one possible location of NR-SSS transmission is supported within a SS burst (no indication). One of the ZC-sequences with $1 < M_{SSS} \leq L_{SSS} - 1$ different root index and/or $S_{SSS} \geq 1$ cyclic shifts and length $L_{SSS} \leq N_{RE}$, which is mapped across the middle $L_{SSS} - 1$ subcarriers (middle element truncated) within the $\kappa_{SSS} \cdot N_{RE}$ subcarriers available for the NR-SSS transmission in the frequency domain, where the NR-SSS is multiplexed with other signals (e.g. NR-PSS and/or NR-PBCH and/or repetition of NR-SSS) in the frequency domain. For example, $\kappa_{SSS}$ = 0.5, $L_{SSS}$ = 31, $M_{SSS}$ = 30, $S_{SSS}$ = 12, then up to $M_{SSS} \cdot S_{SSS}$ (e.g. 480) hypotheses are supported by this NR-SSS sequence to cover up to $C_{SSS} \leq M_{SSS} \cdot S_{SSS}/2$ cell IDs (e.g. $C_{SSS}$ = 168 cell IDs assuming part of cell ID information in NR-PSS), if 2 possible locations of NR-SSS transmissions needs to be indicated within a SS burst; and to cover up to $C_{SSS} \leq M_{SSS} \cdot S_{SSS}$ cell IDs (e.g. $C_{SSS}$ = 168 or 336 cell IDs assuming part of cell ID information in NR-PSS), if only one possible location of NR-SSS transmission is supported within a SS burst (no indication). One of the generalized ZC-sequences (see some embodiments of component III) with $1 < M_{SSS} \leq L_{SSS} - 1$ (e.g. $M_{SSS}$ = 126) different root index and/or $S_{SSS} \geq 1$ ($S_{SSS}$ = 5 or 10) cyclic shifts and length $L_{SSS} \leq N_{RE}$ (e.g. $L_{SSS}$ = 127 or 131 or 133), which is mapped across the middle $L_{SSS} - 1$ subcarriers (middle element truncated) within the $N_{RE}$ = 144 subcarriers available for the NR-PSS transmission in the frequency domain, where the NR-PSS is not multiplexed with other signals in the frequency domain. Up to $M_{SSS} \cdot S_{SSS}$ hypotheses are supported by this NR-SSS sequence to cover up to $C_{SSS} \leq M_{SSS} \cdot S_{SSS}/2$ cell IDs (e.g. $C_{SSS}$ = 504 cell IDs assuming no cell ID information in NR-PSS), if 2 possible locations of NR-SSS transmissions needs to be indicated within a SS burst; and to cover up to $C_{SSS} \leq M_{SSS} \cdot S_{SSS}/2$ cell IDs (e.g. $C_{SSS}$ = 504 or 1008 cell IDs assuming no cell ID information in NR-PSS), if only one possible location of NR-SSS transmission is supported within a SS burst (no indication). One of the generalized ZC-sequences (see some embodiments of component III) with $1 < M_{SSS} \leq L_{SSS} - 1$ different root index and/or $S_{SSS} \geq 1$ cyclic shifts and length $L_{SSS} \leq N_{RE}$, which is mapped across the middle $L_{SSS} - 1$ subcarriers (middle element truncated) within the $\kappa_{SSS} \cdot N_{RE}$ subcarriers available for the NR-SSS transmission in the frequency domain, where the NR-SSS is multiplexed with other signals (e.g. NR-PSS and/or NR-PBCH and/or repetition of NR-SSS) in the frequency domain. For example, $\kappa_{SSS}$ = 0.5, $L_{SSS}$ = 31, $M_{SSS}$ = 30, $S_{SSS}$ = 12, then up to $M_{SSS} \cdot S_{SSS}$ (e.g. 480) hypotheses are supported by this NR-SSS sequence to cover up to $C_{SSS} \leq M_{SSS} \cdot S_{SSS}/2$ cell IDs (e.g. $C_{SSS}$ = 168 cell IDs assuming part of cell ID information in NR-PSS), if 2 possible locations of NR-SSS transmissions needs to be indicated within a SS burst; and to cover up to $C_{SSS} \leq M_{SSS} \cdot S_{SSS}$ cell IDs (e.g. $C_{SSS}$ = 168 or 336 cell IDs assuming part of cell ID information in NR-PSS), if only one possible location of NR-SSS transmission is supported within a SS burst (no indication). A sequence with length $L_{SSS}$ is constructed by coding from a transport block with at least A number of bits (see some embodiments of component IV), which is mapped across the middle $L_{SSS} - 1$ subcarriers (middle element truncated) within the $N_{RE}$ = 144 subcarriers available for the NR-PSS transmission in the frequency domain, where the NR-PSS is not multiplexed with other signals in the frequency domain. For example, A = 10, $L_{SSS}$ = 126 or 130, then the NR-SSS can cover up to 504 cell IDs and 2 possible locations of NR-SSS transmissions needs to be indicated within a SS burst, or cover up to 1008 cell IDs and only one possible location of NR-SSS transmission is supported within a SS burst (no indication). A sequence with length $L_{SSS}$ is constructed by coding from a transport block with at least A number of bits (see some embodiments of component V), which is mapped across the middle $L_{SSS} - 1$ subcarriers (middle element truncated) within the $\kappa_{SSS} \cdot N_{RE}$ subcarriers available for the NR-PSS transmission in the frequency domain, where the NR-SSS is multiplexed with other signals (e.g. NR-PSS and/or NR-PBCH and/or repetition of NR-SSS) in the frequency domain. For example, $\kappa_{SSS}$ = 0.5, A = 9, $L_{SSS}$ = 60 or 62, then the NR-SSS can cover up to 168 cell IDs and 2 possible locations of NR-SSS transmissions needs to be indicated within a SS burst, or cover up to 336 cell IDs and only one possible location of NR-SSS transmission is supported within a SS burst (no indication). |
| >6 GHz carrier frequency with 40 MHz synchronization transmission bandwidth and 240 kHz subcarrier spacing or >6 GHz carrier frequency with 80 MHz synchronization transmission bandwidth and 480 kHz subcarrier spacing (maximum number of REs/subcarriers for NR-SSS transmission $N_{RE}$ = 144, beam sweeping on $N_B$ directions/beams) | A sequence with length $L_{SSS} = 2 \cdot L_M$ is a combination of two M-sequences, each M-sequence with length $L_M$ (e.g. $L_M$ = 63 or 65 or 66), which is mapped across the middle $2 \cdot L_M$ (e.g. 126 or 130 or 132) subcarriers within the $N_{RE}$ = 144 subcarriers available for the NR-SSS transmission in the frequency domain, where the NR-SSS is not multiplexed with other signals in the frequency domain. Up to $L_M \cdot L_M$ (e.g. 3969 or 4225 or 4356) hypotheses are supported by this NR-SSS sequence to cover up to $C_{SSS} \leq L_M \cdot L_M/N_B$ cell IDs (e.g. $C_{SSS}$ = 168 cell IDs assuming part of cell ID information in NR-PSS), if $N_B$ = 14 beams for NR-SSS transmissions needs to be indicated within a SS burst. |

TABLE 2-continued

NR-SSS sequence design

| Systems | NR-SSS Sequence Design Examples |
|---|---|
| | A sequence with length $L_{SSS} = 2 \cdot L_M$ is a combination of two M-sequences, each M-sequence with length $L_M$, which is mapped across the middle $2 \cdot L_M$ subcarriers within the $\kappa_{SSS} \cdot N_{RE}$ subcarriers available for the NR-SSS transmission in the frequency domain, where the NR-SSS is multiplexed with other signals (e.g. NR-PSS and/or NR-PBCH and/or repetition of NR-SSS) in the frequency domain. For example, $\kappa_{SSS} = 0.5$, $L_M = 30$ or 31, then up to $L_M \cdot L_M$ (e.g. 900 or 961) hypotheses are supported by this NR-SSS sequence to cover up to $C_{SSS} \leq L_M \cdot L_M/N_B$ cell IDs (e.g. $C_{SSS} = 84$ cell IDs assuming part of cell ID information in NR-PSS), if $N_B = 7$ beams for NR-SSS transmissions needs to be indicated within a SS burst. |
| | One of the ZC-sequences with $1 < M_{SSS} \leq L_{SSS} - 1$ (e.g. $M_{SSS} = 126$) different root index and/or $S_{SSS} \geq 1$ ($S_{SSS} = 20$) cyclic shifts and length $L_{SSS} \leq N_{RE}$ (e.g. $L_{SSS} = 127$ or 131 or 133), which is mapped across the middle $L_{SSS} - 1$ subcarriers (middle element truncated) within the $N_{RE} = 144$ subcarriers available for the NR-PSS transmission in the frequency domain, where the NR-PSS is not multiplexed with other signals in the frequency domain. Up to $M_{SSS} \cdot S_{SSS}$ hypotheses are supported by this NR-SSS sequence to cover up to $C_{SSS} \leq M_{SSS} \cdot S_{SSS}/N_B$ cell IDs (e.g. $C_{SSS} = 168$ cell IDs assuming part of cell ID information in NR-PSS), if $N_B = 14$ beams for NR-SSS transmissions needs to be indicated within a SS burst. |
| | One of the ZC-sequences with $1 < M_{SSS} \leq L_{SSS} - 1$ different root index and/or $S_{SSS} \geq 1$ cyclic shifts and length $L_{SSS} \leq N_{RE}$, which is mapped across the middle $L_{SSS} - 1$ subcarriers (middle element truncated) within the $\kappa_{SSS} \cdot N_{RE}$ subcarriers available for the NR-SSS transmission in the frequency domain, where the NR-SSS is multiplexed with other signals (e.g. NR-PSS and/or NR-PBCH and/or repetition of NR-SSS) in the frequency domain. For example, $\kappa_{SSS} = 0.5$, $L_{SSS} = 31$, $M_{SSS} = 30$, $S_{SSS} = 20$, then up to $M_{SSS} \cdot S_{SSS}$ (e.g. 600) hypotheses are supported by this NR-SSS sequence to cover up to $C_{SSS} \leq M_{SSS} \cdot S_{SSS}/N_B$ cell IDs (e.g. $C_{SSS} = 84$ cell IDs assuming part of cell ID information in NR-PSS), if $N_B = 7$ beams for NR-SSS transmissions needs to be indicated within a SS burst. |
| | One of the generalized ZC-sequences (see some embodiments of component III) with $1 < M_{SSS} \leq L_{SSS} - 1$ (e.g. $M_{SSS} = 126$) different root index and/or $S_{SSS} \geq 1$ ($S_{SSS} = 20$) cyclic shifts and length $L_{SSS} \leq N_{RE}$ (e.g. $L_{SSS} = 127$ or 131 or 133), which is mapped across the middle $L_{SSS} - 1$ subcarriers (middle element truncated) within the $N_{RE} = 144$ subcarriers available for the NR-PSS transmission in the frequency domain, where the NR-PSS is not multiplexed with other signals in the frequency domain. Up to $M_{SSS} \cdot S_{SSS}$ hypotheses are supported by this NR-SSS sequence to cover up to $C_{SSS} \leq M_{SSS} \cdot S_{SSS}/N_B$ cell IDs (e.g. $C_{SSS} = 168$ cell IDs assuming part of cell ID information in NR-PSS), if $N_B = 14$ beams for NR-SSS transmissions needs to be indicated within a SS burst. |
| | One of the generalized ZC-sequences (see some embodiments of component III) with $1 < M_{SSS} \leq L_{SSS} - 1$ different root index and/or $S_{SSS} \geq 1$ cyclic shifts and length $L_{SSS} \leq N_{RE}$, which is mapped across the middle $L_{SSS} - 1$ subcarriers (middle element truncated) within the $\kappa_{SSS} \cdot N_{RE}$ subcarriers available for the NR-SSS transmission in the frequency domain, where the NR-SSS is multiplexed with other signals (e.g. NR-PSS and/or NR-PBCH and/or repetition of NR-SSS) in the frequency domain. For example, $\kappa_{SSS} = 0.5$, $L_{SSS} = 31$, $M_{SSS} = 30$, $S_{SSS} = 20$, then up to $M_{SSS} \cdot S_{SSS}$ (e.g. 600) hypotheses are supported by this NR-SSS sequence to cover up to $C_{SSS} \leq M_{SSS} \cdot S_{SSS}/N_B$ cell IDs (e.g. $C_{SSS} = 84$ cell IDs assuming part of cell ID information in NR-PSS), if $N_B = 7$ beams for NR-SSS transmissions needs to be indicated within a SS burst. |
| | A sequence with length LSSS is constructed by coding from a transport block with at least A number of bits (see some embodiments of component IV), which is mapped across the middle $L_{SSS} - 1$ subcarriers (middle element truncated) within the $N_{RE} = 144$ subcarriers available for the NR-PSS transmission in the frequency domain, where the NR-PSS is not multiplexed with other signals in the frequency domain. For example, $A = 13$, $L_{SSS} = 126$ or 130, then the NR-SSS can cover up to 504 cell IDs and $N_B = 14$ beams for NR-SSS transmissions needs to be indicated within a SS burst. |
| | A sequence with length $L_{SSS}$ is constructed by coding from a transport block with at least A number of bits (see some embodiments of component IV), which is mapped across the middle $L_{SSS} - 1$ subcarriers (middle element truncated) within the $\kappa_{SSS} \cdot N_{RE}$ subcarriers available for the NR-PSS transmission in the frequency domain, where the NR-SSS is multiplexed with other signals (e.g. NR-PSS and/or NR-PBCH and/or repetition of NR-SSS) in the frequency domain. For example, $K_{SSS} = 0.5$, $A = 13$, $L_{SSS} = 60$ or 62, then the NR-SSS can cover up to 504 cell IDs and $N_B = 14$ beams for NR-SSS transmissions needs to be indicated within a SS burst. |
| <6 GHz carrier frequency with 5 MHz synchronization transmission bandwidth and 15 kHz subcarrier spacing or <6 GHz carrier frequency with 10 MHz synchronization transmission bandwidth and 30 kHz subcarrier spacing or <6 GHz carrier frequency with 20 MHz synchronization transmission bandwidth and 60 kHz subcarrier spacing or >6 GHz carrier frequency with 40 MHz synchronization transmission bandwidth and 120 kHz subcarrier spacing | A sequence with length $L_{SSS} = 2 \cdot L_M$ is a combination of two interleaved M-sequences, each M-sequence with length $L_M$ (e.g. $L_M = 127$), which is mapped across the middle $2 \cdot L_M$ (e.g. 254) subcarriers within the $N_{RE} = 288$ subcarriers available for the NR-SSS transmission in the frequency domain, where the NR-SSS is not multiplexed with other signals in the frequency domain within the synchronization transmission bandwidth. Up to $L_M \cdot L_M$ (e.g. 16129) hypotheses are supported by this NR-SSS sequence to cover up to $C_{SSS} \leq L_M \cdot L_M/N_b$ cell IDs (e.g. $C_{SSS} = 504$ or 1008), if $N_b$ possible locations of NR-SSS transmissions needs to be indicated; or to cover up to $C_{SSS} \leq L_M \cdot L_M$ cell IDs (e.g. $C_{SSS} = 504$ or 1008), if no SS block timing |

TABLE 2-continued

NR-SSS sequence design

| Systems | NR-SSS Sequence Design Examples |
|---|---|
| or<br><6 GHz carrier frequency with 80 MHz synchronization transmission bandwidth and 240 kHz subcarrier spacing (maximum number of REs/subcarriers for NR-PSS transmission $N_{RE}$ = 288) | indication is not combined with cell ID indication (e.g. through further scrambling in NR-SSS or using other signals/channels).. For example, for single-beam system, if NR-SS periodicity is 5 ms, $N_b$ = 2 timing hypotheses need to be indicated by NR-SSS. For another example, for multi-beam system, there can be $N_b$ number of timing hypotheses need to be indicated by NR-SSS, where $N_b$ is smaller than or equal to the number of SS block index within a SS burst set. |
| <6 GHz carrier frequency with 5 MHz synchronization transmission bandwidth and 30 kHz subcarrier spacing<br>or<br><6 GHz carrier frequency with 10 MHz synchronization transmission bandwidth and 60 kHz subcarrier spacing<br>or<br><6 GHz carrier frequency with 20 MHz synchronization transmission bandwidth and 120 kHz subcarrier spacing<br>or<br>>6 GHz carrier frequency with 40 MHz synchronization transmission bandwidth and 240 kHz subcarrier spacing<br>or<br><6 GHz carrier frequency with 80 MHz synchronization transmission bandwidth and 480 kHz subcarrier spacing (maximum number of REs/subcarriers for NR-PSS transmission $N_{RE}$ = 144) | A sequence with length $L_{SSS}$ = 2 · $L_M$ is a combination of two interleaved M-sequences, each M-sequence with length $L_M$ (e.g. $L_M$ = 63), which is mapped across the middle 2 · $L_M$ (e.g. 126) subcarriers within the $N_{RE}$ = 144 subcarriers available for the NR-SSS transmission in the frequency domain, where the NR-SSS is not multiplexed with other signals in the frequency domain within the synchronization transmission bandwidth. Up to $L_M$ · $L_M$ (e.g. 3969) hypotheses are supported by this NR-SSS sequence to cover up to $C_{SSS}$ ≤ $L_M$ · $L_M/N_b$ cell IDs (e.g. $C_{SSS}$ = 504 or 1008), if $N_b$ possible locations of NR-SSS transmissions needs to be indicated; or to cover up to $C_{SSS}$ ≤ $L_M$ · $L_M$ cell IDs (e.g. $C_{SSS}$ = 504 or 1008), if no SS block timing indication is not combined with cell ID indication (e.g. through further scrambling in NR-SSS or using other signals/channels). For example, for single-beam system, if NR-SS periodicity is 5 ms, $N_b$ = 2 timing hypotheses need to be indicated by NR-SSS. For another example, for multi-beam system, there can be $N_b$ number of timing hypotheses need to be indicated by NR-SSS, where $N_b$ is smaller than or equal to the number of SS block index within a SS burst set. |

In some embodiments of component III, ZC sequences are used in the design of PSS, preamble of random access channel (PRACH), sounding reference signals (SRS), etc. ZC sequences belong to the class of poly-phase sequences (each term being a complex root of unity) with ideal cyclic autocorrelation (CAZAC property), having at the same time optimal cross-correlation, which means that the lower bound on the maximum magnitude of the periodic cross-correlation can be achieved.

ZC sequences $\{a_{k,r}\}$ of length $L_{ZC}$ and root r are defined as $$a_{k,r} = \begin{cases} W_{L_{ZC},r}^{\frac{k^2}{2}+qk}, & k = 0, 1, \ldots, L_{ZC}-1, \text{ if } L_{ZC} \text{ is even} \\ W_{L_{ZC},r}^{\frac{k(k+1)}{2}+qk}, & k = 0, 1, \ldots, L_{ZC}-1, \text{ if } L_{ZC} \text{ is odd} \end{cases}$$

where q is any integer, and $W_{n,r}$ is a primitive root of unity $$W_{n,r} = \exp\left(-\frac{j2\pi r}{n}\right),$$

r is any integer relatively prime to n, and 0<r<n.

For example, for the construction of PSS sequence in LTE system, q is set to be 0, and root indices r=25, 29, 34 are chosen to indicate 3 physical layer identities within each group of cells.

In NR, for the construction of the NR-PSS and NR-SSS sequences, at least one of the sequences in a generalized class of poly-phase sequences with CAZAC property and optimal cross-correlation can be used, which is based on ZC sequences $\{a_{k,r}\}$ of length $L_{ZC}$=l·m² where l and m are any positive integers. Let $\{b_i\}$, i=0, 1, ..., m−1, be any complex sequence of absolute value 1. Then a generalized ZC sequence $\{s_{k,r}\}$ with length $L_{GZC}$ and root r is defined as $s_{k,r}=a_{k,r}\cdot b_{k \bmod m}$ for k=0, 1, ..., $L_{GZC}$−1.

For example, $\{s_{k,r}\}$ of length $L_{GZC}$=63 (e.g. l=7, and m=3) with root r and q=0 is given by $\{b_0, b_1 W_{63,r}^2, b_2 W_{63,r}^9, b_0 W_{63,r}^{24}, \ldots, b_1 W_{63,r}^{62}, b_2\}$.

Note that if $b_i$ is taken to be 1 for all i=0, 1, ..., m−1, then the generalized ZC sequence of length $L_{GZC}$ and root r reduces to the ZC sequence of length $L_{ZC}$=$L_{GZC}$ and root r. Also note that for some sequence length $L_{GZC}$, there can be different pairs of (l,m) such that $L_{GZC}$=l·m², which results in different constructions of the generalized ZC sequence.

In one embodiment, the length of the generalized ZC sequence $L_{GZC}$=l·1 where m is set to 1, then the generalized ZC sequence is a scaled version of the ZC sequence, i.e., $s_{k,r}=b_0\cdot a_{k,r}$.

In another embodiment, the length of the generalized ZC sequence $L_{GZC}$=l·m², where l is set to 1, then the resulting sequence corresponds to the so called Frank sequence which is widely used in spread-spectrum wireless communications.

In yet another embodiment, the length of the generalized ZC sequence $L_{GZC}$=l·2², where m is set to 2, and the $\{b_i\}$ sequence can be chosen to be $b_0$=1, $b_1$=−1.

In yet another embodiment, $\{b_i\}$ is taken to be exp $$\left(-\frac{j2\pi \bar{f}}{N_{FFT}}\right)$$

for all i=0, 1, ..., m−1, where $\bar{f}$ is the average of the frequency offset range, and $N_{FFT}$ is the size of the FFT for OFDM.

In one embodiment, the generalized ZC sequences can be utilized for the construction of NR-PSS. In another embodiment, the generalized ZC sequences with possibly cyclic shifts to increase the total number of supported hypotheses can be utilized for the construction of NR-SSS.

In one embodiment, the length of generalized ZC sequences $L_{GZC}$ can be determined by the available number of resource elements/subcarriers in frequency domain for the transmission of NR-PSS and/or NR-SSS. The constructed NR-PSS and/or NR-SSS using generalized ZC sequences can be mapped across the middle $L_{GZC}$−1 subcarriers (middle element truncated) within the $N_{RE}$ subcarriers available for the NR-PSS and/or NR-SSS transmission in the frequency domain.

In one example, if the available number of resource elements is $N_{RE}$=144 (e.g. 5 MHz with 30 kHz subcarrier spacing or 40 MHz with 240 kHz subcarrier spacing), the length of generalized ZC sequences can be 127 or 131 or 133.

In another example, if the available number of resource elements is $N_{RE}$=72 (e.g. 5 MHz with 60 kHz subcarrier spacing or 40 MHz with 480 kHz subcarrier spacing), the length of generalized ZC sequences can be 61 or 63.

In yet another example, if the available number of resource elements is $N_{RE}=288$ (e.g. 5 MHz with 15 kHz subcarrier spacing or 40 MHz with 120 kHz subcarrier spacing), the length of generalized ZC sequences can be 255 or 263 or 271.

In some embodiments of component IV, NR-SS and NR-PBCH, NR-PSS, NR-SSS and/or NR-PBCH can be transmitted within an SS block; one or multiple SS block(s) compose an SS burst; one or multiple SS burst(s) compose an SS burst set. For example, the following alternatives can be considered.

Figure 13:
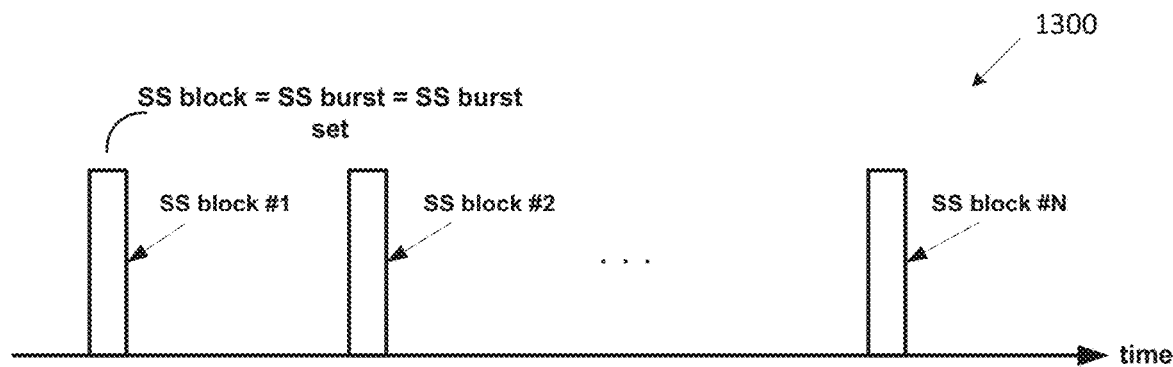
FIG. 13 illustrates an example SS burst including an SS block according to embodiments of the present disclosure.

FIG. 13 illustrates an example SS burst including an SS block 1300 according to embodiments of the present disclosure. The embodiment of the SS burst including an SS block 1300 illustrated in FIG. 13 is for illustration only. FIG. 13 does not limit the scope of this disclosure to any particular implementation of the SS burst including an SS block 1300.

In one embodiment of alternative 1, Each SS burst has only one SS block, and one SS burst compose an SS burst set as shown in FIG. 13. Note that the sequences transmitted in each SS block may or may not be the same. For example, in LTE system, two neighboring SS blocks are transmitted within one radio frame, and the SSS sequences are different.

Figure 14:
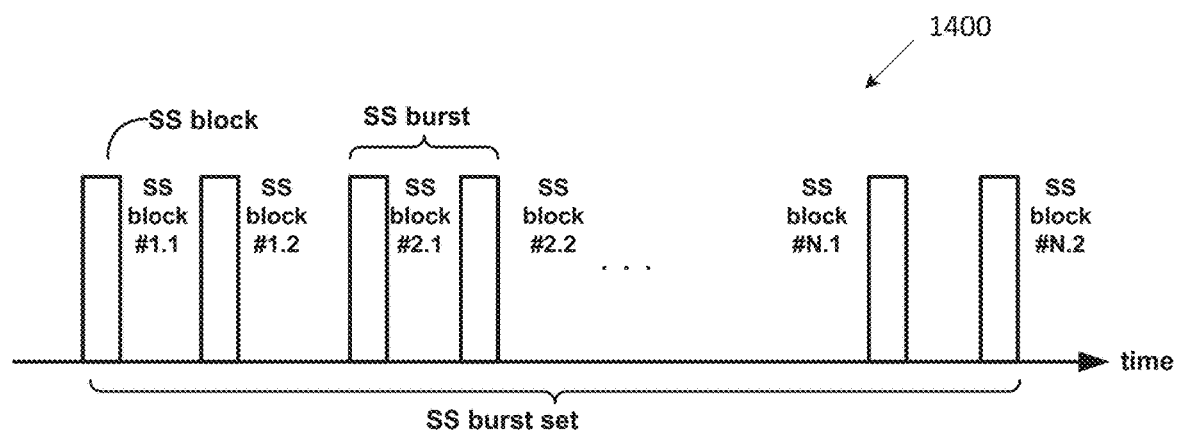
FIG. 14 illustrates an example SS burst including multiple non-successive SS blocks according to embodiments of the present disclosure.

FIG. 14 illustrates an example SS burst including multiple non-successive SS blocks 1400 according to embodiments of the present disclosure. The embodiment of the SS burst including multiple non-successive SS blocks 1400 illustrated in FIG. 14 is for illustration only. FIG. 14 does not limit the scope of this disclosure to any particular implementation of the SS burst including multiple non-successive SS blocks 1400.

In one embodiment of alternative 2, each SS burst has multiple non-successive SS blocks, and one or multiple SS burst(s) compose an SS burst set as shown in FIG. 14 giving an example of SS burst consisted from two SS blocks.

Figure 15:
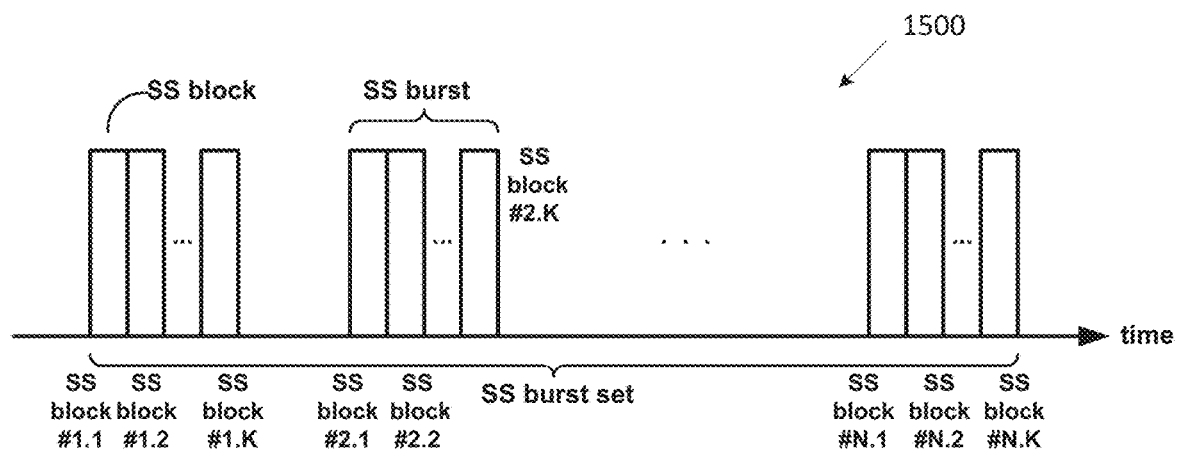
FIG. 15 illustrates an example SS burst including multiple successive SS blocks according to embodiments of the present disclosure.

FIG. 15 illustrates an example SS burst including multiple successive SS blocks 1500 according to embodiments of the present disclosure. The embodiment of the SS burst including multiple successive SS blocks 1500 illustrated in FIG. 15 is for illustration only. FIG. 15 does not limit the scope of this disclosure to any particular implementation of the SS burst including multiple successive SS blocks 1500.

In one embodiment of alternative 3, each SS burst has multiple successive SS blocks, and one or multiple SS burst(s) compose an SS burst set as shown in FIG. 15. System with one burst of beam sweeping can be considered as an example of this alternative.

Figure 16:
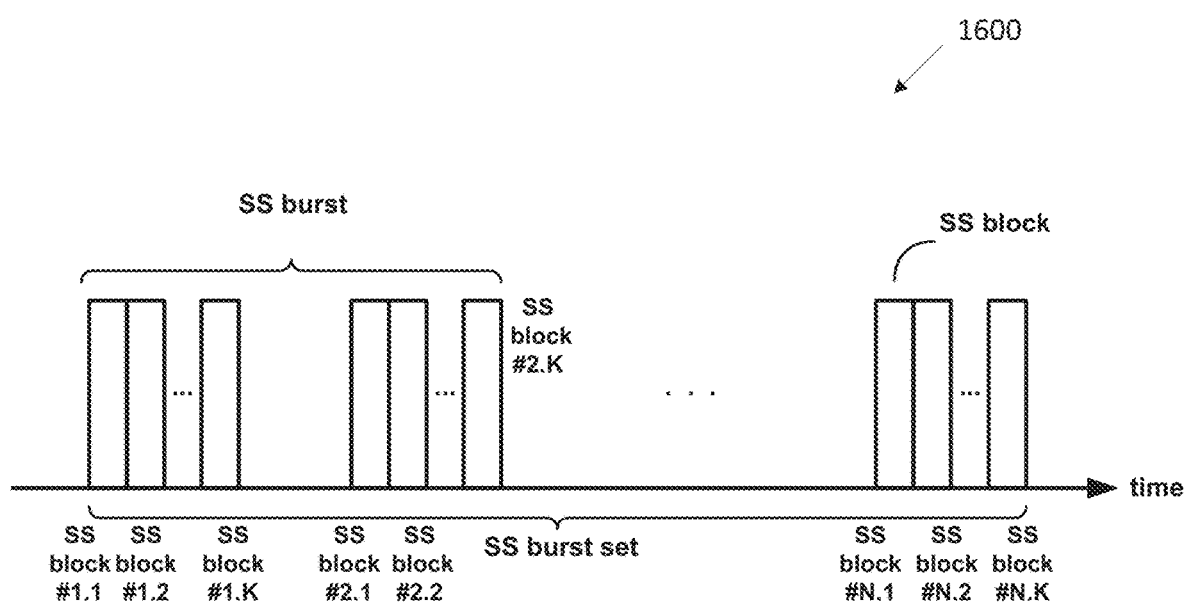
FIG. 16 illustrates another example SS burst including multiple successive SS blocks according to embodiments of the present disclosure.

FIG. 16 illustrates another example SS burst including multiple successive SS blocks 1600 according to embodiments of the present disclosure. The embodiment of the SS burst including multiple successive SS blocks 1600 illustrated in FIG. 16 is for illustration only. FIG. 16 does not limit the scope of this disclosure to any particular implementation of the SS burst including multiple successive SS blocks 1600.

In one embodiment of alternative 4, each SS burst has multiple successive SS blocks and the SS blocks can be divided into multiple non-successive sub-bursts, and one or multiple SS burst(s) compose an SS burst set as shown in FIG. 16. System with multiple bursts of beam sweeping can be considered as an example of this alternative.

The coding-based (also referred as message-based) transmission of NR-SSS can utilize the following options for a given range of carrier frequencies. In one embodiment of option 1, one or more transport blocks of NR-SSS is coded and mapped into the REs within a single SS block. This option can be utilized for all above alternatives (either above 6 GHz systems with beam sweeping, or in below 6 GHz systems with no beam sweeping), where each of the transmission of NR-SSS within the SS block is encoded separately. If the number of resource elements for the transmission of NR-SSS within each SS block is denoted as $N_1$, and the number of bits for each symbol in the modulation scheme is denoted as $N_{mod}$, then output from channel coding and rate matching has $E=N_1 \cdot N_{mod}$ bits. For example, each NR-SSS is transmitted using 62 resource elements within a SS block, and the modulation scheme is QPSK, then $E=124$. For another example, each NR-SSS is transmitted using 126 resource elements within a SS block, and the modulation scheme is QFSK, then $E=252$.

In one embodiment of option 2, one or more transport blocks of NR-SSS is coded and mapped into the REs within multiple SS blocks, where the SS blocks have the same timing information within the SS burst (e.g. including subframe timing and symbol timing within a radio frame). This option can be utilized for all above alternatives (either above 6 GHz systems with beam sweeping, or in below 6 GHz systems with no beam sweeping), but the application to alternative 1 is the same as option 1 if sequences transmitted in all SS blocks are the same. In this option, the NR-SSSs within multiple SS blocks can be jointly coded. If the number of resource elements for the transmission of NR-SSS within each SS block is denoted as $N_1$, the number of SS blocks jointly coded for the same transport block of NR-SSS is denoted as $N_2$, and the number of bits for each symbol in the modulation scheme is denoted as $N_{mod}$, then the output from channel coding and rate matching has $E=N_1 \cdot N_2 \cdot N_{mod}$ bits. Note that option 1 can be considered as a special case of option 2 with $N_2=1$. For example, each NR-SSS is transmitted using 62 resource elements within a SS block, four SS blocks are jointly coded (e.g., FIG. 15, for example, the SS blocks with the same k are jointly coded ($1 \leq k \leq K$)), and the modulation scheme is QPSK, then $E=496$. Note that the number of SS blocks to be jointly coded does not necessarily equal to the number of SS bursts within a SS burst set.

In one embodiment of option 3, one or more transport blocks of NR-SSS is coded and mapped into the REs within multiple SS blocks, where the SS blocks may not have the same timing information within the SS burst (e.g. including subframe timing and symbol timing within a radio frame). This option can be utilized for all above alternatives (either above 6 GHz systems with beam sweeping, or in below 6 GHz systems with no beam sweeping), but the application to alternative 1 is the same as option 1 and option 2 if sequences transmitted in all SS blocks are the same. In this option, the NR-SSSs within multiple SS blocks are jointly coded, but timing information cannot be part of the transport block of NR-SSS, since NR-SSS with different timing information cannot be jointly coded if transport block(s) of NR-SSS contains timing information. In this option, timing information can be transmitted explicitly using a separate codeword in NR-SSS, or implicitly indicated by NR-SSS (e.g. introducing frequency offset or cyclic shifts to distinguish the SS blocks), or explicitly transmitted and/or implicitly indicated by other signal/channels (e.g. NR-PBCH).

If the number of resource elements for the transmission of NR-SSS within each SS block is denoted as $N_1$, the number of SS blocks jointly coded for the same transport block of NR-SSS is denoted as $N_2$, and the number of bits for each symbol in the modulation scheme is denoted as $N_{mod}$, then output from channel coding and rate matching has $E=N_1 \cdot N_2 \cdot N_{mod}$ bits. For example, each NR-SSS is transmitted using 62 resource elements within a SS block, four SS blocks are jointly coded, and the modulation scheme is QPSK, then E=496. Note that the number of SS blocks to be jointly coded in this option can be selected from any SS blocks within the SS burst set, for example all from the same burst, or all from different bursts within the burst set, or part from the same burst and the rest from different bursts.

Figure 17:
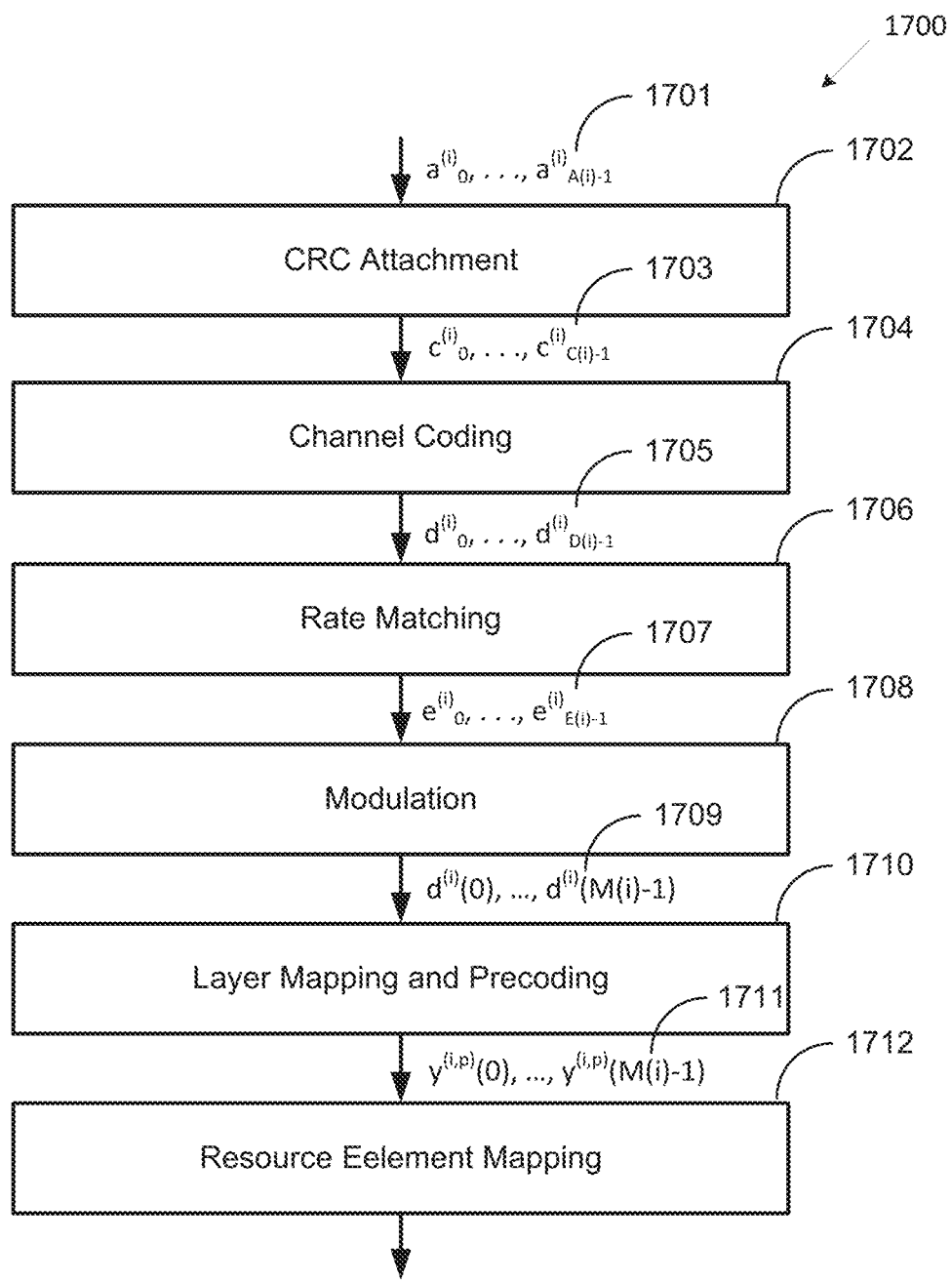
FIG. 17 illustrates a flow chart of NR-SSS construction according to embodiments of the present disclosure.

FIG. 17 illustrates a flow chart of NR-SSS construction 1700 according to embodiments of the present disclosure. The embodiment of the NR-SSS construction 1700 illustrated in FIG. 17 is for illustration only. FIG. 17 does not limit the scope of this disclosure to any particular implementation of the NR-SSS construction 1700.

General steps for construction of NR-SSS based on coding are shown in FIG. 17. This flowchart is applicable to all above options. Note that modules or part of the functionalities within the modules in the flow chart can be set as default values such that they do not have any impact.

The payload of physical cell ID contained in NR-SSS is denoted as $n_1$, where it may corresponds to the whole or part of the cell ID based on the design of NR-PSS. For example, if the number of physical cell IDs contained in NR-SSS is 168 (e.g. as in LTE system), $n_1$=8. For another example, if the number of physical cell IDs contained in NR-SSS is 504 (all cell ID information is contained in NR-SSS), $n_1$=9. The number of bits to indicate the timing information of NR-SSS transmitted within a SS burst set or within a radio frame (e.g. SS block index) is denoted as $n_2$ (where $n_2 \geq 0$), e.g. including the subframe timing and/or symbol timing within a radio frame. For example, if only one SS block is transmitted within each SS burst set or radio frame, then $n_2$=0 (no need to code this information). For another example, if two SS blocks are transmitted within each SS burst set or radio frame, then $n_2$=1. For yet another example, if NR-SSS is transmitted in a beam seeping pattern for >6 GHz multi-beam operation system, and the number of beam in each beam sweeping burst is 14, and if one radio frame or SS burst set only have one SS burst, then $n_2$=4. If two bursts of beam sweeping are performed in a radio frame or SS burst set, then $n_2$=5. The number of reserved bits for other purpose is denoted as $n_3$, where $n_3 \geq 0$.

In one embodiment, all the payload bits are encoded into a single codeword. Then, the total payload of transport block in NR-PSS before adding CRC is denoted as $A(i) = n_1 + n_2 + n_3$ and i=1, and the entire transport block is denoted as $a_0^{(i)}, \ldots, a_{A(i)-1}^{(i)}$, (1701 as shown in FIG. 17).

In another embodiment, the payload bits indicating the cell ID and SS block index are encoded separately to generate two codewords. Then, the total payloads of transport blocks in NR-SSS before adding CRC are denoted as $A(1) = n_1 + n_3^{(1)}$ and $A(2) = n_2 + n_3^{(2)}$ correspondingly ($n_3^{(1)} + n_3^{(2)} = n_3$), and each of the transport block is denoted as $a_0^{(i)}, \ldots, a_{A(i)-1}^{(i)}$, and i=1, 2 (1701 as shown in FIG. 17). The first set of message bits can be common through different SS blocks, and can be combined at the receiver across multiple received NR-SSSs; while the second set of message bits may be different across multiple SS blocks, and may not be combined at the receiver across multiple received NR-SSSs.

In yet another embodiment, part of the payload bits is encoded into a single codeword. For example, SS block index is not encoded in the codeword. Then, the total payload of transport block in NR-PSS before adding CRC is denoted as $A(i) = n_1 + n_3$ and i=1, and the entire transport block is denoted as $a_0^{(i)}, \ldots, a_{A(i)-1}^{(i)}$, (1701 as shown in FIG. 17). The rest information (e.g. SS block index information) can be explicitly or implicitly indicated in other ways (e.g. using different frequency offset or cyclic shifts).

In CRC attachment module (1702 as shown in FIG. 17), the entire transport block for each codeword is used to calculate the CRC parity bits, and the generated parity bits are denoted as $p_0^{(i)}, \ldots, p_{L(i)-1}^{(i)}$. L(i) is the length of parity check bits, or equivalently the length of CRC, for each codeword. If there are multiple codewords to be encoded (i>1), the L(i) can be the same or different for each codeword. For instance, L(i) can equal to 0 (no CRC attachment), or 8, or 16, or 24, and chosen independently for each codeword. For one example, L(1)=8 and L(2)=0. After the generation of CRC bits, a CRC mask $x_0^{(i)}, \ldots, x_{L(i)-1}^{(i)}$ can be utilized to scramble the CRC sequence according to the gNB transmit antenna configuration. The output from scrambling is given by $c_0^{(i)}, \ldots, c_{K(i)-1}^{(i)}$ (1703 as shown in FIG. 17), where $c_k^{(i)} = a_k^{(i)}$ for k=0, ..., A(i)−1, and $c_k^{(i)} = (p_{k-A(i)}^{(i)} + x_{k-A(i)}^{(i)}) \mod 2$ for k=A(i), ..., A(i)+L(i)−1. Note that by choosing $x_l^{(i)}$=0 for all $0 \leq l \leq L(i)-1$, the scrambling procedure has no impact to the CRC bits. In one embodiment, the choice of CRC mask can be the same as the one for NR-PBCH for a particular number of transmit antenna ports.

The information bits input to the channel coding module (1704 as shown in FIG. 17) are denoted by $c_0^{(i)}, \ldots, c_{K(i)-1}^{(i)}$, where C(i)=A(i)+L(i) denotes the number of information bits to be encoded for codeword i. Channel coding codes can be utilized on the information bits to generate the encoded codeword(s) $d_0^{(i)}, \ldots, d_{D(i)-1}^{(i)}$ (1705 as shown in FIG. 17). One or multiple of the channel coding schemes can be utilized for this module. Note that if there are multiple codewords to be encoded (i>1), the channel coding scheme can be the same or different for each codeword.

In one example, Reed-Muller (RM) codes can be utilized to generate the encoded codeword, where D(i)>C(i) and C(i)/D(i) is the rate of RM codes. In another example, tail biting convolutional codes (TBCC) can be utilized to generate the encoded codeword, where D(i)=C(i) and three streams of codes are output by the rate-1/3 TBCC encoder (encoded codewords can be denoted as $d_0^{(i,s)}, \ldots, d_{D(i)-1}^{(i,s)}$ where s=0, 1, 2). In yet another example, low-density parity-check (LDPC) codes can be utilized to generate the encoded codeword, where D(i)>C(i) and C(i)/D(i) is the rate of LDPC codes. In yet another example, polar codes can be utilized to generate the encoded codeword, where D(i)>C(i) and C(i)/D(i) is the rate of polar codes. In yet another example, Turbo codes can be utilized to generate the encoded codeword, where D(i)=C(i) and three streams of codes are output by the rate-1/3 Turbo encoder (encoded codewords can be denoted as $d_0^{(i,s)}, \ldots, d_{D(i)-1}^{(i,s)}$ where s=0, 1, 2).

The encoded codeword(s) are delivered to the rate matching module (1706 as shown in FIG. 17). $d_0^{(i)}, \ldots, d_{D(i)-1}^{(i,s)}$ or $d_0^{(i,s)}, \ldots, d_{D(i)-1}^{(i,s)}$ are repeated and/or truncated to construct a sequence with desired length. Then, interleaving (without using cell ID to generate the interleaving index sequence) is performed if desired to generate the output sequence $e_0, \ldots, e_{E-1}$ or $e_0^{(i)}, \ldots, e_{E(i)-1}^{(i)}$ depending on whether multiple codewords are combined in this module (1707 as shown in FIG. 17). Note that the interleaving index sequence can be constructed such that no effect of interleaving is performed (equivalent as no interleaving). In one embodiment, if multiple codewords are encoded from previous modules, multiple codewords can be combined and rate matched and interleaved together. In another embodiment, if multiple codewords are encoded from previous modules, multiple codewords can be rate matched and interleaved separately.

The block of bits $e_0, \ldots, e_{E-1}$ or $e_0^{(i)}, \ldots, e_{E(i)-1}^{(i)}$ (depending on whether multiple codewords are combined in channel coding module) are modulated (1308 as shown in FIG. 17), resulting in a block of complex-valued modulation symbols $d(0), \ldots, d(M-1)$ or $d^{(i)}(0), \ldots, d^{(i)}(M(i)-1)$ depending on whether multiple codewords are combined in channel coding module (1309 as shown in FIG. 17), where M or M(i) is the number of symbols. If multiple codewords are not combined, multiple codewords can be modulated separately using the same or different modulation schemes. For one example, the modulation scheme for NR-SSS can be BPSK. For another example, the modulation scheme for NR-SSS can be QPSK. For yet another example, the modulation scheme for NR-SSS can be M-FSK. For still another example, the modulation scheme for NR-SSS can be OOK.

The block of modulation symbols may be mapped to layers and precoded (1710 as shown in FIG. 17), resulting in a block of vectors $y^{(p)}(0), \ldots, y^{(p)}(M-1)$ or $y^{(i,p)}(0), \ldots, y^{(i,p)}(M(i)-1)$, where $0 \leq p \leq P-1$ and P is the number of ports for NR-SSS transmission (1711 as shown in FIG. 17). If multiple codewords are generated from previous modules and not combined until this module, multiple codewords can be combined first in this module and then be mapped to layers and precoded jointly, or can be mapped to layers and precoded separately. In one embodiment, the number of layer is set to 1 and precoding matric is an identity matrix (equivalent as no layer mapping or precoding, and the input and output of this module are identical). In another embodiment, the method for layer mapping and precoding can be according to the method for layer mapping and precoding in LTE system specification correspondingly. In yet another embodiment, if NR-SSS and NR-PBCH are jointly coded, the method for layer mapping and precoding can be the same as the ones for NR-PBCH.

The block of complex-valued symbols $y^{(p)}(0), \ldots, y^{(p)}(M-1)$ or $y^{(i,p)}(0), \ldots, y^{(i,p)}(M(i)-1)$, for each antenna port p is mapped to the M resource elements available for NR-SSS transmission (1712 as shown in FIG. 17). If multiple streams of symbols are generated from the preceding module, multiple codewords are combined in this module before mapping. The mapping to the resource elements (j,k) may be in the increasing order of first the index j, then the index k in slot 1 in subframe 0 and finally the radio frame number.

In one embodiment, NR-SSS can be jointly coded with NR-PBCH. For example, the NR-SSS and NR-PBCH(s) within the same SS block (may or may not be in the same symbol) can be jointly coded and mapped into the REs of the NR-SSS and NR-PBCH(s) correspondingly. FIG. 17 can still be utilized to illustrate the procedures for joint coding of NR-SSS and NR-PBCH(s), and the transport block and all sequences correspond to the ones for NR-SSS and NR-PBCH(s). In one sub-embodiment, NR-SSS can be jointly coded with PBCH using one codeword. In another sub-embodiment, NR-SSS can be jointly coded with PBCH using multiple codewords (e.g. part of NR-SSS (cell ID) and NR-PBCH jointly coded, and the remaining of NR-SSS (SS block index) coded separately, or NR-SSS coded in one codeword, and NR-PBCH coded in another codeword). For example, the common message bits across SS blocks including cell ID and MIB in NR-PBCH can be coded using one codeword, and the SS block index or symbol timing can be coded using a separate codeword such that signal combination of multiple receiving of NR-SSS and NR-PBCH is possible at the receiver.

In another embodiment, if NR-PBCH and NR-SSS are not jointly coded, the principle of multiple codewords in coding-based/message-based construction method for NR-SSS can also be utilized for NR-PBCH. If the SS block index is explicitly indicated in NR-PBCH, the message bits containing the SS block index can be coded separately. The CRC bits and coding rate of the message bits containing the SS block index can be the same or different from the ones of regular message bits in NR-PBCH (e.g. needed system information or MIB). In one embodiment, the number of CRC bits can be 0 for SS block index (e.g. no CRC protection). In another embodiment, the number of CRC bits can be smaller than the one for regular message bits in NR-PBCH (e.g. smaller than 16 as used in LTE specification). The motivation of using separate codewords for regular message bits in NR-PBCH and message bits for symbol index is to enable signal combining of regular message bits for multiple receiving of NR-PBCH.

In some embodiments of component V, SSS, PSS and PBCH are multiplexed in time domain, occupying the same bandwidth in frequency domain. For NR, the resource elements available for the transmission of NR-SSS, NR-PSS, and NR-PBCH can be at least equivalent to or larger than then ones for the transmission of SSS, PSS, and PBCH in LTE specification. The increase of sources enables more complex mapping and multiplexing schemes for NR-SS and NR-PBCH, with potentially more accurate detection and robust synchronization.

The followings are considered for the mapping and multiplexing of NR-SS and NR-PBCH. Note that the combinations of aspects are supported in the present disclosure.

In one embodiment of multiplexing in frequency domain or time domain, NR-PSS, NR-SSS and NR-PBCH can be multiplexed in time domain. For example, SSS, PSS, and PBCH are multiplexed in time domain and transmitted in successive symbols as in LTE specification In another embodiment, NR-PSS, NR-SSS and NR-PBCH can be multiplexed in frequency domain. For example, each of the NR-PSS, NR-SSS and NR-PBCH occupied a predefined part of the transmission bandwidth and transmitted using the same symbol duration. In yet another embodiment, NR-PSS, NR-SSS and NR-PBCH can be multiplexed in a hybrid pattern consisted of both time domain and frequency domain multiplexing.

In one embodiment of carrier frequency dependent or independent, the mapping and/or multiplexing of NR-PSS, NR-SSS and NR-PBCH within in each SS block can be the same for all the range of carrier frequencies supported in NR. For example, NR utilizes the same mapping and/or multiplexing of NR-PSS, NR-SSS and NR-PBCH within in each SS block for all supported carrier frequencies.

In another embodiment, the mapping and multiplexing NR-PSS, NR-SSS and NR-PBCH within in each SS block can be different for a given range of carrier frequencies supported in NR. For example, NR utilizes one scheme of mapping and multiplexing of NR-PSS, NR-SSS and NR-PBCH for systems with carrier frequency>6 GHz, and utilizes another scheme of mapping and multiplexing of NR-PSS, NR-SSS and NR-PBCH for systems with carrier frequency<6 GHz.

In one embodiment of numerology dependent or independent (note numerology means subframe duration, sub-carrier spacing, cyclic prefix length, transmission bandwidth, and/ or any combination of these signal parameters), if multiple numerologies are supported for a given range of carrier frequencies, the mapping and multiplexing of NR-PSS, NR-SSS and NR-PBCH can be different for a given numerology.

In another embodiment, if multiple numerologies are supported for a given range of carrier frequencies, the mapping and multiplexing of NR-PSS, NR-SSS and NR-PBCH can be common for all the supported numerologies (e.g. choosing a design scheme based on the default numerology). In yet another embodiment, if multiple numerologies are supported for a given range of carrier frequencies, the NR-PSS, NR-SSS, and NR-PBCH may utilize different numerologies to generate a common mapping and multiplexing scheme.

In one embodiment of repetition of NR-PSS, and/or NR-SSS, and/or NR-PBCH, NR-PSS, and/or NR-SSS, and/or NR-PBCH can be repeated once or more than once in time domain and/or frequency domain within each SS block. The replicate(s)/copies of NR-PSS, and/or NR-SSS, and/or NR-PBCH essentially carry the same information as the original one(s), and can be exactly the same or cyclic shifted and/or interleaved. In one sub-embodiment, each of the replicate(s)/copies of NR-PSS, and/or NR-SSS, and/or NR-PBCH can be multiplexed with a unique phase shift (e.g. one of the DFT phase shifts).

In one embodiment of interleaving of NR-PSS, and/or NR-SSS, and/or NR-PBCH in frequency domain, if NR-PSS, and/or NR-SSS, and/or NR-PBCH, and/or their replicates (if applicable) are multiplexed in frequency domain within the same symbol, the sequences can be interleaved in the frequency domain. In one sub-embodiment, NR-PSS, and/or NR-SSS, and/or NR-PBCH can be interleaved with an empty sequence, such that a comb structure is utilized in frequency domain (equivalent as time domain repetition within an OFDM symbol). For example, if two copies of NR-PSS/NR-SSS/NR-PBCH are concatenated in frequency domain within one OFDM symbol, one of them can be multiplied by −1 before concatenation. For another example, if N copies of NR-PSS/NR-SSS/NR-PBCH are concatenated in frequency domain within one OFDM symbol, N copies of NR-PSS/NR-SSS/NR-PBCH can be multiplied by $e^{jn \cdot 2\pi/N}$ or $e^{-jn \cdot 2\pi/N}$, where $0 \leq n \leq N-1$, correspondingly.

In one embodiment of same or different mapping and multiplexing across SS blocks, the mapping and/or multiplexing of NR-PSS, and/or NR-SSS, and/or NR-PBCH within SS blocks are the same. For example, LTE specification has the same mapping and multiplexing for all SS blocks. In another embodiment, the mapping and/or multiplexing of NR-PSS, and/or NR-SSS, and/or NR-PBCH within SS blocks can be different. For example, only NR-PSS is transmitted in one SS block, and NR-SSS and NR-PBCH are transmitted in the next SS block. For another example, only NR-PSS and NR-SSS are transmitted in one SS block, and NR-PSS, NR-SSS and NR-PBCH are transmitted in the next SS block.

Figure 18A:
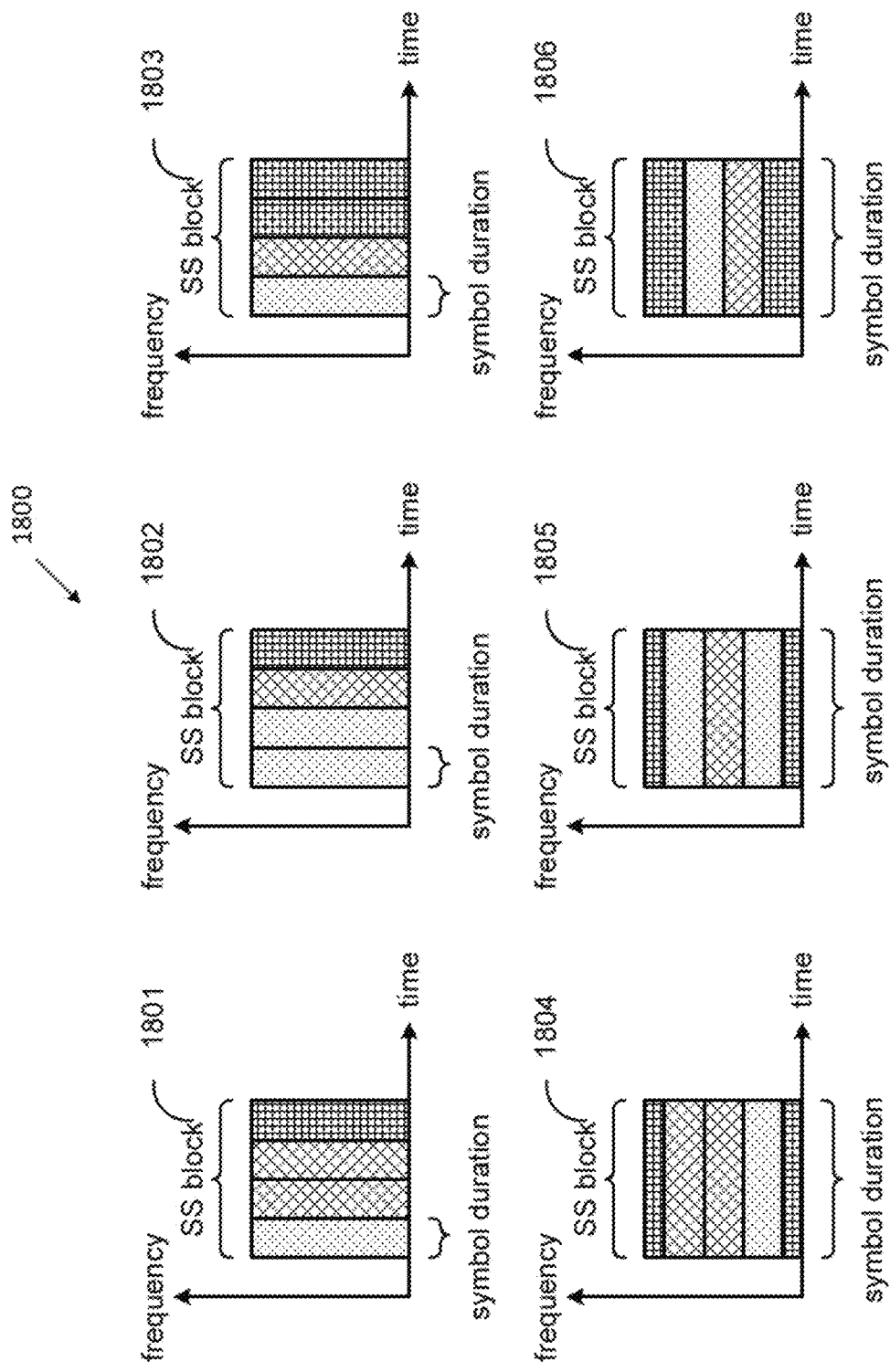
FIG. 18A illustrates an example combination of mapping and multiplexing according to embodiments of the present disclosure.

FIG. 18A illustrate an example combination of mapping and multiplexing 1800 according to embodiments of the present disclosure. The embodiment of the combination of mapping and multiplexing 1800 illustrated in FIG. 18A is for illustration only. FIG. 18A does not limit the scope of this disclosure to any particular implementation of the combination of mapping and multiplexing 1800.

Figure 18B:
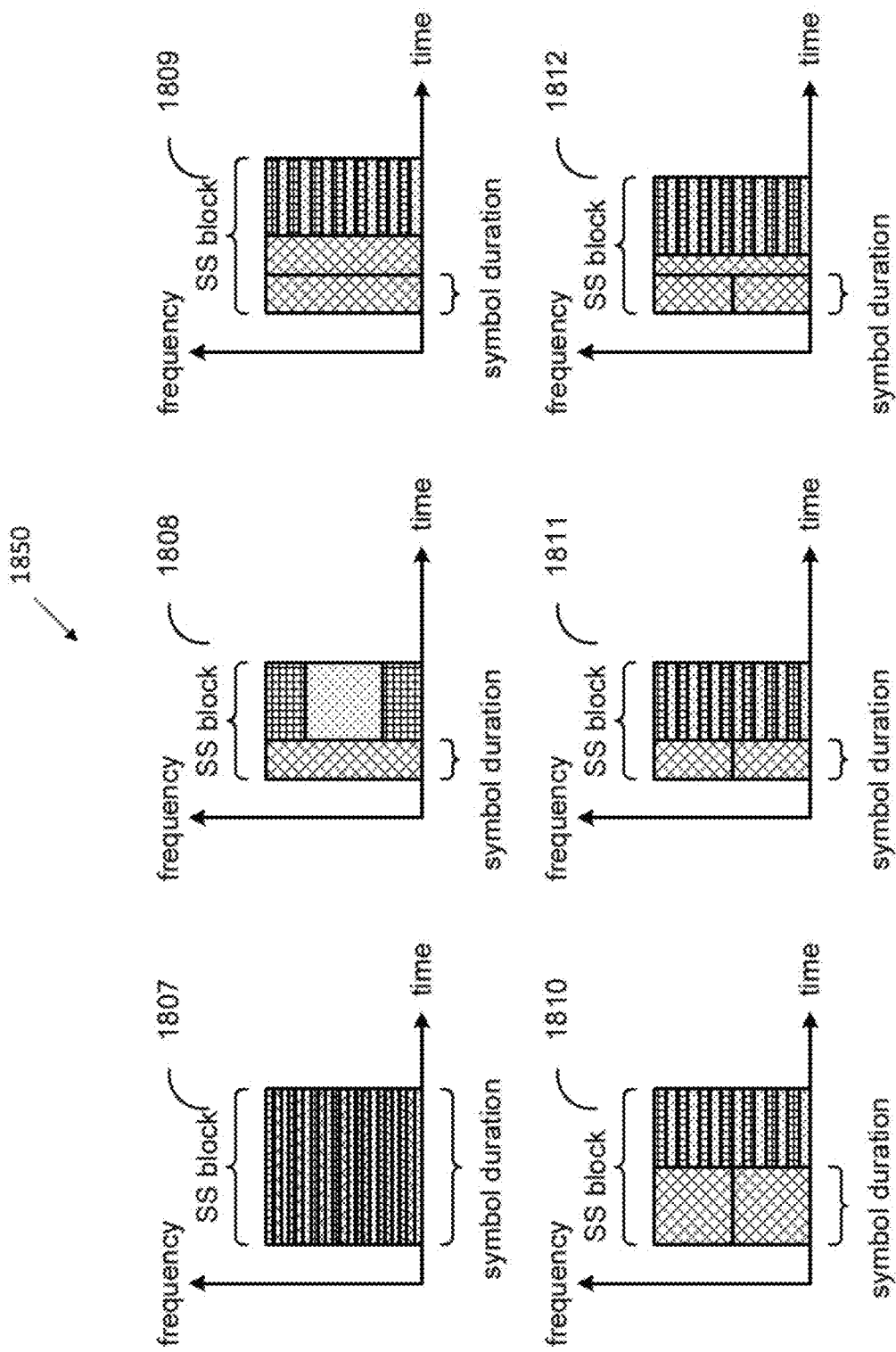
FIG. 18B illustrates another example combination of mapping and multiplexing according to embodiments of the present disclosure.

FIG. 18B illustrates another example combination of mapping and multiplexing 1850 according to embodiments of the present disclosure. The embodiment of the combination of mapping and multiplexing 1850 illustrated in FIG. 18B is for illustration only. FIG. 18B does not limit the scope of this disclosure to any particular implementation of the combination of mapping and multiplexing 1850.

Figure 18C:
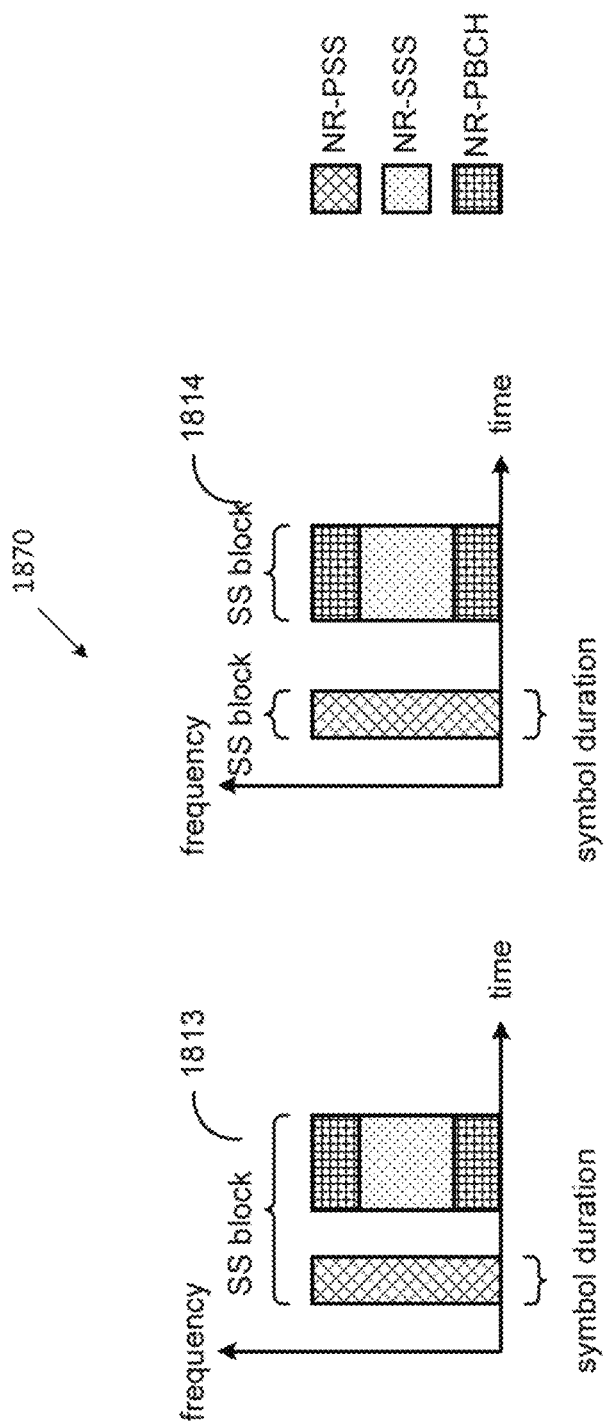
FIG. 18C illustrates yet another example combination of mapping and multiplexing according to embodiments of the present disclosure.

FIG. 18C illustrates yet another example combination of mapping and multiplexing 1870 according to embodiments of the present disclosure. The embodiment of the combination of mapping and multiplexing 1870 illustrated in FIG. 18C is for illustration only. FIG. 18C does not limit the scope of this disclosure to any particular implementation of the combination of mapping and multiplexing 1870.

Figure 19A:
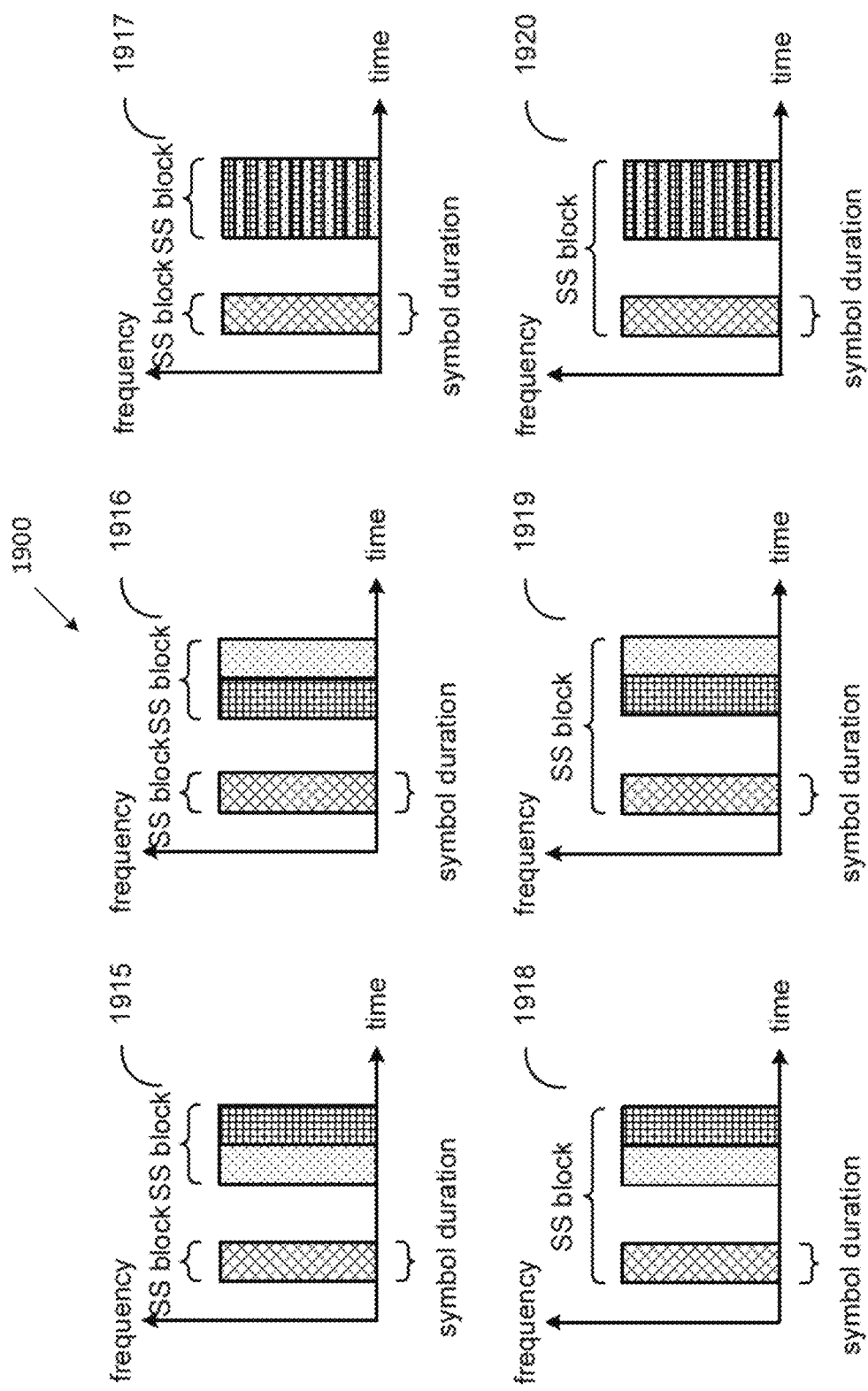
FIG. 19A illustrates yet another example combination of mapping and multiplexing according to embodiments of the present disclosure.

FIG. 19A illustrates yet another example combination of mapping and multiplexing 1900 according to embodiments of the present disclosure. The embodiment of the combination of mapping and multiplexing 1900 illustrated in FIG. 19A is for illustration only. FIG. 19A does not limit the scope of this disclosure to any particular implementation of the combination of mapping and multiplexing 1900.

Figure 19B:
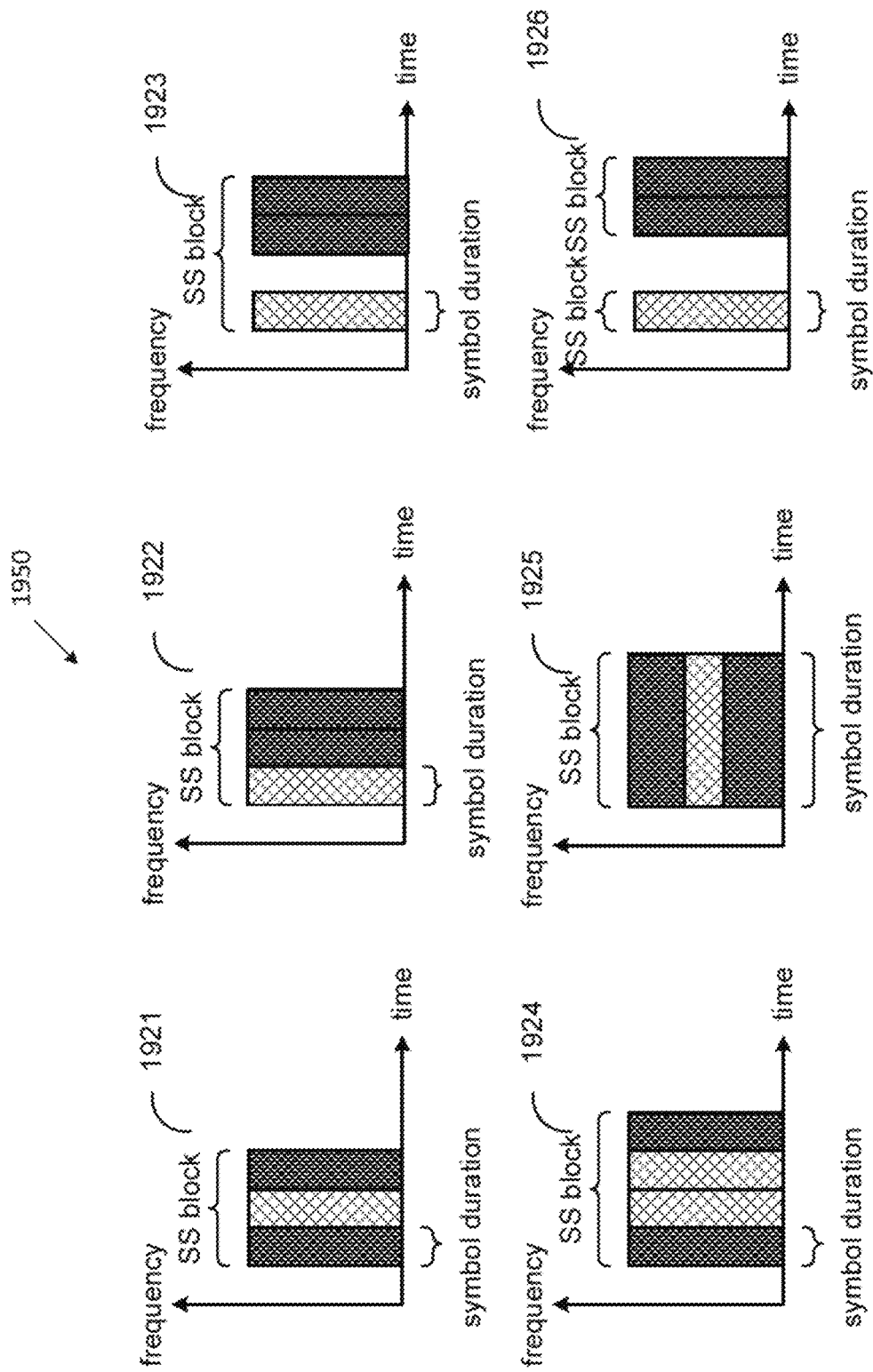
FIG. 19B illustrates yet another example combination of mapping and multiplexing according to embodiments of the present disclosure.

FIG. 19B illustrates yet another example combination of mapping and multiplexing 1950 according to embodiments of the present disclosure. The embodiment of the combination of mapping and multiplexing 1950 illustrated in FIG. 19B is for illustration only. FIG. 19B does not limit the scope of this disclosure to any particular implementation of the combination of mapping and multiplexing 1950.

Figure 19C:
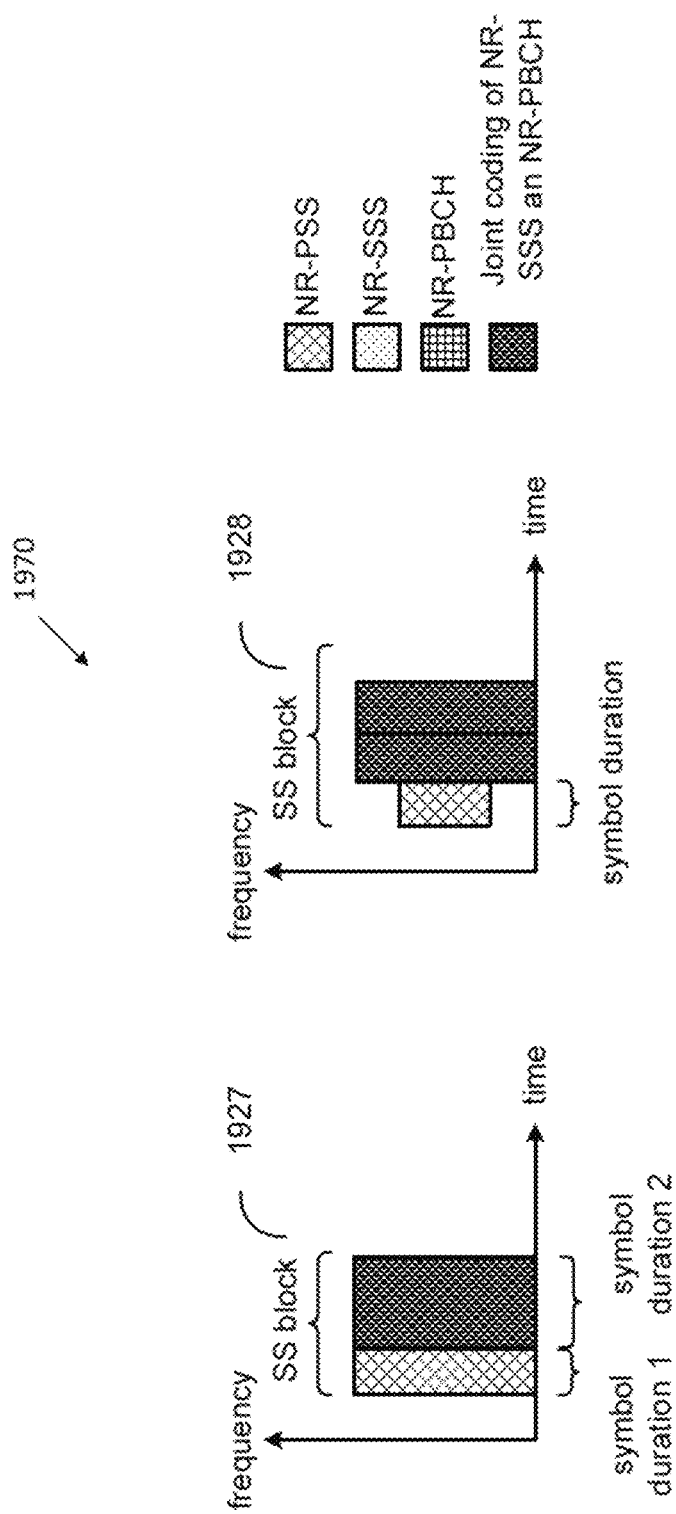
FIG. 19C illustrates yet another example combination of mapping and multiplexing according to embodiments of the present disclosure.

FIG. 19C illustrates yet another example combination of mapping and multiplexing 1970 according to embodiments of the present disclosure. The embodiment of the combination of mapping and multiplexing 1970 illustrated in FIG. 19C is for illustration only. FIG. 19C does not limit the scope of this disclosure to any particular implementation of the combination of mapping and multiplexing 1970.

Figure 20:
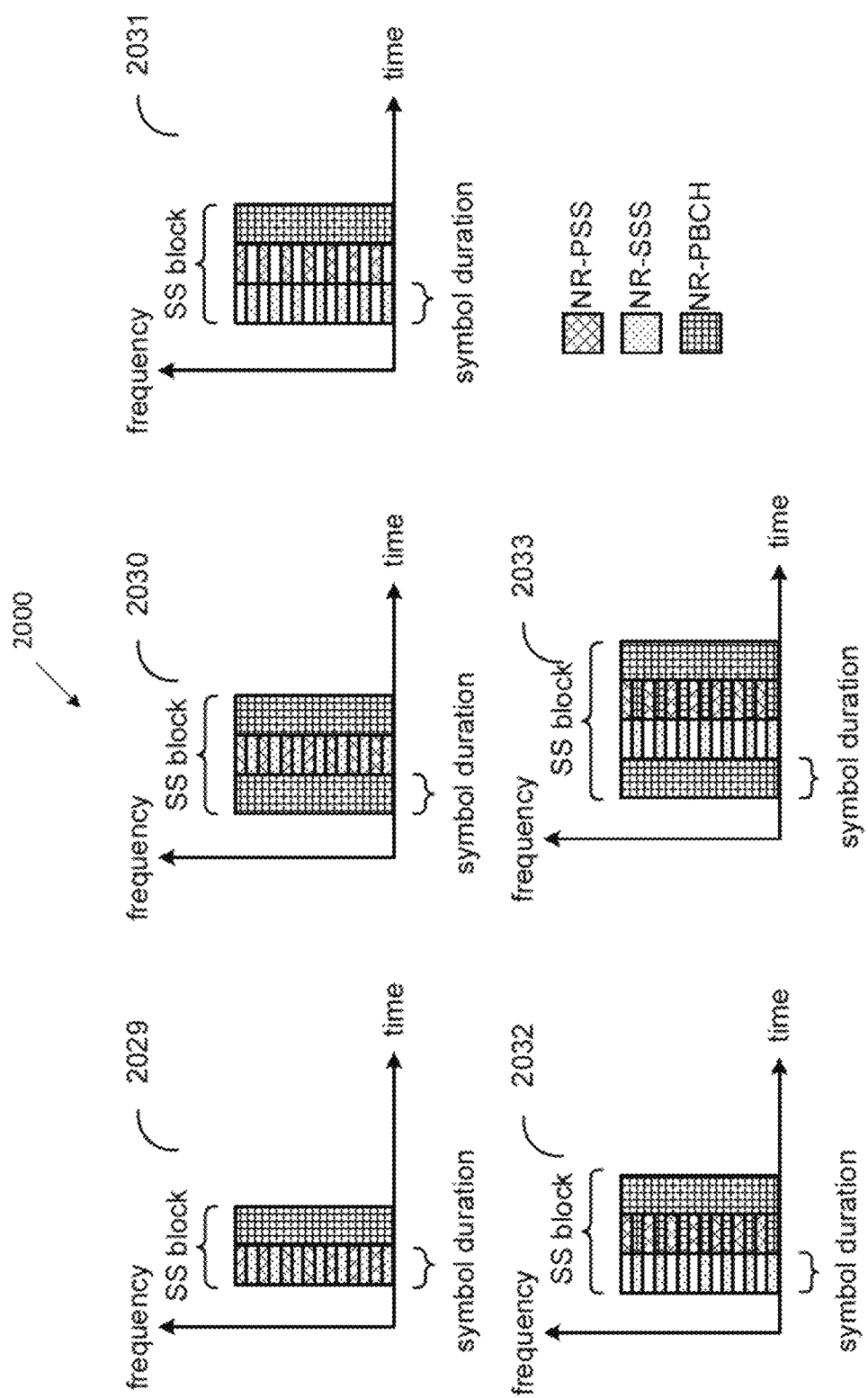
FIG. 20 illustrates yet another example combination of mapping and multiplexing according to embodiments of the present disclosure.

FIG. 20 illustrates yet another example combination of mapping and multiplexing 2000 according to embodiments of the present disclosure. The embodiment of the combination of mapping and multiplexing 2000 illustrated in FIG. 20 is for illustration only. FIG. 20 does not limit the scope of this disclosure to any particular implementation of the combination of mapping and multiplexing 2000.

Examples showing the mapping and multiplexing design within each SS block with aspect to the combination of above aspects are illustrated in FIGS. 18A-C, 19A-C, 20, and other possible combinations are not excluded in the disclosure. In the relationship of NR-PSS, NR-SSS, and NR-PBCH is for illustration purpose only, and the following notes are pointed out.

The duration of NR-PBCH may be one or more symbols when multiplexing in time domain, although it appears to be the same length as NR-PSS or NR-SSS for simplicity in the figures. When multiplexing multiple signals including NR-PSS, NR-SSS, NR-PBCH and their possible replicates in time domain, their neighboring relationship in time domain can be exchanged, although the figures show only one possible alignment of the signals.

When multiplexing multiple signals including NR-PSS, NR-SSS, NR-PBCH and their possible replicates in frequency domain, their neighboring relationship in frequency domain can be exchanged, although the figures show only one possible alignment of the signals. When multiplexing multiple signals including NR-PSS, NR-SSS, NR-PBCH and multiplexing multiple signals' possible replicates in time domain, multiplexing multiple signals are necessary to be in the successive symbols. There can be gap between the signals in time domain within a SS block.

As shown in FIG. 18A, 1801, 1802 and 1803 are examples of transmitting repetition of the NR-PSS, NR-SSS, and NR-PBCH in time domain within a SS block, correspondingly. 1804, 1805, and 1806 are examples of transmitting repetition of the NR-PSS, NR-SSS, and NR-PBCH in frequency domain within a SS block, correspondingly.

As shown in FIG. 18B, 1807 is an example of interleaving of the NR-PSS, NR-SSS, and NR-PBCH in frequency domain within a SS block (1807 can also be combined with 1804, 1805, and 1806 to support repetition and interleaving at the same time in frequency domain). 1808 is an example of multiplexing the NR-PSS, NR-SSS, and NR-PBCH in a hybrid pattern of time-domain and frequency-domain multiplexing. 1809 and 1810 are examples of combination of repetition of NR-PSS, interleaving of NR-SSS and NR-PBCH in frequency domain, and hybrid multiplexing method, where repetition of NR-PSS is performed in time domain and frequency domain correspondingly. 1811 is an example of repetition of NR-PSS in frequency domain, but using shorter NR-PSS sequences. 1812 is an example of repetition of NR-PSS in both time and frequency domain, and using different numerologies.

As shown in FIG. 18C, 1813 is an example of multiplexing NR-PSS with NR-SSS and NR-PBCH, and with gap between the signals in time domain. 1814 is an example of different multiplexing and mapping across SS blocks.

As shown in FIG. 19A, 1915, 1916, 1918, and 1919 are examples of multiplexing NR-PSS with NR-SSS and NR-PBCH, and with gap between the signals in time domain where NR-SSS and NR-PBCH are positioned adjacent to each other. 1917 and 1920 are examples of multiplexing NR-PSS with NR-SSS and NR-PBCH, and with gap between the signals in time domain where NR-SSS and NR-PBCH occupy two symbols and are multiplexed (interleaved) in frequency domain. In 1915, 1416, and 1917, NR-PSS and NR-SSS/NR-PBCH are associated with two separate SS blocks.

As shown in FIG. 19B, 1921 to 1928 show multiplexing of NR-PSS with jointly coded NR-SSS and NR-PBCH. 1921 is an example of multiplexing of NR-PSS with jointly coded NR-SSS and NR-PBCH in time domain where multiple jointly coded NR-SSS and NR-PBCH symbols are located on both sides of NR-PSS. 1922 is an example of multiplexing of NR-PSS with joint coded NR-SSS and NR-PBCH in time domain where multiple jointly coded NR-SSS and NR-PBCH symbols are located on the same side of NR-PSS. 1923 is an example of multiplexing of NR-PSS with joint coded NR-SSS and NR-PBCH in time domain where jointly coded NR-SSS and NR-PBCH symbols are located not next to NR-PSS within a SS block. 1924 is an example of multiplexing of NR-PSS with joint coded NR-SSS and NR-PBCH in time domain with repetition of NR-PSS. 1925 is an example of multiplexing of NR-PSS with jointly coded NR-SSS and NR-PBCH in frequency domain. 1926 is an example of NR-PSS transmitted in one SS block and jointly coded NR-SSS and NR-PBCH transmitted in another SS block.

As shown in FIG. 19C, 1927 is an example of multiplexing of NR-PSS with joint coded NR-SSS and NR-PBCH using different subcarrier spacing. 1428 is an example of multiplexing of NR-PSS with joint coded NR-SSS and NR-PBCH using different bandwidth.

As shown in FIG. 20, 2029 is an example of multiplexing of NR-PBCH with interleaved NR-PSS and NR-SSS using comb structure. 2030 is an example of multiplexing of multiple repetitions of NR-PBCH with interleaved NR-PSS and NR-SSS using comb structure. 2031 is an example of multiplexing NR-PSS and NR-SSS using comb structure in different symbols (positions for signals are interleaved in different symbols). 2032 is an example of multiplexing NR-PSS and NR-SSS using comb structure in different symbols (positions for signals are interleaved in different symbols), and further multiplexing NR-SSS with NR-PBCH using the remaining REs in the same symbol. 2033 is same multiplexing method as 2032 but with multiple repetitions of PBCH.

Note that combinations of the mapping and multiplexing schemes in FIGS. 18A-C, 19A-C, and 20 are also supported in the present disclosure.

Each SS block periodicity can be of any time unit duration. Examples of such a duration is half of a radio frame (such as 5 ms), one radio frame (such as 10 ms), or a multiple of radio frames (such as 10N-ms where N is an integer greater than 1). An example embodiment is when one SS block periodicity is 5 ms. For 1916, each of the NR-PSS and NR-SSS has a same periodicity of 10 ms and can be positioned at the last symbol (for instance, of the last slot) within a 5 ms time duration. In this case, NR-PSS and NR-SSS can be detected without the knowledge of CP length regardless whether NR-PSS, NR-SSS, and NR-PBCH can be transmitted with different CP lengths or not. If such is the case, CP length can be detected as a part of NR-PBCH detection. For 1915, each of the NR-PSS and NR-SSS has a same periodicity of 10 ms. NR-PSS can be positioned at the last symbol (for instance, of the last slot) within a 5 ms time duration. NR-SSS, on the other hand, cannot. In this case, NR-PSS can be detected without the knowledge of CP length regardless whether NR-PSS, NR-SSS, and NR-PBCH can be transmitted with different CP lengths or not. If such is the case, CP length can be detected as a part of NR-SSS detection.

In some embodiments of component VI, except for indicating part of the NR cell ID, the NR-PSS sequence(s) can also be utilized to indicate other parameters.

In one embodiment, the NR-PSS sequence(s) can be utilized to indicate the CP length/type of NR-SS. For example, one NR-PSS sequence is utilized for indicating that NR-SS is using the normal CP length, another NR-PSS sequence is utilized for indicating that NR-SS is using the extended CP length (if extended CP is support for NR-SS). In a sub-embodiment, if the NR-PSS is using ZC-sequence, one ZC-sequence with root k is utilized to indicate that NR-SS is using the normal CP length, another ZC-sequence with root l–k is utilized to indicate that NR-SS is using the extended CP length (if extended CP is support for NR-SS), where l is the length of ZC-sequence (also means that the two ZC-sequences are conjugated).

In another embodiment, the NR-PSS sequence(s) can be utilized for indicating the CP length/type of data multiplexed with NR-SS. For example, one NR-PSS sequence is utilized to indicate that multiplexed data are using the normal CP length, another NR-PSS sequence is utilized to indicate that multiplexed data are using the extended CP length (if extended CP is support for NR-SS). In a sub-embodiment, if the NR-PSS is using ZC-sequence, one ZC-sequence with root k is utilized to indicate that multiplexed data are using the normal CP length, another ZC-sequence with root l–k is utilized to indicate that multiplexed data are using the extended CP length (if extended CP is support for NR-SS), where l is the length of ZC-sequence (also means that the two ZC-sequences are conjugated).

In yet another embodiment, the NR-PSS sequence(s) can be utilized to indicate the combination of CP length/type and subcarrier spacing of data multiplexed with NR-SS. For example, each NR-PSS sequence is utilized to indicate one combination of CP length/type and subcarrier spacing of multiplexed data. In a sub-embodiment, if the NR-PSS is using ZC-sequence and there are two combinations of CP length/type and subcarrier spacing of multiplexed data to be indicated, one ZC-sequence with root k can be utilized to indicate the first combination of CP length/type and subcarrier spacing of multiplexed data, and another ZC-sequence with root l−k can be utilized to indicate the second combination of CP length/type and subcarrier spacing of multiplexed data, where l is the length of ZC-sequence (also means that the two ZC-sequences are conjugated). For example, the first combination can be normal CP with 15 kHz subcarrier spacing, or normal CP with 30 kHz subcarrier spacing for <6 GHz carrier frequency, and normal CP with 60 kHz subcarrier spacing, or normal CP with 120 kHz subcarrier spacing for >6 GHz carrier frequency, and the second combination can be extended CP with 60 kHz subcarrier spacing for <6 GHz carrier frequency and extended CP with 240 kHz subcarrier spacing for >6 GHz carrier frequency.

Note that the indication of other parameters can be combined with the indication of part of the NR cell ID, and also combined with other design aspects in the aforementioned embodiment of component I. For example, M·N sequences can be utilized to indicate the combinations of part of the NR cell ID (N hypotheses) and the CP length and/or subcarrier spacing (M hypotheses). For instance, N=3 and M=2. In one sub-embodiment, if ZC-sequence is utilized for constructing NR-PSS, sequences indicating different CP length and/or subcarrier spacing with the same NR cell ID indication can be conjugated ZC-sequences.

Note that if there are multiple combinations of the part of the NR cell ID, and/or CP length, and/or subcarrier spacing to be indicated, the NR-PSS sequence(s) can be utilized to indicate part of the combinations, and other signal(s) and/or channel(s) can be utilized to indicate the remaining combinations. Note that the above mentioned root pair of ZC-sequences (e.g. k and l−k) can be chosen based on the correlation property. For example, if l=63, then the root pair can be (29, 34) or (34, 29). For another example, if l=127, then the root pair can be (29, 98) or (98, 29). For yet another example, if l=255, then the root pair can be (29, 226) or (226, 29).

The present disclosure focuses on the design of NR synchronization signals, termed the NR-SS including NR-PSS and NR-SSS. Some of the embodiments are also related to NR broadcast signals and channels, termed the NR-PBCH. The present disclosure relates generally to wireless communication systems and, more specifically, to the sequence design of NR synchronization signals, along with their associated mapping and procedures. NR synchronization signals, termed the NR-SS, include NR-PSS, NR-SSS and other potentially additional synchronization signals in the present disclosure.

In some embodiments of component VII, the functionality of PSS is to provide coarse time domain and frequency domain synchronization, as well as part of the physical cell ID detection. The PSS is constructed from a frequency-domain Zadoff-Chu (ZC) sequence of length 63, with the middle element truncated to avoid using the d.c. subcarrier. 3 roots are selected for PSS to represent the 3 physical layer identities within each group of cells. The PSS is transmitted in the central 6 resource blocks (RBs), invariant to the system bandwidth to enable the UE to synchronize without a priori information of the system bandwidth.

For NR, one of the basic functionalities of NR-PSS is still to provide coarse time domain and frequency domain synchronization, and the frequency location of NR-PSS can still be independent from the system bandwidth. However, other functionalities and designs of the NR-PSS sequence can be different from LTE specification, due to potentially larger synchronization transmission bandwidth (such that longer sequence length), larger cell ID number, and larger periodicity.

Note that in one embodiment, NR-PSS is utilized only for frequency-domain offset and timing detection, and possibly for part of the cell ID information, but not for carrying other hypotheses like SS block timing index and CP type.

The following sub-components are distinguished based on different maximum number of resource elements available within one OFDM symbol for transmitting NR-PSS.

In some embodiments of component VII.A, the maximum number of resource elements available within one OFDM symbol for transmitting NR-PSS is 288 (equivalent to 24RBs), which corresponds to (note that the bandwidth contains guard band, and actual transmission bandwidth can be a little bit smaller): frequency range A associated with 15 kHz subcarrier spacing and 5 MHz NR-PSS transmission bandwidth (including guard band); frequency range B associated with 30 kHz subcarrier spacing and 10 MHz NR-PSS transmission bandwidth (including guard band); frequency range C associated with 60 kHz subcarrier spacing and 20 MHz NR-PSS transmission bandwidth (including guard band); frequency range D associated with 120 kHz subcarrier spacing and 40 MHz NR-PSS transmission bandwidth (including guard band); and frequency range E associated with 240 kHz subcarrier spacing and 80 MHz NR-PSS transmission bandwidth (including guard band).

In one example, frequency range A can be around 0 to 2 GHz, frequency range B can be around 2 to 6 GHz, frequency range D can be above 6 GHz. For another example, frequency range A can be around 0 to 2 GHz, frequency range B can be around 2 to 6 GHz, frequency range E can be above 6 GHz. For yet another example, frequency range A can be around 0 to 6 GHz, frequency range D can be above 6 GHz. For yet another example, frequency range A can be around 0 to 6 GHz, frequency range E can be above 6 GHz.

In one embodiment, the same NR-PSS sequence(s) is utilized for the frequency ranges A to E by scaling the subcarrier spacing.

Note that the numerology of NR-PSS can be different from data multiplexed in the same symbol, so guard band is needed on both side of NR-PSS sequence in frequency domain, and the size of guard band is around 10% (which correspond to around 28 REs in this sub-embodiment) such that the maximum number of REs for transmitting NR-PSS may be reduced to around 260. Based on this consideration, the design of NR-PSS sequence can be selected as one of the following options.

In one embodiment of option 1, long ZC-sequence without multiplexing or interleaved with other sequences (including zero sequence), the sequence $d_{PSS}(n)$ used for NR-PSS is generated from a frequency-domain ZC-sequence according to $$d_{PSS}(n) = \begin{cases} e^{-j\frac{\pi u n(n+1)}{L_{PSS}}}, & n = 0, 1, \ldots, \frac{L_{PSS}-3}{2} \\ e^{-j\frac{\pi u (n+1)(n+2)}{L_{PSS}}}, & n = \frac{L_{PSS}-1}{2}, \ldots, L_{PSS}-2 \end{cases}$$

where $L_{PSS}$ is the length of NR-PSS sequence, and $L_{PSS}$ is an odd number smaller than 260. In one example, $L_{PSS}=255$. In another example, $L_{PSS}=257$. In yet another example, $L_{PSS}=259$.

Figure 21:
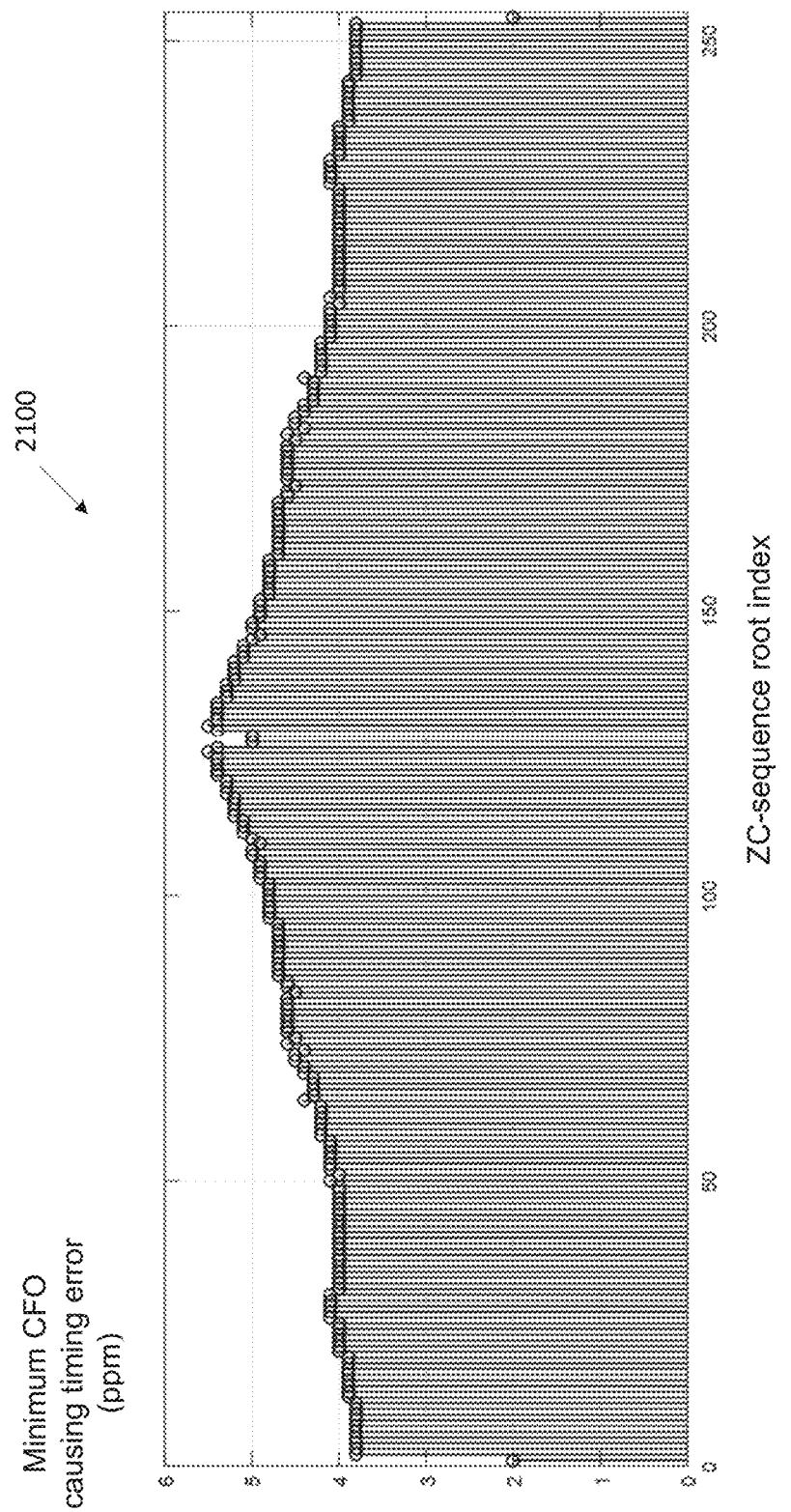
FIG. 21 illustrates an example capability to resist CFO according to embodiments of the present disclosure.

FIG. 21 illustrates an example capability to resist CFO 2100 according to embodiments of the present disclosure. The embodiment of the capability to resist CFO 2100 illustrated in FIG. 21 is for illustration only. FIG. 21 does not limit the scope of this disclosure to any particular implementation of the capability to resist CFO 2100.

The number of supported ZC-sequence root index u is given by the number of cell ID hypotheses contained in NR-PSS, and a value of the number of supported ZC-sequence root index u can be chosen from capability of the number of supported ZC-sequence root index u to resist the frequency domain offset (e.g. 5 ppm) and/or PAPR and/or CM properties. FIG. 21 shows the capability to resist CFO corresponds to different roots.

Figure 22:
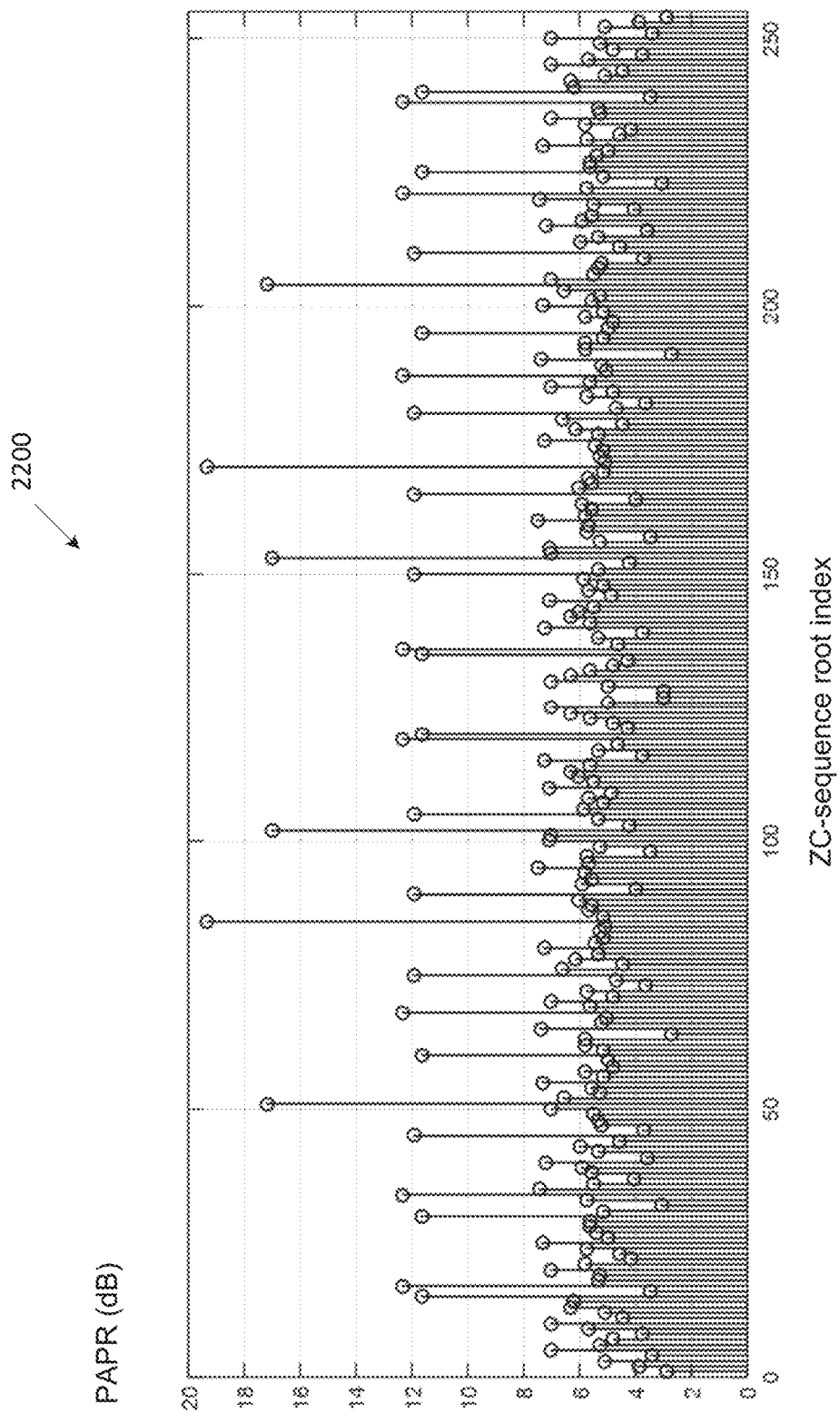
FIG. 22 illustrates an example PAPR according to embodiments of the present disclosure.

FIG. 22 illustrates an example PAPR 2200 according to embodiments of the present disclosure. The embodiment of the PAPR 2200 illustrated in FIG. 22 is for illustration only. FIG. 22 does not limit the scope of this disclosure to any particular implementation of the PAPR 2200.

Figure 23:
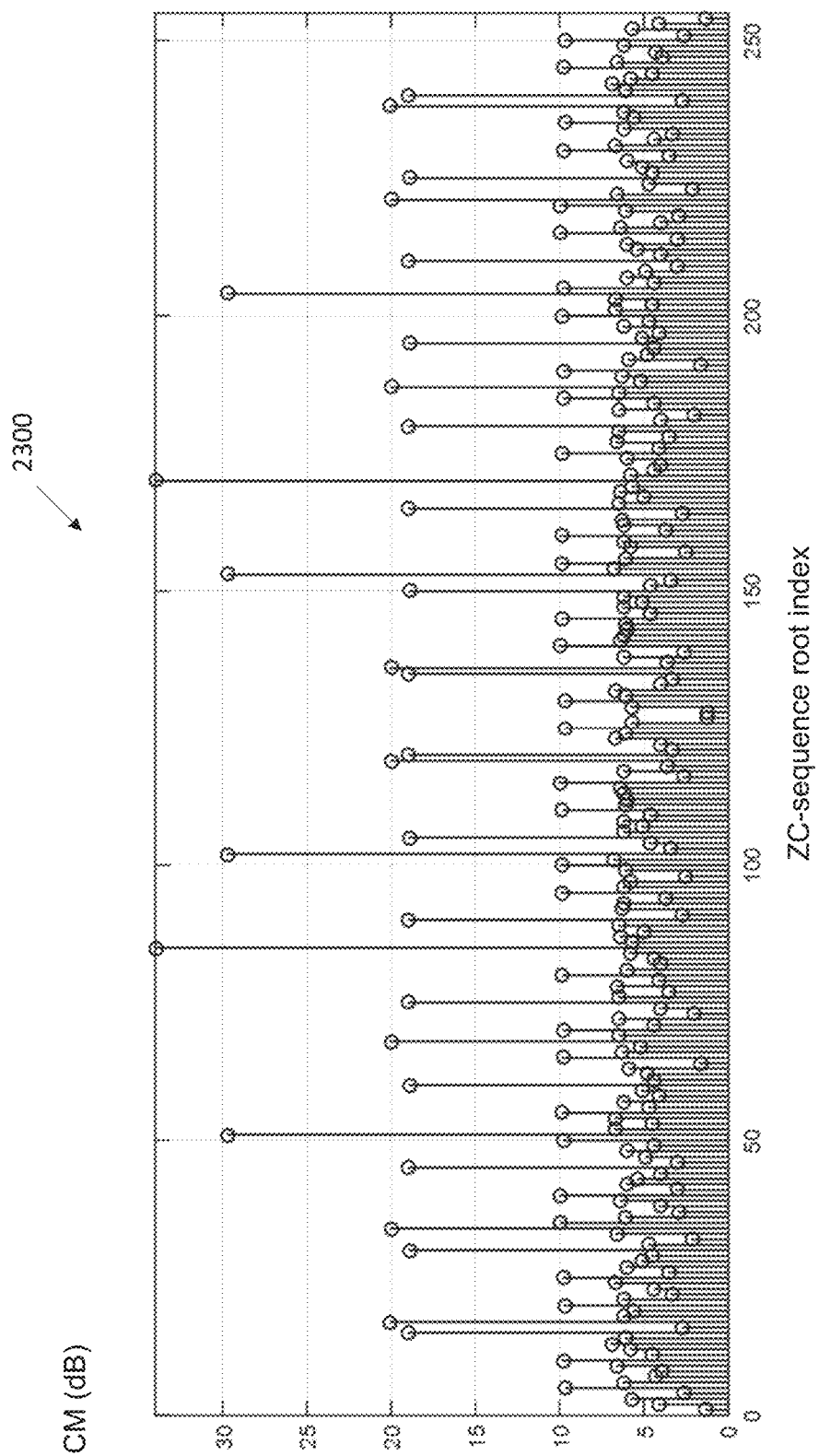
FIG. 23 illustrates an example RCM value according to embodiments of the present disclosure.

FIG. 23 illustrates an example RCM value 2300 according to embodiments of the present disclosure. The embodiment of the RCM value 2300 illustrated in FIG. 23 is for illustration only. FIG. 23 does not limit the scope of this disclosure to any particular implementation of the RCM value 2300.

FIG. 22 shows the PAPR value corresponds to different roots. FIG. 23 shows the RCM value corresponds to different roots. Then taking into the consideration of three aspect, the potential values for u for $L_{PSS}=255$ can be chosen from $S_{255}=\{64, 107, 108, 110, 111, \ldots, 118, 121, \ldots, 126, 129, 130, \ldots, 134, 137, \ldots, 145, 147, 148, 191\}$ In one example, if only one NR-PSS sequence is supported in NR (which means no cell ID hypothesis in NR-PSS), there is one value for u (equivalent to defining a cell ID component in NR-PSS as $N_{ID}^{(2)}=0$, where physical-layer cell-identity $N_{ID}=N_{ID}^{(1)} \cdot N_{PSS}+N_{ID}^{(2)}$ and $N_{PSS}$ is the number of NR-PSS sequences), and the corresponding value can be 125 (best capability against CFO) or the corresponding value's conjugate 130 (same capability against CFO as 125), or chosen from other values in $S_{255}$. In another example, the corresponding value can be 126 or the corresponding value's conjugate 129. In yet another example, the corresponding value can be 121 or the corresponding value's conjugate 134. In yet another example, the corresponding value can be 116 or the corresponding value's conjugate 139. In yet another example, the corresponding value can be 64 or the corresponding value's conjugate 191.

In another example, if two NR-PSS sequences are supported in NR to represent two cell ID hypotheses, there are two possible values for u (each of them is mapped to a cell ID component in NR-PSS as $N_{ID}^{(2)}=0$ or 1), and the two values are conjugate roots for ZC-sequence (i.e., the summation of values of u corresponding to $N_{ID}^{(2)}=0$ and 1 correspondingly equals to the length of ZC-sequence). One of such example of u values for $L_{PSS}=255$ can be (125, 130) (best pair with capability against CFO), or other conjugate pair chosen from $S_{255}$. Another example is (116, 139). Yet another example is (64, 191). Yet another example is (121, 134). Yet another example is (126, 129).

In yet another example, if three NR-PSS sequences are supported in NR to represent three cell ID hypotheses, there are three possible values for u (each of them is mapped to a cell ID component in NR-PSS as $N_{ID}^{(2)}=0$ or 1 or 2), and two of the values are conjugate roots for ZC-sequence (i.e., the summation of two values of u equals to the length of ZC-sequence), and the remaining one is chosen to have the best cross correlation with the conjugate pair (also selected from the set of best capability against CFO). One of such example of u values for $L_{PSS}=255$ can be (125, 130, a) (best pair with capability against CFO and another one a chosen from set $S_{255}$ like a=121 or 134 or 126 or 129 or 116 or 139 or 64 or 191), or other conjugate pair together with another root value chosen from $S_{255}$. For another example, root set can be (121, 134, a), where a=125 or 130 or 126 or 129 or 116 or 139 or 64 or 191. For yet another example, root set can be (126, 129, a), where a=125 or 130 or 121 or 134 or 116 or 139 or 64 or 191. For yet another example, root set can be (116, 139, a), where a=125 or 130 or 121 or 134 or 126 or 129 or 64 or 191. For yet another example, root set can be (64, 191, a), where a=125 or 130 or 121 or 134 or 116 or 139 or 116 or 139.

The sequence $d_{PSS}(n)$ is mapped to the resource elements according to $$a_{k,l} = d_{PSS}(n), n = 0, \ldots, L_{PSS}-2, k = n - \frac{L_{PSST}-1}{2} + \frac{N_{RB}N_{SC}}{2}$$

and $$a_{k,l} = 0, n = -\frac{288-L_{PSS}+1}{2}, \ldots, -1, L_{PSS}-1, \ldots,$$
$$\frac{288+L_{PSS}+1}{2}-2, k = n - \frac{L_{PSS}-1}{2} + \frac{N_{RB}N_{SC}}{2}$$

where $N_{RB}$ is number of total RBs for transmission, and $N_{SC}$ is the number of subcarriers within a RB (e.g. $N_{SC}=12$). l corresponds to the OFDM symbol index where NR-PSS is transmitted.

In one embodiment of option 2, short ZC-sequence interleaved with zero sequence, the sequence $d_{PSS}(n)$ used for NR-PSS is generated from a frequency-domain ZC-sequence according to $$d_{PSS}(n) = \begin{cases} \sqrt{2} * e^{-j\frac{\pi u n(n+1)}{L_{PSS}}}, n = 0, 1, \ldots, \frac{L_{PSS}-3}{2} \\ \sqrt{2} * e^{-j\frac{\pi u (n+1)(n+2)}{L_{PSS}}}, n = \frac{L_{PSS}-1}{2}, \ldots, L_{PSS}-2 \end{cases}$$

where $L_{PSS}$ is the length of NR-PSS sequence, and $L_{PSS}$ is an odd number smaller than 130. In one example, $L_{PSS}=127$. In another example, $L_{PSS}=129$.

Figure 24:
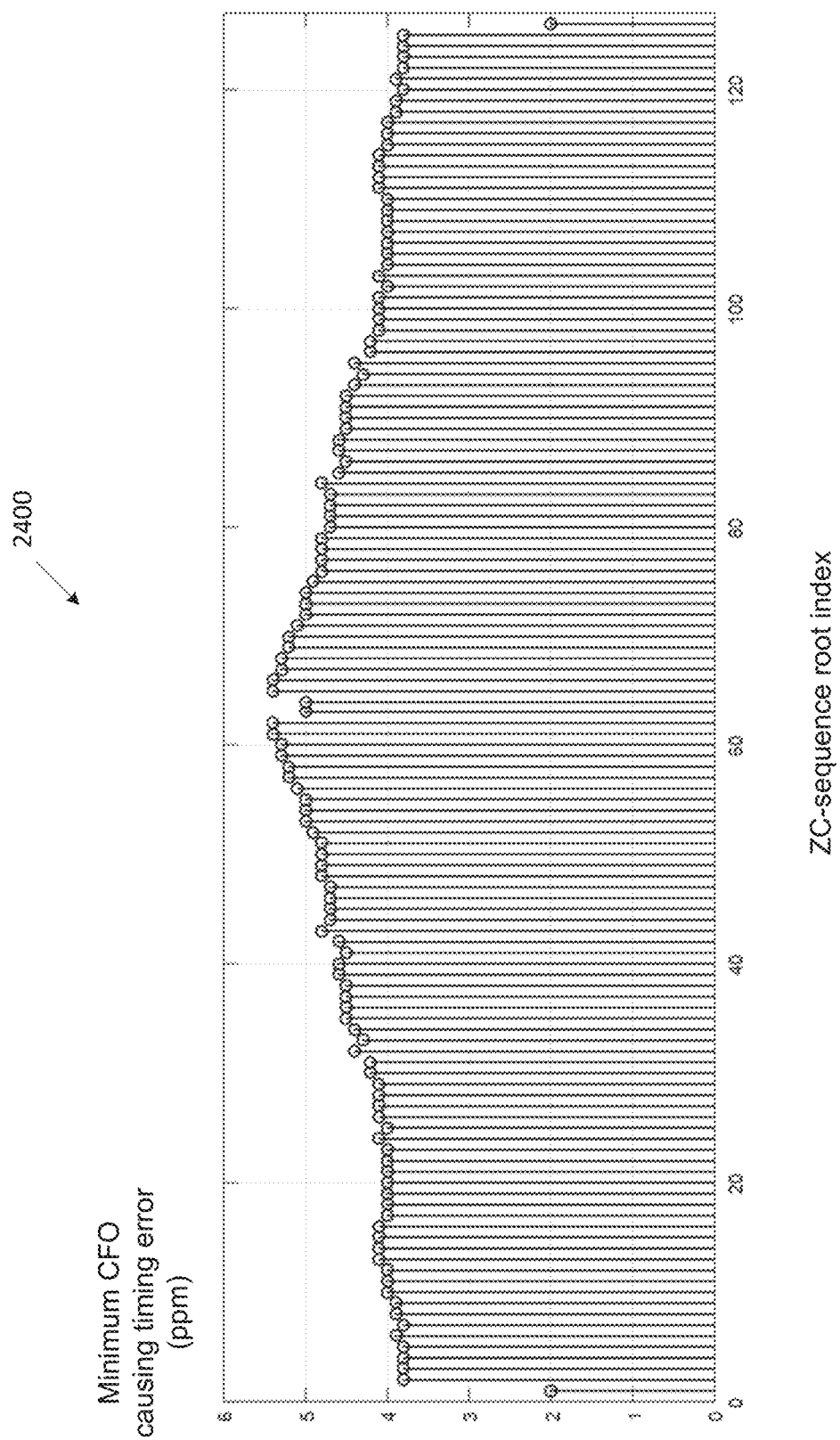
FIG. 24 illustrates another example capability to resist CFO according to embodiments of the present disclosure.

FIG. 24 illustrates another example capability to resist CFO 2400 according to embodiments of the present disclosure. The embodiment of the capability to resist CFO 2400 illustrated in FIG. 24 is for illustration only. FIG. 24 does not limit the scope of this disclosure to any particular implementation of the capability to resist CFO 2400.

The number of supported ZC-sequence root index u is given by the number of cell ID hypotheses contained in NR-PSS, and a value of the number of supported ZC-sequence root index u can be chosen from capability of the number of supported ZC-sequence root index u to resist the frequency domain offset (e.g. 5 ppm). For instance, as shown in FIG. 24, the potential values for u for $L_{PSS}=127$ can be chosen from $S_{127}=\{53, 54, \ldots, 73, 74\}$.

In one example, if only one NR-PSS sequence is supported in NR (which means no cell ID hypothesis in NR-PSS), there is one value for u (equivalent to defining a cell ID component in NR-PSS as $N_{ID}^{(2)}=0$), and the corresponding value can be 62 (best capability against CFO) or corresponding value's conjugate 65 (same capability against CFO as 62), or can be 61 (similar capability against CFO to 62)

or corresponding value's conjugate 66 (same capability against CFO as 61), or chosen from other values in $S_{127}$.

In another example, if two NR-PSS sequences are supported in NR to represent two cell ID hypotheses, there are two possible values for u (each of them is mapped to a cell ID component in NR-PSS as $N_{ID}^{(2)}$=0 or 1), and the two values are conjugate roots for ZC-sequence (i.e., the summation of values of u corresponding to $N_{ID}^{(2)}$=0 and 1 correspondingly equals to the length of ZC-sequence). One of such example of u values for $L_{PSS}$=127 can be (62, 65) or (61, 66) (best pairs with capability against CFO), or other conjugate pair chosen from $S_{127}$.

In yet another example, if three NR-PSS sequences are supported in NR to represent three cell ID hypotheses, there are three possible values for u (each of them is mapped to a cell ID component in NR-PSS as $N_{ID}^{(2)}$=0 or 1 or 2), and two of the values are conjugate roots for ZC-sequence (i.e., the summation of two values of u equals to the length of ZC-sequence), and the remaining one is chosen to have the best cross correlation with the conjugate pair (also selected from the set of best capability against CFO). One of such example of u values for $L_{PSS}$=127 can be (62, 65, a) or (61, 66, a) (best pairs with capability against CFO and another one a chosen from set $S_{127}$ like a=59 or 68), or other conjugate pair together with another root value chosen from $S_{127}$.

The sequence $d_{PSS}(n)$ is mapped to the resource elements according to $$a_{k,l} = \begin{cases} d(n), n = 0, 1, \ldots, \frac{L_{PSS}-3}{2}, k = 2*n - L_{PSS} + 1 + \frac{N_{RB}N_{SC}}{2} \\ d(n), n = \frac{L_{PSS}-1}{2}, \ldots, L_{PSS} - 2, k = 2*n - L_{PSS} + 2 + \frac{N_{RB}N_{SC}}{2} \end{cases}$$

and $a_{k,l}$=0 for the remaining k within the 288 REs with the same symbol index l, where $N_{RB}$ is number of total RBs for transmission, and $N_{SC}$ is the number of subcarriers within a RB (e.g. $N_{SC}$=12). l corresponds to the OFDM symbol index where NR-PSS is transmitted.

In one embodiment of option 3, long M-sequence without multiplexing or interleaved with other sequences (including zero sequence), the sequence $d_{PSS}(n)$ used for NR-PSS is generated from a frequency-domain M-sequence $d_M(m)$ with length 255 (0≤m≤254) according to $$d_{PSS}(n) = \begin{cases} 1 - 2*d_M(n), n = 0, 1, \ldots, 126 \\ 1 - 2*d_M(n+1), n = 127, \ldots, 253 \end{cases}$$

where each of the $d_M(m)$ is constructed based on TABLE 3, which shows the recursive construction method and corresponding polynomial and taps of register for M-sequence with power 8 (e.g. length 255).

TABLE 3

| | Recursive construction method | | |
|---|---|---|---|
| No. | Recursive construction method | Corresponding polynomial | Corresponding taps of register |
| 1 | $d_M(i+8) = [d_M(i+7) + d_M(i+6) + d_M(i+1) + d_M(i)]$mod 2, $0 \le i \le 246$ | $x^8 + x^7 + x^6 + x + 1$ | [1, 2, 7, 8] |
| 2 | $d_M(i+8) = [d_M(i+7) + d_M(i+2) + d_M(i+1) + d_M(i)]$mod 2, $0 \le i \le 246$ | $x^8 + x^7 + x^2 + x + 1$ | [1, 6, 7, 8] |
| 3 | $d_M(i+8) = [d_M(i+7) + d_M(i+5) + d_M(i+3) + d_M(i)]$mod 2, $0 \le i \le 246$ | $x^8 + x^7 + x^5 + x^3 + 1$ | [1, 3, 5, 8] |
| 4 | $d_M(i+8) = [d_M(i+5) + d_M(i+3) + d_M(i+1) + d_M(i)]$mod 2, $0 \le i \le 246$ | $x^8 + x^5 + x^3 + x + 1$ | [3, 5, 7, 8] |
| 5 | $d_M(i+8) = [d_M(i+6) + d_M(i+5) + d_M(i+4) + d_M(i)]$mod 2, $0 \le i \le 246$ | $x^8 + x^6 + x^5 + x^4 + 1$ | [2, 3, 4, 8] |
| 6 | $d_M(i+8) = [d_M(i+4) + d_M(i+3) + d_M(i+2) + d_M(i)]$mod 2, $0 \le i \le 246$ | $x^8 + x^4 + x^3 + x^2 + 1$ | [4, 5, 6, 8] |

TABLE 3-continued

| | Recursive construction method | | |
|---|---|---|---|
| No. | Recursive construction method | Corresponding polynomial | Corresponding taps of register |
| 7 | $d_M(i+8) = [d_M(i+6) + d_M(i+5) + d_M(i+3) + d_M(i)] \bmod 2, 0 \leq i \leq 246$ | $x^8 + x^6 + x^5 + x^3 + 1$ | [2, 3, 5, 8] |
| 8 | $d_M(i+8) = [d_M(i+5) + d_M(i+3) + d_M(i+2) + d_M(i)] \bmod 2, 0 \leq i \leq 246$ | $x^8 + x^5 + x^3 + x^2 + 1$ | [3, 5, 6, 8] |
| 9 | $d_M(i+8) = [d_M(i+6) + d_M(i+5) + d_M(i+2) + d_M(i)] \bmod 2, 0 \leq i \leq 246$ | $x^8 + x^6 + x^5 + x^2 + 1$ | [2, 3, 6, 8] |
| 10 | $d_M(i+8) = [d_M(i+6) + d_M(i+3) + d_M(i+2) + d_M(i)] \bmod 2, 0 \leq i \leq 246$ | $x^8 + x^6 + x^3 + x^2 + 1$ | [2, 5, 6, 8] |
| 11 | $d_M(i+8) = [d_M(i+6) + d_M(i+5) + d_M(i+1) + d_M(i)] \bmod 2, 0 \leq i \leq 246$ | $x^8 + x^6 + x^5 + x + 1$ | [2, 3, 7, 8] |
| 12 | $d_M(i+8) = [d_M(i+7) + d_M(i+3) + d_M(i+2) + d_M(i)] \bmod 2, 0 \leq i \leq 246$ | $x^8 + x^7 + x^3 + x^2 + 1$ | [1, 5, 6, 8] |
| 13 | $d_M(i+8) = [d_M(i+7) + d_M(i+6) + d_M(i+5) + d_M(i+4) + d_M(i+2) + d_M(i)] \bmod 2, 0 \leq i \leq 246$ | $x^8 + x^7 + x^6 + x^5 + x^4 + x^2 + 1$ | [1, 2, 3, 4, 6, 8] |
| 14 | $d_M(i+8) = [d_M(i+6) + d_M(i+4) + d_M(i+3) + d_M(i+2) + d_M(i+1) + d_M(i)] \bmod 2, 0 \leq i \leq 246$ | $x^8 + x^6 + x^4 + x^3 + x^2 + x + 1$ | [2, 4, 5, 6, 7, 8] |
| 15 | $d_M(i+8) = [d_M(i+7) + d_M(i+6) + d_M(i+5) + d_M(i+2) + d_M(i+1) + d_M(i)] \bmod 2, 0 \leq i \leq 246$ | $x^8 + x^7 + x^6 + x^5 + x^2 + x + 1$ | [1, 2, 3, 6, 7, 8] |
| 16 | $d_M(i+8) = [d_M(i+7) + d_M(i+6) + d_M(i+3) + d_M(i+2) + d_M(i+1) + d_M(i)] \bmod 2, 0 \leq i \leq 246$ | $x^8 + x^7 + x^6 + x^5 + x^2 + x + 1$ | [1, 2, 5, 6, 7, 8] |

The initial condition can be $d_M(0)=d_M(1)=d_M(2)=d_M(3)=d_M(4)=d_M(5)=d_M(6)=0$, $d_M(7)=1$, or can be $d_M(0)=d_M(1)=d_M(2)=d_M(3)=d_M(4)=d_M(5)=d_M(6)=d_M(7)=1$.

Figure 25:
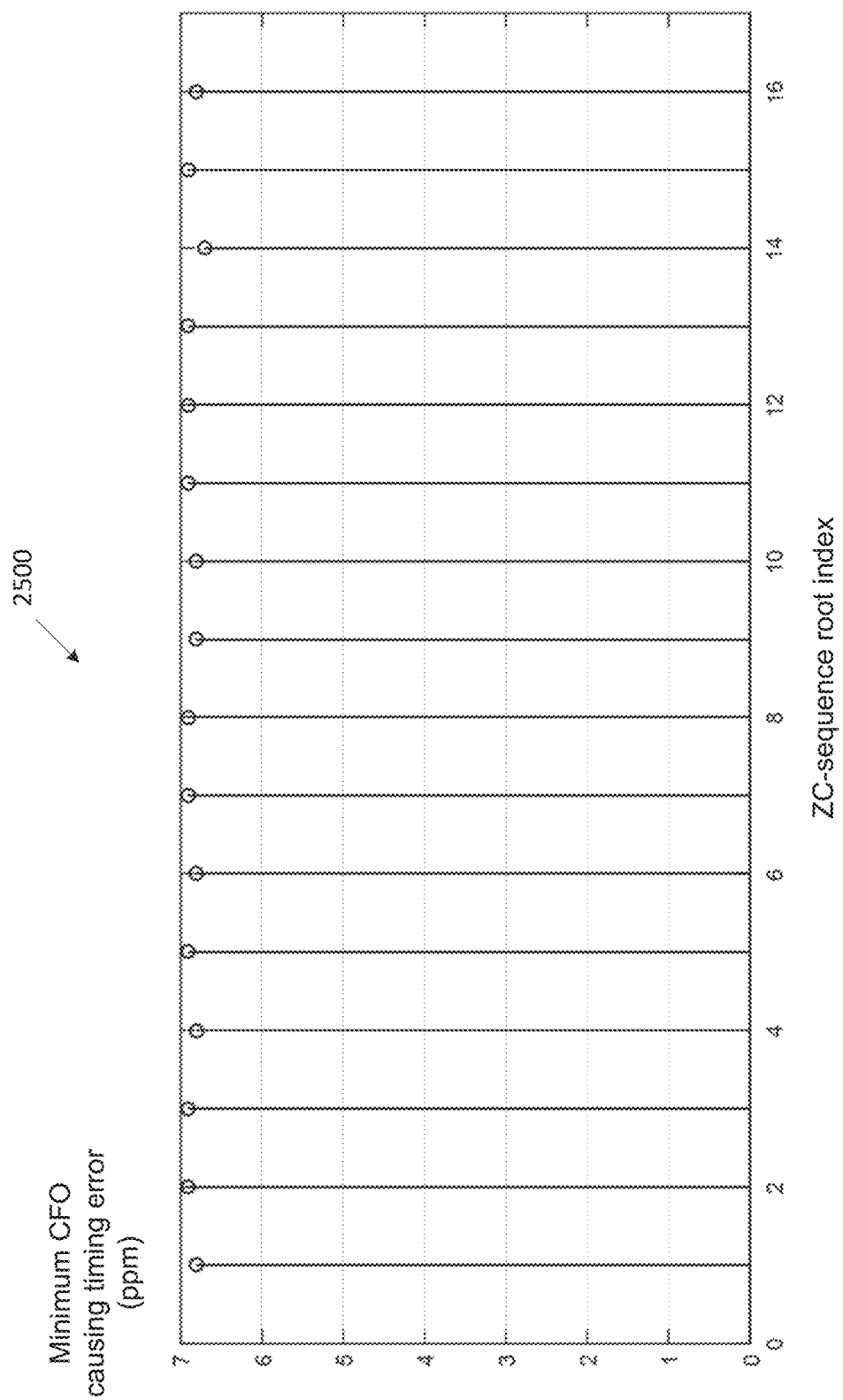
FIG. 25 illustrates yet another example capability to resist CFO according to embodiments of the present disclosure.

FIG. 25 illustrates yet another example capability to resist CFO 2500 according to embodiments of the present disclosure. The embodiment of the capability to resist CFO 2500 illustrated in FIG. 25 is for illustration only. FIG. 25 does not limit the scope of this disclosure to any particular implementation of the capability to resist CFO 2500.

If only one NR-PSS sequence is supported in NR (which means no cell ID hypothesis in NR-PSS), there is one sequence from TABLE 3 utilized (equivalent to defining a cell ID component in NR-PSS as $N_{ID}^{(2)}=0$), and the particular sequence number can be one from TABLE 3 since all sequences in TABLE 3 have similar capability for resisting CFO as shown in FIG. 25.

If more than one NR-PSS sequences are supported in NR to represent the same number of cell ID hypotheses (one sequence corresponds to one value of $N_{ID}^{(2)}$), in one embodiment, these sequences are selected from TABLE 3 such that the cross-correlation among the sequences is maximized. In another embodiment, one sequence from TABLE 3 is utilized as the base sequence, and cyclic shift and/or scrambling sequence is performed on the base sequence to distinguish cell ID hypotheses.

The sequence $d_{PSS}(n)$ is mapped to the resource elements according to $$a_{k,l} = d_{PSS}(n), n = 0, \ldots, 253, k = n - 127 + \frac{N_{RB}N_{SC}}{2}$$

and $$a_{k,l} = 0, n = -17, \ldots, -1, 254, \ldots, 270, k = n - 127 + \frac{N_{RB}N_{SC}}{2}$$

where $N_{RB}$ is number of total RBs for transmission, and $N_{SC}$ is the number of subcarriers within a RB (e.g. $N_{SC}=12$). l corresponds to the OFDM symbol index where NR-PSS is transmitted In one embodiment of option 4, short M-sequence interleaved with zero sequence, the sequence $d_{PSS}(n)$ used for NR-PSS is generated from a BPSK modulated frequency-domain M-sequence $d_M(m)$ with length 127 as in option 3 of Component I.B, but mapped to central and interleaved subcarriers within the 288 subcarriers. For example, the length-127 NR-PSS sequence is mapped to even subcarrier #14, #16, . . . , #266 (subcarrier starting with #0). In one example, the length-127 NR-PSS sequence is mapped to even subcarrier #12, #14, . . . , #264 (subcarrier starting with #0). In another example, the length-127 NR-PSS sequence is mapped to odd subcarrier #13, #15, . . . , #265 (subcarrier starting with #0). For yet another example, the length-127 NR-PSS sequence is mapped to odd subcarrier #11, #13, . . . , #263 (subcarrier starting with #0).

In some embodiments of component VII.B, the maximum number of resource elements available within one OFDM symbol for transmitting NR-PSS is 144 (equivalent to 12 RBs), which corresponds to (note that the bandwidth contains guard band, and actual transmission bandwidth can be a little bit smaller): frequency range A associated with 15 kHz subcarrier spacing and 2.5 MHz NR-PSS transmission bandwidth (including guard band); frequency range B associated with 30 kHz subcarrier spacing and 5 MHz NR-PSS transmission bandwidth (including guard band); frequency range C associated with 60 kHz subcarrier spacing and 10 MHz NR-PSS transmission bandwidth (including guard band); frequency range D associated with 120 kHz subcarrier spacing and 20 MHz NR-PSS transmission bandwidth (including guard band); and frequency range E associated with 240 kHz subcarrier spacing and 40 MHz NR-PSS transmission bandwidth (including guard band).

In one example, frequency range A can be around 0 to 2 GHz, frequency range B can be around 2 to 6 GHz, frequency range D can be above 6 GHz. For another example, frequency range A can be around 0 to 2 GHz, frequency range B can be around 2 to 6 GHz, frequency range E can be above 6 GHz. For yet another example, frequency range A can be around 0 to 6 GHz, frequency range D can be above 6 GHz. For yet another example, frequency range A can be around 0 to 6 GHz, frequency range E can be above 6 GHz.

In one embodiment, the same NR-PSS sequence(s) is utilized for the frequency ranges A to E by scaling the subcarrier spacing.

Note that the numerology of NR-PSS can be different from data multiplexed in the same symbol, so guard band is needed on both side of NR-PSS sequence in frequency domain, and the size of guard band is around 10% (which correspond to around 14 REs in this sub-embodiment) such that the maximum number of REs for transmitting NR-PSS may be reduced to around 130. Based on this consideration, the design of NR-PSS sequence can be selected as one of the following options.

In one embodiment of option 1, long ZC-sequence without multiplexing or interleaved with other sequences (including zero sequence, the sequence $d_{PSS}(n)$ used for NR-PSS is generated from a frequency-domain ZC-sequence according to $$d_{PSS}(n) = \begin{cases} e^{-j\frac{\pi u n(n+1)}{L_{PSS}}}, & n = 0, 1, \ldots, \frac{L_{PSS}-3}{2} \\ e^{-j\frac{\pi u (n+1)(n+2)}{L_{PSS}}}, & n = \frac{L_{PSS}-1}{2}, \ldots, L_{PSS}-2 \end{cases}$$

where $L_{PSS}$ is the length of NR-PSS sequence, and $L_{PSS}$ is an odd number smaller than 130. In one example, $L_{PSS}=127$. In another example, $L_{PSS}=129$.

The number of supported ZC-sequence root index u is given by the number of cell ID hypotheses contained in NR-PSS, and a value of the number of supported ZC-sequence root index u can be chosen from capability of the number of supported ZC-sequence root index u to resist the frequency domain offset (e.g. 5 ppm) and/or PAPR and/or CM properties. For instance, as shown in FIG. 24, the potential values for u for $L_{PSS}=127$ can be chosen from $S_{127}=\{53, 54, \ldots, 73, 74\}$.

In one example, if only one NR-PSS sequence is supported in NR (which means no cell ID hypothesis in NR-PSS), there is one value for u (equivalent to defining a cell ID component in NR-PSS as $N_{ID}^{(2)}=0$), and the corresponding value can be 62 (best capability against CFO) or corresponding value's conjugate 65 (same capability against CFO as 62), or can be 61 (similar capability against CFO to 62) or corresponding value's conjugate 66 (same capability against CFO as 61), or chosen from other values in $S_{127}$.

In another example, if two NR-PSS sequences are supported in NR to represent two cell ID hypotheses, there are two possible values for u (each of them is mapped to a cell ID component in NR-PSS as $N_{ID}^{(2)}=0$ or 1), and the two values are conjugate roots for ZC-sequence (i.e., the summation of values of u corresponding to $N_{ID}^{(2)}=0$ and 1 correspondingly equals to the length of ZC-sequence). One of such example of u values for $L_{PSS}=127$ can be (62, 65) or (61, 66) (best pairs with capability against CFO), or other conjugate pair chosen from $S_{127}$.

In yet another example, if three NR-PSS sequences are supported in NR to represent three cell ID hypotheses, there are three possible values for u (each of them is mapped to a cell ID component in NR-PSS as $N_{ID}^{(2)}=0$ or 1 or 2), and two of the values are conjugate roots for ZC-sequence (i.e., the summation of two values of u equals to the length of ZC-sequence), and the remaining one is chosen to have the best cross correlation with the conjugate pair (also selected from the set of best capability against CFO). One of such example of u values for $L_{PSS}=127$ can be (62, 65, a) or (61, 66, a) (best pairs with capability against CFO and another one a chosen from set $S_{127}$ like a=59 or 68), or other conjugate pair together with another root value chosen from $S_{127}$.

The sequence $d_{PSS}(n)$ is mapped to the resource elements according to $$a_{k,l} = d_{PSS}(n), n = 0, \ldots, L_{PSS} - 2, k = n - \frac{L_{PSS}-1}{2} + \frac{N_{RB}N_{SC}}{2}$$

and $$a_{k,l} = 0, n = -\frac{144-L_{PSS}+1}{2}, \ldots, -1, L_{PSS} - 1, \ldots,$$
$$\frac{144+L_{PSS}+1}{2} - 2, k = n - \frac{L_{PSS}-1}{2} + \frac{N_{RB}N_{SC}}{2}$$

where $N_{RB}$ is number of total RBs for transmission, and $N_{SC}$ is the number of subcarriers within a RB (e.g. $N_{SC}=12$). l corresponds to the OFDM symbol index where NR-PSS is transmitted.

In one embodiment of option 2, short ZC-sequence interleaved with zero sequence, the sequence $d_{PSS}(n)$ used for NR-PSS is generated from a frequency-domain ZC-sequence according to $$d_{PSS}(n) = \begin{cases} \sqrt{2}*e^{-j\frac{\pi un(n+1)}{L_{PSS}}}, n = 0, 1, \ldots, \frac{L_{PSS}-3}{2} \\ \sqrt{2}*e^{-j\frac{\pi u(n+1)(n+2)}{L_{PSS}}}, n = \frac{L_{PSS}-1}{2}, \ldots, L_{PSS} - 2 \end{cases}$$

where $L_{PSS}$ is the length of NR-PSS sequence, and $L_{PSS}$ is an odd number smaller than 65. For example, $L_{PSS}=63$. For another example, $L_{PSS}=65$.

Figure 26:
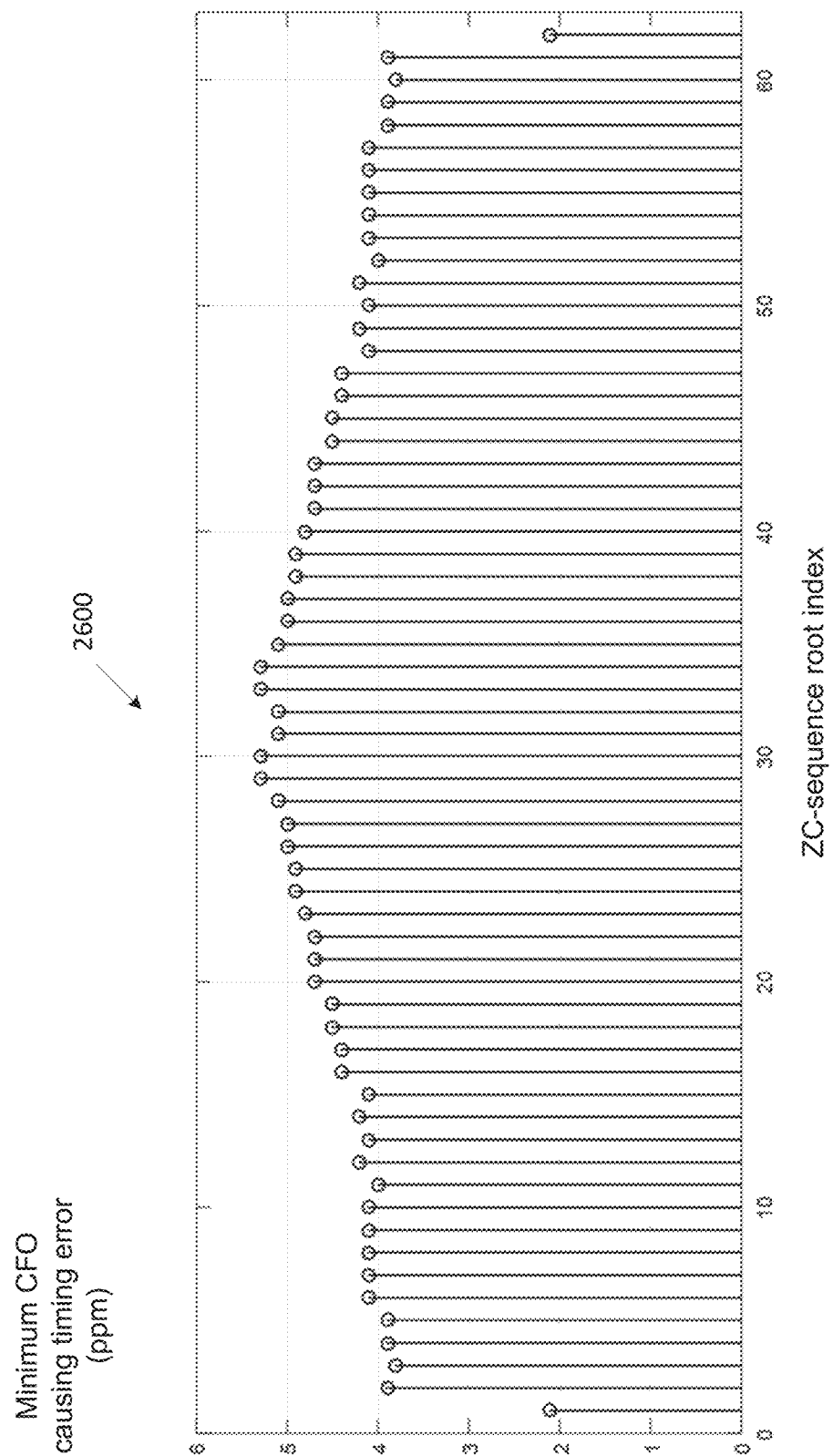
FIG. 26 illustrates yet another example capability to resist CFO according to embodiments of the present disclosure.

FIG. 26 illustrates yet another example capability to resist CFO 2600 according to embodiments of the present disclosure. The embodiment of the capability to resist CFO 2600 illustrated in FIG. 26 is for illustration only. FIG. 26 does not limit the scope of this disclosure to any particular implementation of the capability to resist CFO 2600.

The number of supported ZC-sequence root index u is given by the number of cell ID hypotheses contained in NR-PSS, and a value of the number of supported ZC-sequence root index u can be chosen from capability of the number of supported ZC-sequence root index u to resist frequency domain offset (e.g. 5 ppm). For instance, as shown in FIG. 26, the potential values for u for $L_{PSS}=63$ can be chosen from $S_{63}=\{26, 27, \ldots, 36, 37\}$.

In one example, if only one NR-PSS sequence is supported in NR (which means no cell ID hypothesis in NR-PSS), there is one value for u (equivalent to defining a cell ID component in NR-PSS as $N_{ID}^{(2)}=0$), and the corresponding value can be 29 (best capability against CFO) or corresponding value's conjugate 34 (same capability against CFO as 34), or can be 30 (similar capability against CFO to 29) or corresponding value's conjugate 33 (same capability against CFO as 30), or chosen from other values in $S_{63}$.

In another example, if two NR-PSS sequences are supported in NR to represent two cell ID hypotheses, there are two possible values for u (each of them is mapped to a cell ID component in NR-PSS as $N_{ID}^{(2)}=0$ or 1), and the two values are conjugate roots for ZC-sequence (i.e., the summation of values of u corresponding to $N_{ID}^{(2)}=0$ and 1 correspondingly equals to the length of ZC-sequence). One of such example of u values for $L_{PSS}=63$ can be (29, 34) or (30, 33) (best pairs with capability against CFO), or other conjugate pair chosen from $S_{63}$.

In yet another example, if three NR-PSS sequences are supported in NR to represent three cell ID hypotheses, there are three possible values for u (each of them is mapped to a cell ID component in NR-PSS as $N_{ID}^{(2)}=0$ or 1 or 2), and two of the values are conjugate roots for ZC-sequence (i.e., the summation of two values of u equals to the length of ZC-sequence), and the remaining one is chosen to have the best cross correlation with the conjugate pair (also selected from the set of best capability against CFO). One of such example of u values for $L_{PSS}=63$ can be (29, 34, a) or (30, 33, a) (best pairs with capability against CFO and another one a chosen from set $S_{127}$ like a=26 or 37), or other conjugate pair together with another root value chosen from $S_{127}$.

The sequence $d_{PSS}(n)$ is mapped to the resource elements according to $$a_{k,l} = \begin{cases} d(n), n = 0, 1, \ldots, \frac{L_{PSS}-3}{2}, k = 2*n - L_{PSS} + 1 + \frac{N_{RB}N_{SC}}{2} \\ d(n), n = \frac{L_{PSS}-1}{2}, \ldots, L_{PSS} - 2, k = 2*n - L_{PSS} + 2 + \frac{N_{RB}N_{SC}}{2} \end{cases}$$

and $a_{k,l}=0$ for the remaining k within the 144 REs with the same symbol index l, where $N_{RB}$ is number of total RBs for transmission, and $N_{SC}$ is the number of subcarriers within a RB (e.g. $N_{SC}=12$). l corresponds to the OFDM symbol index where NR-PSS is transmitted.

In one embodiment of option 3, long M-sequence without multiplexing or interleaved with other sequences (including zero sequence), the sequence $d_{PSS}(n)$ used for NR-PSS is generated from a BPSK modulated frequency-domain M-sequence $d_M(m)$ with length 127 ($0 \leq m \leq 126$) according to $$d_{PSS}(n) = \begin{cases} 1-2*d_M(n), n = 0, 1, \ldots, 62 \\ 1-2*d_M(n+1), n = 63, \ldots, 125 \end{cases}$$

if the DC subcarrier is truncated, or according to $d_{PSS}(n)=1-2*d_M(n)$, n=0, 1, . . . , 126 if the DC subcarrier is not truncated, where each of the $d_M(m)$ is constructed based on TABLE 4, which shows the recursive construction method and corresponding polynomial and taps of register for M-sequence with power 7 (e.g. length 127).

TABLE 4

| | Recursive construction method | | |
|---|---|---|---|
| No. | Recursive construction method | Corresponding polynomial | Corresponding taps of register |
| 1 | $d_M(i+7) = [d_M(i+6) + d_M(i)] \bmod 2, 0 \le i \le 119$ | $x^7 + x^6 + 1$ | [1, 7] |
| 2 | $d_M(i+7) = [d_M(i+1) + d_M(i)] \bmod 2, 0 \le i \le 119$ | $x^7 + x + 1$ | [6, 7] |
| 3 | $d_M(i+7) = [d_M(i+4) + d_M(i)] \bmod 2, 0 \le i \le 119$ | $x^7 + x^4 + 1$ | [3, 7] |
| 4 | $d_M(i+7) = [d_M(i+3) + d_M(i)] \bmod 2, 0 \le i \le 119$ | $x^7 + x^3 + 1$ | [4, 7] |
| 5 | $d_M(i+7) = [d_M(i+6) + d_M(i+5) + d_M(i+4) + d_M(i)] \bmod 2, 0 \le i \le 119$ | $x^7 + x^6 + x^5 + x^4 + 1$ | [1, 2, 3, 7] |
| 6 | $d_M(i+7) = [d_M(i+3) + d_M(i+2) + d_M(i+1) + d_M(i)] \bmod 2, 0 \le i \le 119$ | $x^7 + x^3 + x^2 + x + 1$ | [4, 5, 6, 7] |
| 7 | $d_M(i+7) = [d_M(i+6) + d_M(i+5) + d_M(i+2) + d_M(i)] \bmod 2, 0 \le i \le 119$ | $x^7 + x^6 + x^5 + x^2 + 1$ | [1, 2, 5, 7] |
| 8 | $d_M(i+7) = [d_M(i+5) + d_M(i+2) + d_M(i+1) + d_M(i)] \bmod 2, 0 \le i \le 119$ | $x^7 + x^5 + x^2 + x + 1$ | [2, 5, 6, 7] |
| 9 | $d_M(i+7) = [d_M(i+5) + d_M(i+4) + d_M(i+3) + d_M(i)] \bmod 2, 0 \le i \le 119$ | $x^7 + x^5 + x^4 + x^3 + 1$ | [2, 3, 4, 7] |
| 10 | $d_M(i+7) = [d_M(i+4) + d_M(i+3) + d_M(i+2) + d_M(i)] \bmod 2, 0 \le i \le 119$ | $x^7 + x^4 + x^3 + x^2 + 1$ | [3, 4, 5, 7] |
| 11 | $d_M(i+7) = [d_M(i+6) + d_M(i+4) + d_M(i+2) + d_M(i)] \bmod 2, 0 \le i \le 119$ | $x^7 + x^6 + x^4 + x^2 + 1$ | [1, 3, 5, 7] |
| 12 | $d_M(i+7) = [d_M(i+5) + d_M(i+3) + d_M(i+1) + d_M(i)] \bmod 2, 0 \le i \le 119$ | $x^7 + x^5 + x^3 + x + 1$ | [2, 4, 6, 7] |

TABLE 4-continued

Recursive construction method

| No. | Recursive construction method | Corresponding polynomial | Corresponding taps of register |
|---|---|---|---|
| 13 | $d_M(i+7) = [d_M(i+6) + d_M(i+4) + d_M(i+1) + d_M(i)] \bmod 2, 0 \leq i \leq 119$ | $x^7 + x^6 + x^4 + x + 1$ | [1, 3, 6, 7] |
| 14 | $d_M(i+7) = [d_M(i+6) + d_M(i+3) + d_M(i+1) + d_M(i)] \bmod 2, 0 \leq i \leq 119$ | $x^7 + x^6 + x^3 + x + 1$ | [1, 4, 6, 7] |
| 15 | $d_M(i+7) = [d_M(i+5) + d_M(i+4) + d_M(i+3) + d_M(i+2) + d_M(i+1) + d_M(i)] \bmod 2, 0 \leq i \leq 119$ | $x^7 + x^5 + x^4 + x^3 + x^2 + x + 1$ | [2, 3, 4, 5, 6, 7] |
| 16 | $d_M(i+7) = [d_M(i+6) + d_M(i+5) + d_M(i+4) + d_M(i+3) + d_M(i+2) + d_M(i)] \bmod 2, 0 \leq i \leq 119$ | $x^7 + x^6 + x^5 + x^4 + x^3 + x^2 + 1$ | [1, 2, 3, 4, 5, 7] |
| 17 | $d_M(i+7) = [d_M(i+6) + d_M(i+5) + d_M(i+3) + d_M(i+2) + d_M(i+1) + (d_M(i)] \bmod 2, 0 \leq i \leq 119$ | $x^7 + x^5 + x^5 + x^3 + x^2 + x + 1$ | [1, 2, 4, 5, 6, 7] |
| 18 | $d_M(i+7) = [d_M(i+6) + d_M(i+5) + d_M(i+4) + d_M(i+2) + d_M(i+1) + d_M(i)] \bmod 2, 0 \leq i \leq 119$ | $x^7 + x^6 + x^5 + x^4 + x^2 + x + 1$ | [1, 2, 3, 5, 6, 7] |

The initial condition can be $d_M(0)=d_M(1)=d_M(2)=d_M(3)=d_M(4)=d_M(5)=0$, $d_M(6)=1$, or can be $d_M(0)=d_M(1)=d_M(2)=d_M(3)=d_M(4)=d_M(5)=d_M(6)=1$, or other values that can facilitate small PAPR/CM value of the sequence.

Figure 27:
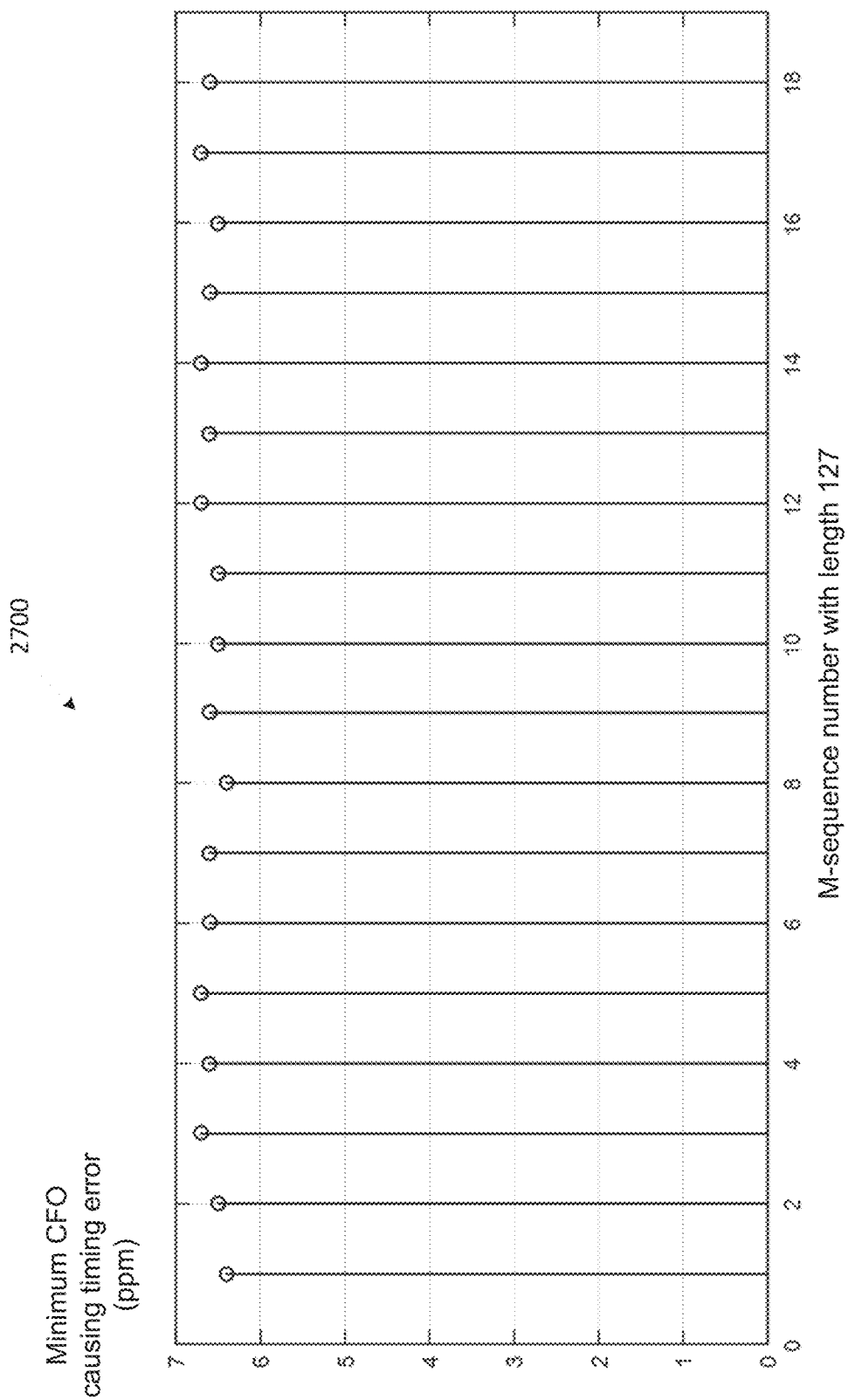
FIG. 27 illustrates yet another example capability to resist CFO according to embodiments of the present disclosure.

FIG. 27 illustrates yet another example capability to resist CFO 2700 according to embodiments of the present disclosure. The embodiment of the capability to resist CFO 2700 illustrated in FIG. 27 is for illustration only. FIG. 27 does not limit the scope of this disclosure to any particular implementation of the capability to resist CFO 2700.

If only one NR-PSS sequence is supported in NR (which means no cell ID hypothesis in NR-PSS), there is one sequence from TABLE 4 utilized (equivalent to defining a cell ID component in NR-PSS as $N_{ID}^{(2)}=0$), and the particular sequence number can be one from TABLE 4 since all sequences in TABLE 4 have similar capability for resisting CFO as shown in FIG. 27.

If more than one NR-PSS sequences are supported in NR to represent the same number of cell ID hypotheses carried by NR-PSS (one NR-PSS sequence corresponds to one value of $N_{ID}^{(2)}$), in one embodiment, these sequences are selected from TABLE 4 such that the cross-correlation among the sequences is maximized. In another embodiment, one sequence from TABLE 4 is utilized as the base sequence, and cyclic shift and/or scrambling sequence is performed on the base sequence to represent cell ID hypotheses carried by NR-PSS.

The sequence $d_{PSS}(n)$ is mapped to the central resource elements within the symbol for NR-PSS according to $$a_{k,l} = d_{PSS}(n), n = 0, \ldots, 125, k = n - 63 + \frac{N_{RB}N_{SC}}{2} \text{ and}$$

$$a_{k,l} = 0, n = -9, \ldots, -1, 126, \ldots, 134, k = n - 63 + \frac{N_{RB}N_{SC}}{2}$$

if the DC subcarrier is truncated, and according to $$a_{k,l} = d_{PSS}(n), n = 0, \ldots, 126, k = n - 63 + \frac{N_{RB}N_{SC}}{2} \text{ and}$$

$$a_{k,l} = 0, n = -9, \ldots, -1, 127, \ldots, 134, k = n - 63 + \frac{N_{RB}N_{SC}}{2} \text{ or}$$

$$a_{k,l} = d_{PSS}(n+1), n = -1, \ldots, 125, k = n - 63 + \frac{N_{RB}N_{SC}}{2} \text{ and}$$

$$a_{k,l} = 0, n = -9, \ldots, -2, 126, \ldots, 134, k = n - 63 + \frac{N_{RB}N_{SC}}{2}$$

if the DC subcarrier is not truncated, where $N_{RB}$ is number of total RBs for NR-PSS transmission (e.g. $N_{RB}$=12), and $N_{SC}$ is the number of subcarriers within a RB (e.g. $N_{SC}$=12). l corresponds to the OFDM symbol index where NR-PSS is transmitted.

In some embodiments of component VIII, the functionality of SSS sequence is to detect the other part of cell ID based on the coarse time-domain and frequency-domain synchronization detection from PSS. CP size and duplexing mode information are also detected by SSS. The construction of SSS sequences are based on the maximum length sequences (also known as M-sequences). Each SSS sequence is constructed by interleaving two length-31 BPSK modulated subsequences in frequency domain, where the two subsequences are constructed from the same M-sequence using different cyclic shifts. The cyclic shift indices for both parts are functions of the physical cell ID group.

For NR, the basic functionalities of NR-SSS remain to detect the cell ID or part of the cell ID, CP size and duplexing mode if supported in NR, as well as other possible information carried by NR-SSS (e.g. SS block timing index). The functionalities and designs of the NR-SSS sequence can be different from LTE system, due to potentially larger synchronization transmission bandwidth (such that longer sequence length), larger cell ID number, and larger periodicity.

Note that in one embodiment, NR-SSS is mapped to the same number of REs/subcarriers within one OFDM symbol as NR-PSS (repetition of NR-SSS and/or NR-PSS symbols in time domain is not counted), and the two signals are multiplexed in time domain using the same numerology.

The following sub-components are distinguished based on different maximum number of resource elements available within one OFDM symbol for transmitting NR-SSS.

In one embodiment of component VIII.A, design of One-port NR-SSS Sequence for 288 REs, the maximum number of resource elements available within one OFDM symbol for transmitting NR-SSS is 288 (equivalent to 24 RBs), which corresponds to (note that the bandwidth contains guard band, and actual transmission bandwidth can be a little bit smaller): frequency range A associated with 15 kHz subcarrier spacing and 5 MHz NR-PSS transmission bandwidth (including guard band); frequency range B associated with 30 kHz subcarrier spacing and 10 MHz NR-PSS transmission bandwidth (including guard band); frequency range C associated with 60 kHz subcarrier spacing and 20 MHz NR-PSS transmission bandwidth (including guard band); frequency range D associated with 120 kHz subcarrier spacing and 40 MHz NR-PSS transmission bandwidth (including guard band); and frequency range E associated with 240 kHz subcarrier spacing and 80 MHz NR-PSS transmission bandwidth (including guard band).

In one example, frequency range A can be around 0 to 2 GHz, frequency range B can be around 2 to 6 GHz, frequency range D can be above 6 GHz. For another example, frequency range A can be around 0 to 2 GHz, frequency range B can be around 2 to 6 GHz, frequency range E can be above 6 GHz. For yet another example, frequency range A can be around 0 to 6 GHz, frequency range D can be above 6 GHz. For yet another example, frequency range A can be around 0 to 6 GHz, frequency range E can be above 6 GHz.

In one embodiment, the same NR-SSS sequence(s) is utilized for the frequency ranges A to E by scaling the subcarrier spacing.

Note that the numerology of NR-SSS can be different from data multiplexed in the same symbol, so guard band is needed on both side of NR-SSS sequence in frequency domain, and the size of guard band is around 10% (which correspond to around 28 REs in this sub-embodiment) such that the maximum number of REs for transmitting NR-SSS may be reduced to around 260, and the same as NR-PSS. Based on this consideration, the design of one-port based NR-SSS sequence can be selected as one of the following options.

In one embodiment of option 1, interleaved two M-sequences, for the design of one-port based NR-SSS sequence for 288 REs using M-sequences, the NR-SSS sequence is with length 254, and the sequence $d_{SSS}(0), \ldots, d_{SSS}(253)$ is an interleaved concatenation of two length-127 binary sequences, where each of the binary sequence is constructed based on length-127 M-sequences. The concatenated sequence is scrambled with a scrambling sequence using the cell ID information in NR-PSS if there is such information in NR-PSS, or scrambled by an all one sequence (equivalent as no scrambling) or a common scrambling sequence for all cell ID if there is no cell ID information in NR-PSS.

More precisely, the combination of two length-127 sequences defining the NR-SSS is according to $d_{SSS}(2n)=s_{m_0}(n)c_0(n)z_x(n)$, and $d_{SSS}(2n+1)=s_{m_1}(n)c_1(n)z_y(n)$ where $0 \le n \le 126$, and the particular meaning of parameters and sequences in the equations are detailed as follow.

In one embodiment, NR-SSS only carries part of or the whole cell ID information and no timing information, or NR-SSS carries both part of or the whole cell ID information and timing information, but timing information is carried by $z_x(n)$, then the number of hypotheses to be supported by the combination of $m_0$ and $m_1$ is $N_{SSS}$ (note that $N_{SSS} \cdot N_{PSS}$ is the number of cell ID in this case). The combination of $m_0$ and $m_1$ to represent a hypotheses H can be according to (equivalent to TABLE 5)

$$m_0 = m' \bmod 127, m_1 = \left(m_0 + \left\lfloor \frac{m'}{127} \right\rfloor + 1\right) \bmod 127,$$

$$m' = H + q(q+1)/2, q = \left\lfloor \frac{H + q'(q'+1)/2}{126} \right\rfloor, \text{ and}$$

$$q' = \left\lfloor \frac{H}{126} \right\rfloor$$

and the $N_{SSS}$ cell ID hypotheses can be selected from the 8001 hypotheses. In one sub-embodiment, $N_{ID}^{(1)}$ can be chosen as the first $N_{SSS}$ hypotheses in TABLE 5, i.e., $H=N_{ID}^{(1)}$, for $0 \le N_{ID}^{(1)} \le N_{SSS}-1$. In another sub-embodiment, $N_{ID}^{(1)}$ can be uniformed selected from the 8001 hypotheses in TABLE 5, e.g. $H=a \cdot N_{ID}^{(1)}+b$ for $0 \le N_{ID}^{(1)} \le N_{SSS}-1$, and a can be 2 or 3 or ... or $[8001/N_{SSS}]$, and b can be 0 or 1 or ... or a-1.

TABLE 5

| Combination of $m_0$ and $m_1$ | | | | | | | | | | | |
|---|---|---|---|---|---|---|---|---|---|---|---|
| H | $m_0$ | $m_1$ | H | $m_0$ | $m_1$ | H | $m_0$ | $m_1$ | H | $m_0$ | $m_1$ |
| 0 | 0 | 1 | 251 | 0 | 3 | ... | ... | ... | ... | ... | ... |
| 1 | 1 | 2 | 252 | 1 | 4 | ... | ... | ... | ... | ... | ... |
| ... | ... | ... | ... | ... | ... | ... | ... | ... | 7995 | 0 | 124 |
| 125 | 125 | 126 | 374 | 123 | 126 | ... | ... | ... | 7996 | 1 | 125 |
| 126 | 0 | 2 | 375 | 0 | 4 | ... | ... | ... | 7997 | 2 | 126 |

TABLE 5-continued

| | Combination of $m_0$ and $m_1$ | | | | | | | | | | |
|---|---|---|---|---|---|---|---|---|---|---|---|
| H | $m_0$ | $m_1$ | H | $m_0$ | $m_1$ | H | $m_0$ | $m_1$ | H | $m_0$ | $m_1$ |
| 127 | 1 | 3 | 376 | 1 | 5 | ... | ... | ... | 7998 | 0 | 125 |
| ... | ... | ... | ... | ... | ... | ... | ... | ... | 7999 | 1 | 126 |
| 250 | 124 | 126 | 497 | 122 | 126 | ... | ... | ... | 8000 | 0 | 126 |

In another embodiment, NR-SSS carries both part of or the whole cell ID information and timing information, and the number of hypotheses to be supported by the combination of $m_0$ and $m_1$ is $N_{SSS} \cdot N_b$ (note that $N_{SSS} \cdot N_{PSS}$ is the number of cell ID in this case), where $N_b$ is the number of timing information hypotheses to be carried by the combination of $m_0$ and $m_1$. For example, in single beam system, if NR-SSS carries timing information indicating the NR-SSS symbol index when multiple NR-SSS are transmitted within a radio frame (e.g., similar to LTE specification), then $N_b$ can be the number of possible positions of NR-SSS within a radio frame. For another example, in multiple beam system, $N_b$ can be the number of SS block timing index to be indicated by current NR-SSS (note that it can be the whole SS block timing index information or part of it). The combination of $m_0$ and $m_1$ to represent a hypotheses H can be the same as the previous embodiment (also equivalent to TABLE 5) and the $N_{SSS} \cdot N_b$ hypotheses can be selected from the 8001 hypotheses in TABLE 5. In one sub-embodiment, the combination of cell ID hypothesis $N_{ID}^{(1)}$ and timing index $I_b$ can be chosen as the first $N_{SSS} \cdot N_{PSS}$ hypotheses in TABLE 5, e.g. $H = N_b \cdot N_{ID}^{(1)} + I_b$ for $0 \leq N_{ID}^{(1)} \leq N_{SSS} - 1$ and $0 \leq I_b \leq N_b - 1$, or $H = I_b \cdot N_{SSS} + N_{ID}^{(1)}$ for $0 \leq N_{ID}^{(1)} \leq N_{SSS} - 1$ and $0 \leq I_b \, N_{b-1}$.

The two sequences $s_{m_0}(n)$ and $s_{m_1}(n)$ are defined as two different cyclic shifts of the M-sequence $\tilde{s}(n)$ with length 127 according to $s_{m_0}(n) = \tilde{s}((n+m_0) \mod 127)$ and $s_{m_1}(n) = \tilde{s}((n+m_1) \mod 127)$, and $\tilde{s}(n)$ can be constructed based one of the M-sequence specified in TABLE 4 according to $\tilde{s}(n) = 1 - 2 \cdot d_M(n)$ for $0 \leq n \leq 126$ with a proper initial condition. For example, No. 3 in TABLE 4 is utilized, then $d_M(i+7) = [d_M(i+4) + d_M(i)] \mod 2$, $0 \leq i \leq 119$ and $d_M(0) = d_M(1) = d_M(2) = d_M(3) = d_M(4) = d_M(5) = 0$, $d_M(6) = 1$.

In another example, No. 1 in TABLE 4 is utilized, then $d_M(i+7) = [d_M(i+6) + d_M(i)] \mod 2$, $0 \leq i \leq 119$ and $d_M(0) = d_M(1) = d_M(2) = d_M(3) = d_M(4) = d_M(5) = 0$, $d_M(6) = 1$.

In one embodiment, the two scrambling sequences $c_0(n)$ and $c_1(n)$ depend on the cell ID information in NR-PSS (e.g. $N_{ID}^{(2)}$ and note that even no cell ID information is carried by NR-PSS, the construction method in this embodiment still work by considering $N_{ID}^{(2)} = 0$) and are defined by different cyclic shifts of the M-sequence $\tilde{c}(n)$ with length 127 according to $c_0(n) = \tilde{c}((n+N_{ID}^{(2)}) \mod 127)$ and $c_1(n) = \tilde{c}((n+N_{ID}^{(2)} + N_{PSS}) \mod 127)$ where $N_{PSS}$ is the number of NR-PSS sequences (or equivalent to the number of hypotheses of cell ID carried by NR-PSS), and $\tilde{c}(n)$ can be constructed based one of the M-sequence specified in TABLE 4 (must be different from the one generating $\tilde{s}(n)$) according to $\tilde{c}(n) = 1 - 2 \cdot d_M(n)$ for $0 \leq n \leq 126$ with a proper initial condition. For example, if No. 3 in TABLE 4 is utilized for generating $\tilde{s}(n)$, then No. 4 can be utilized for generating $\tilde{c}(n)$ as $d_M(i+7) = [d_M(i+3) + d_M(i)] \mod 2$, $0 \leq i \leq 119$ and $d_M(0) = d_M(1) = d_M(2) = d_M(3) = d_M(4) = d_M(5) = 0$, $d_M(6) = 1$.

In another example, No. 1 in TABLE 4 is utilized for generating $\tilde{s}(n)$, then No. 2 can be utilized for generating $\tilde{c}(n)$ as $d_M(i+7) = [d_M(i+1) + d_M(i)] \mod 2$, $0 \leq i \leq 119$ and $d_M(0) = d_M(1) = d_M(2) = d_M(3) = d_M(4) = d_M(5) = 0$, $d_M(6) = 1$.

In another embodiment, if there is no cell ID information is carried by NR-PSS, the two scrambling sequences $c_0(n)$ and $c_1(n)$ can be independent from cell ID information in NR-PSS and constructed the same way using M-sequence $\tilde{c}(n)$ with length 127 according to $c_0(n) = c_1(n) = \tilde{c}(n)$ where $\tilde{c}(n)$ can be constructed based one of the M-sequence specified in TABLE 4 (must be different from the one generating $\tilde{s}(n)$) according to $\tilde{c}(n) = 1 - 2 \cdot d_M(n)$ for $0 \leq n \leq 126$ with a proper initial condition. For example, if No. 3 in TABLE 4 is utilized for generating $\tilde{s}(n)$, then No. 4 can be utilized for generating $\tilde{c}(n)$ as $d_M(i+7) = [d_M(i+3) + d_M(i)] \mod 2$, $0 \leq i \leq 119$ and $d_M(0) = d_M(1) = d_M(2) = d_M(3) = d_M(4) = d_M(5) = 0$, $d_M(6) = 1$.

For another example, No. 1 in TABLE 4 is utilized for generating $\tilde{s}(n)$, then No. 2 can be utilized for generating $\tilde{c}(n)$ as $d_M(i+7) = [d_M(i+1) + d_M(i)] \mod 2$, $0 \leq i \leq 119$ and $d_M(0) = d_M(1) = d_M(2) = d_M(3) = d_M(4) = d_M(5) = 0$, $d_M(6) = 1$.

In yet another embodiment, if there is no cell ID information is carried by NR-PSS, the two scrambling sequences $c_0(n)$ and $c_1(n)$ can be independent from cell ID information in NR-PSS and constructed the same way according to $c_0(n) = c_1(n) = 1$ which is equivalent to no scrambling sequence performed.

In one embodiment, the sequence $z_x(n)$ and $z_y(n)$ are based on the cell ID information in NR-PSS (in this case $x = m_1$ and $y = m_0$), and defined by a cyclic shift of the M-sequence $\tilde{z}(n)$ with length-127 according to $z_y(n) = z_{m_0}(n) = \tilde{z}((n+(m_0 \mod z)) \mod 127)$ and $z_x(n) = z_{m_1}(n) = \tilde{z}((n+(m_1 \mod z)) \mod 127)$ where $z$ is a parameter related the total number of hypotheses carried by combination of $m_0$ and $m_1$ (can refer to number of cell ID hypotheses or combination of cell ID and timing information), and $\tilde{z}(n)$ can be constructed based on one of the M-sequence specified in TABLE 4 (must be different from the ones generating $\tilde{s}(n)$ and $\tilde{c}(n)$) according to $\tilde{z}(n) = 1 - 2 \cdot d_M(n)$ for $0 \leq n \leq 126$ with a proper initial condition. For example, if No. 3 in TABLE 4 is utilized for generating $\tilde{s}(n)$, and No. 4 is utilized for generating $\tilde{c}(n)$, then No. 18 can be utilized for generating $\tilde{z}(n)$ with a proper initial condition $d_M(i+7) = [d_M(i+6) + d_M(i+5) + d_M(i+4) + d_M(i+2) + d_M(i+1) + d_M(i)] \mod 2$, $0 \leq i \leq 119$ and $d_M(0) = d_M(1) = d_M(2) = d_M(3) = d_M(4) = d_M(5) = 0$, $d_M(6) = 1$.

In another example, if No. 1 in TABLE 4 is utilized for generating $\tilde{s}(n)$, and No. 2 is utilized for generating $\tilde{c}(n)$, then No. 16 can be utilized for generating $\tilde{z}(n)$ with a proper initial condition $d_M(i+7) = [d_M(i+6) + d_M(i+5) + d_M(i+4) + d_M(i+3) + d_M(i+2) + d_M(i)] \mod 2$, $0 \leq i \leq 119$ and $d_M(0) = d_M(1) = d_M(2) = d_M(3) = d_M(4) = d_M(5) = 0$, $d_M(6) = 1$.

In another embodiment, one of the sequence $z_x(n)$ and $z_y(n)$ are based on the cell ID information in NR-PSS (in this case $y = m_0$), and defined by a cyclic shift of the M-sequence $\tilde{z}(n)$ with length-127 according to $z_x(n) = 1$ and $z_y(n) = z_{m_0}(n) = \tilde{z}((n+(m_0 \mod z)) \mod 127)$ where $z$ is a parameter related the total number of hypotheses carried by combination of $m_0$ and $m_1$ (can refer to number of cell ID hypotheses or combination of cell ID and timing information), and $\tilde{z}(n)$ can be constructed based on one of the M-sequence specified in TABLE 4 (must be different from the ones generating $\tilde{s}(n)$ and $\tilde{c}(n)$) according to $\tilde{z}(n) = 1 - 2 \cdot d_M(n)$ for $0 \leq n \leq 126$ with a proper initial condition. For example, if No. 3 in TABLE 4 is utilized for generating $\tilde{s}(n)$, and No. 4 is utilized for generating $\tilde{c}(n)$, then No. 18 can be utilized for generating $\tilde{z}(n)$ with a proper initial condition $d_M(i+7) = [d_M(i+6) + d_M(i+5) + d_M(i+4) + d_M(i+2) + d_M(i+1) + d_M(i)] \mod 2$, $0 \leq i \leq 119$ and $d_M(0) = d_M(1) = d_M(2) = d_M(3) = d_M(4) = d_M(5) = 0$, $d_M(6) = 1$.

In another example, if No. 1 in TABLE 4 is utilized for generating $\tilde{s}(n)$, and No. 2 is utilized for generating $\tilde{c}(n)$, then No. 16 can be utilized for generating $\tilde{z}(n)$ with a proper initial condition $d_M(i+7)=[d_M(i+6)+d_M(i+5)+d_M(i+4)+d_M(i+3)+d_M(i+2)+d_M(i)]\mod 2$, $0\leq i\leq 119$ and $d_M(0)=d_M(1)=d_M(2)=d_M(3)=d_M(4)=d_M(5)=0$, $d_M(6)=1$.

In yet another embodiment, the sequence $z_x(n)$ and $z_y(n)$ are based on the timing information, e.g. part of or the whole SS block timing index $I_b$ (in this case x=y=b), and defined by a cyclic shift of the M-sequence $\tilde{z}(n)$ with length-127 according to $z_x(n)=z_y(n)=z_b(n)=\tilde{z}((n+b) \mod 127)$ where $\tilde{z}(n)$ can be constructed based on one of the M-sequence specified in TABLE 4 (must be different from the ones generating $\tilde{s}(n)$ and $\tilde{c}(n)$) according to $\tilde{z}(n)=1-2*d_M(n)$ for $0\leq n\leq 126$ with a proper initial condition. For example, if No. 3 in TABLE 4 is utilized for generating $\tilde{s}(n)$, and No. 4 is utilized for generating $\tilde{c}(n)$, then No. 18 can be utilized for generating $\tilde{z}(n)$ with a proper initial condition $d_M(i+7)=[d_M(i+6)+d_M(i+5)+d_M(i+4)+d_M(i+2)+d_M(i+1)+d_M(i)]\mod 2$, $0\leq i\leq 119$ and $d_M(0)=d_M(1)=d_M(2)=d_M(3)=d_M(4)=d_M(5)=0$, $d_M(6)=1$.

In another example, if No. 1 in TABLE 4 is utilized for generating $\tilde{s}(n)$, and No. 2 is utilized for generating $\tilde{c}(n)$, then No. 16 can be utilized for generating $\tilde{z}(n)$ with a proper initial condition $d_M(i+7)=[d_M(i+6)+d_M(i+5)+d_M(i+4)+d_M(i+3)+d_M(i+2)+d_M(i)]\mod 2$, $0\leq i\leq 119$ and $d_M(0)=d_M(1)=d_M(2)=d_M(3)=d_M(4)=d_M(5)=0$, $d_M(6)=1$.

In yet another embodiment, one of the sequence $z_x(n)$ and $z_y(n)$ are based on the timing information, e.g. part of or the whole SS block timing index $I_b$ (in this case e.g. y=b), and defined by a cyclic shift of the M-sequence $\tilde{z}(n)$ with length-127 according to $z_x(n)=1z_y(n)=z_b(n)=\tilde{z}((n+b) \mod 127)$ where $\tilde{z}(n)$ can be constructed based one of the M-sequence specified in TABLE 4 (may be different from the ones generating $\tilde{s}(n)$ and $\tilde{c}(n)$) according to $\tilde{z}(n)=1-2*d_M(n)$ for $0\leq n\leq 126$ with a proper initial condition. For example, if No. 3 in TABLE 4 is utilized for generating $\tilde{s}(n)$, and No. 4 is utilized for generating $\tilde{c}(n)$, then No. 18 can be utilized for generating $\tilde{z}(n)$ with a proper initial condition $d_M(i+7)=[d_M(i+6)+d_M(i+5)+d_M(i+4)+d_M(i+2)+d_M(i+1)+d_M(i)]\mod 2$, $0\leq i\leq 119$ and $d_M(0)=d_M(1)=d_M(2)=d_M(3)=d_M(4)=d_M(5)=0$, $d_M(6)=1$.

In another example, if No. 1 in TABLE 4 is utilized for generating $\tilde{s}(n)$, and No. 2 is utilized for generating $\tilde{c}(n)$, then No. 16 can be utilized for generating $\tilde{z}(n)$ with a proper initial condition $d_M(i+7)=[d_M(i+6)+d_M(i+5)+d_M(i+4)+d_M(i+3)+d_M(i+2)+d_M(i)]\mod 2$, $0\leq i\leq 119$ and $d_M(0)=d_M(1)=d_M(2)=d_M(3)=d_M(4)=d_M(5)=0$ $d_M(6)=1$.

In yet another embodiment, the sequence $z_x(n)$ is not related to the cell ID information or timing information, and is defined by $z_x(n)=1$ for $0\leq n\leq 126$ which is equivalent to no scrambling sequence performed. The sequence $d_{SSS}(n)$ is mapped to the resource elements according to $$a_{k,l} = d_{SSS}(n), n = 0, \ldots, 253, k = n - 127 + \frac{N_{RB}N_{SC}}{2} \text{ and}$$

$$a_{k,l} = 0, n = -17, \ldots, -1, 254, \ldots, 270,$$

$$k = n - 127 + \frac{N_{RB}N_{SC}}{2}$$

where $N_{RB}$ is number of total RBs for transmission, and $N_{SC}$ is the number of subcarriers within a RB (e.g. $N_{SC}$=12). l corresponds to the OFDM symbol index where NR-SSS is transmitted.

In one embodiment of option 2, ZC-sequences with cyclic shift, for the design of one-port based NR-SSS sequence for 288 REs using ZC-sequences with cyclic shifts, defining the NR-SSS is according to $$d_{SSS}(n) = \begin{cases} d_{ZC}^{(u,v)}(n), n = 0, 1, \ldots, \frac{L_{PSS}-3}{2} \\ d_{ZC}^{(u,v)}(n+1), n = \frac{L_{PSS}-1}{2}, \ldots, L_{PSS}-2 \end{cases}$$

where $L_{SSS}$ is the length of NR-SSS sequence, and $L_{SSS}$ is an odd number smaller than 260. For example, $L_{SSS}$=255. For another example, $L_{SSS}$=257. For yet another example, $L_{SSS}$=259. $d_{ZC}^{(u,v)}(n)$ is a length-$L_{SSS}$ ZC-sequence with root index $u \in U$ and cyclic shift value $v \in V$, according to $$d_{ZC}^{(u,v)}(n) = d_{ZC}^{(u)}((n+v)\mod L_{SSS}) \text{ and } d_{ZC}^{(u)} = e^{-j\frac{\pi u n(n+1)}{L_{SSS}}}$$

for n=0, 1, . . . , $L_{SSS}$-1.

In one embodiment, if NR-SSS only carries part of or the whole cell ID hypotheses, then the combination of u and v may be large enough to cover the number of cell ID hypotheses (e.g. $N_{SSS}\leq |U|\cdot|V|$, where |U| and |V| mean the size of sets U and V correspondingly). The mapping of $N_{ID}^{(1)}$ ($0\leq N_{ID}^{(1)}\leq N_{SSS}-1$) to u and v is according to $$u = U\left(\left\lfloor\frac{N_{ID}^{(1)}}{|V|}\right\rfloor + 1\right), v = V((N_{ID}^{(1)}\mod|V|) + 1), \text{ or } v = V\left(\left\lfloor\frac{N_{ID}^{(1)}}{|U|}\right\rfloor + 1\right),$$

$u=U((N_{ID}^{(1)} \mod|U|)+1)$ where the set U can be a subset of $\{0, 1, \ldots, 254\}$ when $L_{SSS}$=255 considering the sequences' maximum cross-correlation within the set, and set V can be a subset of $\{0, 1, \ldots, 254\}$. For $N_{SSS}$=1000 (or approximately 1000), the following combination of U and V in TABLE 6 can be used for $L_{SSS}$=255.

TABLE 6

| Combination of U and V | |
|---|---|
| U | V |
| \|U\| = 4, e.g. U = {121, 125, 130, 134} | \|V\| = 255, e,g, V = {0,1, . . . , 254} |
| \|U\| = 8, e.g. U = {113, 117, 121, 125, 130, 134, 138, 142} | \|V\| = 128, e.g. V = {0, 2, . . . , 254} or {0, 1, . . . , 127} |

In another embodiment, if NR-SSS carries part of or the whole cell ID hypotheses as well as timing information (e.g. SS block timing index or part of the SS block timing index), then the combination of u and v may be large enough to cover the number of cell ID hypotheses together with timing hypotheses (e.g. $N_{SSS}\cdot N_b\leq|U|\cdot|V|$, where |U| and |V| mean the size of sets U and V correspondingly, and $N_b$ is the number of timing hypotheses carried by NR-SSS). The mapping of $N_{ID}^{(1)}$ ($0\leq N_{ID}^{(1)}\leq N_{SSS}-1$) and $I_b$ ($0\leq I_b\leq N_b-1$) to u and v is according to $u=U(\lfloor(N_{ID}^{(1)}\cdot N_b+I_b)/|V|\rfloor+1)$ and $v=V(((N_{ID}^{(1)}\cdot N_b+I_b) \mod|V|)+1)$, or $u=U(\lfloor(N_{ID}^{(1)}+I_b\cdot N_{SSS})/|V|\rfloor+1)$ and $v=V(((N_{ID}^{(1)}\cdot N_b+ N_{SSS}) \mod|V|)+1)$, or $v=V(\lfloor(N_{ID}^{(1)}\cdot N_b+I_b)/|U|\rfloor+1)$ and $u=U(((N_{ID}^{(1)}\cdot N_b+I_b) \mod|U|)+1)$, or $v=V(\lfloor(N_{ID}^{(1)}+I_b\cdot N_{SSS})/|U|\rfloor+1)$ and $u=U(((N_{ID}^{(1)}+I_b\cdot N_{SSS}) \mod|U|)+1)$ where the set U can be a subset of $\{0, 1, \ldots, 254\}$ when $L_{SSS}$=255 considering the sequences' maximum cross-correlation within the set, and set V can be a subset of $\{0, 1, \ldots, 254\}$. For $N_{SSS}$=1000 (or approximately 1000), and for different value of $N_b$, the following combination of U and V in TABLE 7 can be used for $L_{SSS}$=255.

TABLE 7

Combination of U and V

| $N_b$ | U | V |
|---|---|---|
| 2 | [U] = 8, e.g. U = {113, 117, 121, 125, 130, 134, 138, 142} | [V] = 255, e.g. V = {0, 1, ..., 254} |
| 2 | [U] = 16, e.g. U = {113, 115, 117, 119, 121, 123, 125, 126, 129, 130, 132, 134, 136, 138, 140, 142} | [V] = 128, e.g. V = {0, 2, ..., 254} or {0, 1, ..., 127} |
| 4 | [U] = 16, e.g. U ={111, 113, 115, 117, 119, 121, 123, 125, 130, 132, 134, 136, 138, 140, 142, 144} | [V] = 255, e.g. V = {0, 1, ..., 254} |
| 4 | [U] = 32, e.g. U = {95, 97, ..., 121, 123, 125, 130, 132, 134, ..., 158, 160} | [V] = 128, e.g. V = {0, 2, ..., 254} or {0, 1, ..., 127} |
| 8 | [U] = 32, e.g. U = {95, 97, ..., 121, 123, 125, 130, 132, 134, ..., 158, 160} | [V] = 255, e.g. V = {0, 1, ..., 254} |
| 8 | [U] = 64, e.g. U = {63, 65, ..., 121, 123, 125, 130, 132, 134, ..., 190, 192} | [V] = 128, e.g. V = {0, 2, ..., 254} or {0, 1, ..., 127} |
| 16 | [U] = 64, e.g. U = {63, 65, ..., 121, 123, 125, 130, 132, 134, ..., 190, 192} | [V] = 255, e.g. V = {0, 1, ..., 254} |
| 16 | [U] = 128, e.g. U = {63, 64, 65, ..., 124, 125, 130, 131, ..., 190, 191, 192} | [V] = 128, e.g. V = {0, 2, ..., 254} or {0, 1, ..., 127} |
| 32 | [U] = 128, e.g. U = {63, 64, 65, ..., 124, 125, 130, 131, ..., 190, 191, 192} | [V] = 255, e.g V = {0, 1, ..., 254} |
| 32 | [U] = 255, e.g. U = {0, 1, ..., 254} | [V] = 128, e.g. V = {0, 2, ..., 254} or {0, 1, ..., 127} |
| 64 | [U] = 255, e.g. U = {0, 1, ..., 254} | [V] = 255, e.g. V = {0, 1, ..., 254} |

The sequence $d_{SSS}(n)$ is mapped to the resource elements according to $$a_{k,l} = d_{SSS}(n), n = 0, \ldots, L_{SSS} - 2,$$
$$k = n - \frac{L_{SSS} - 1}{2} + \frac{N_{RB}N_{SC}}{2} \text{ and}$$
$$a_{k,l} = 0, n = -\frac{288 - L_{SSS} + 1}{2}, \ldots,$$
$$-1, L_{SSS} - 1, \ldots, \frac{288 + L_{SSS} + 1}{2} - 2,$$
$$k = n - \frac{L_{SSS} - 1}{2} + \frac{N_{RB}N_{SC}}{2}$$

of total RBs for transmission, and $N_{SC}$ is the number of subcarriers within a RB (e.g. $N_{SC}=12$). l corresponds to the OFDM symbol index where NR-SSS is transmitted.

In one embodiment of option 3, length-255 M-sequences with cyclic shift, for the design of one-port based NR-SSS sequence for 288 REs using M-sequences with cyclic shifts, defining the NR-SSS is according to $$d_{SSS}(n) = \begin{cases} 2*d_M^{(u,v)}(n) - 1, n = 0, 1, \ldots, 126 \\ 2*d_M^{(u,v)}(n+1) - 1, n = 127, \ldots, 253 \end{cases}$$

where $d_M^{(u,v)}(n)$ is a length-255 M-sequence with number index u and cyclic shift value v∈V, according to $d_M^{(u,v)}(n) = d_M^{(u)}((n+v) \bmod 255)$ and $d_M^{(u)}$ is the No.u (1≤u≤16) sequence defined in TABLE 3.

In one embodiment, if NR-SSS only carries part of or the whole cell ID hypotheses, then the combination of u and v may be large enough to cover the number of cell ID hypotheses in NR-SSS (e.g. $N_{SSS} \leq |U| \cdot |V|$, where $|U|$ and $|V|$ mean the size of sets U and V correspondingly). The mapping of $N_{ID}^{(1)}$ ($0 \leq N_{ID}^{(1)} \leq N_{SSS}-1$) to u and v is according to $$u = U\left(\left\lfloor \frac{N_{ID}^{(1)}}{|V|} \right\rfloor + 1\right) \text{ and } v = V((N_{ID}^{(1)} \bmod |V|) + 1), \text{ or}$$
$$v = V(\lfloor N_{ID}^{(1)}/|U| \rfloor + 1) \text{ and } u = U((N_{ID}^{(1)} \bmod |U|) + 1)$$

where the set U can be a subset of $\{1, \ldots, 16\}$ considering the sequences' maximum cross-correlation within the set, and set V can be a subset of $\{0, 1, \ldots, 254\}$. For $N_{SSS}=1000$ (or approximately 1000), the following combination of U and V in TABLE 8 can be used.

TABLE 8

Combination of U and V

| U | V |
|---|---|
| [U] = 4, e.g. U = {1, 2, 3, 4} | [V] = 255, e.g. V = {0, 1, ..., 254} |
| [U] = 8, e.g. U = {1, 2, 3, 4, 5, 6, 7, 8} | [V] = 128, e.g. V = {0, 2, ..., 254} or {0, 1, ..., 127} |
| [U] = 16, e.g. U = [1, 2, 3, 4, 5, 6, 7, 8, 9, 10, 11, 12, 13, 14, 15, 16} | [V] = 64, e.g. V = {0, 4, ..., 252} or {0, 1, ..., 63} |

For $N_{SSS}=1000/N_{PSS}$ (or approximately $1000/N_{PSS}$, where $N_{PSS}$ is the number of NR-PSS sequences), the following combination of U and V in TABLE 9 can be used. In this case, a scrambling sequence can be applied to represent the cell ID in NR-PSS, where the scrambling sequence is also a M-sequence with length 255. For example, $$d_{SSS}(n) = \begin{cases} c(n)*(2*d_M^{(u,v)}(n) - 1), n = 0, 1, \ldots, 126 \\ c(n+1)*(2*d_M^{(u,v)}(n+1) - 1), n = 127, \ldots, 253 \end{cases}$$

and $c(n) = \tilde{c}((n+N_{ID}^{(2)}) \bmod 255)$ where $N_{ID}^{(2)}$ is cell ID in NR-PSS and $\tilde{c}(n)$ can be constructed based one of the M-sequence specified in TABLE 3 (must be different from the ones generating $d_M^{(u,v)}$ according to $\tilde{c}(n) = 1 - 2*d_M(n)$.

TABLE 9

Combination of U and V

| U | V |
|---|---|
| [U] = [1000/($N_{PSS}$ * 255)], e.g. U = {1, 2, ..., [1000/($N_{PSS}$ * 255)]} | [V] = 255, e.g. V = {0, 1, ..., 254} |
| [U] = 2 * [1000/($N_{PSS}$ * 255)], e.g. U = {1, 2, ..., 2 * [1000/($N_{PSS}$ * 255)]} | [V] = 128, e.g. V = {0, 2, ..., 254} or {0, 1, ..., 127} |

In another embodiment, if NR-SSS carries part of or the whole cell ID hypotheses as well as timing information (e.g. SS block timing index or part of the SS block timing index), then the combination of u and v may be large enough to cover the number of cell ID hypotheses together with timing hypotheses (e.g. $N_{SSS} \cdot N_b \leq |U| \cdot |V|$, where $|U|$ and $|V|$ mean the size of sets U and V correspondingly, and $N_b$ is the number of timing hypotheses carried by NR-SSS). The mapping of $N_{ID}^{(1)}$ ($0 \leq N_{ID}^{(1)} \leq N_{SSS}-1$) and $I_b$ ($0 \leq I_b \leq N_b-1$) to u and v is according to $u = U(\lfloor (N_{ID}^{(1)} \cdot N_b + I_b)/|V| \rfloor + 1)$ and $v=V(((N_{ID}^{(1)} \cdot N_b+I_b) \bmod |V|)+1)$, or $u=U(\lfloor(N_{ID}^{(1)}+I_b \cdot N_{SSS})/|V|\rfloor+1)$ and $v=V(((N_{ID}^{(1)} \cdot N_b+I_b \cdot N_{SSS}) \bmod |V|)+1)$, or $v=V(\lfloor(N_{ID}^{(1)} \cdot N_b+I_b)/|U|\rfloor+1)$ and $u=U(((N_{ID}^{(1)} \cdot N_b+I_b) \bmod |U|)+1)$, or $v=V(\lfloor(N_{ID}^{(1)}+I_b \cdot N_{SSS})/|U|\rfloor+1)$ and $u=U(((N_{ID}^{(1)}+I_b \cdot N_{SSS}) \bmod |U|)+1)$ where the set U can be a subset of $\{1, \ldots, 16\}$ considering the sequences' maximum cross-correlation within the set, and set V can be a subset of $\{0, 1, \ldots, 254\}$. For $N_{SSS}=1000$ (or approximately 1000), and for different value of $N_b$, the following combination of U and V in TABLE 10 can be used.

TABLE 10

| $N_b$ | Combination of U and V | |
|---|---|---|
| | U | V |
| 2 | [U] = 8, e.g. U = {1, 2, 3, 4, 5, 6, 7, 8} | [V] = 255, e.g.V = {0, 1, ..., 254} |
| 2 | [U] = 16, e.g. U = {1, 2, 3, 4, 5, 6, 7, 8, 9, 10, 11, 12, 13, 14, 15, 16} | [V] = 128, e.g. V = {0, 2, ..., 254} or {0, 1, ..., 127} |
| 4 | [U] = 16, e.g. U = [1, 2, 3, 4, 5, 6, 7, 8, 9, 10, 11, 12, 13, 14, 15, 16} | [V] = 255, e.g. V = {0, 1, ..., 254} |

The sequence $d_{SSS}(n)$ is mapped to the resource elements according to $$a_{k,l} = d_{SSS}(n), n = 0, \ldots, 253, k = n - 127 + \frac{N_{RB}N_{SC}}{2} \text{ and}$$

$$a_{k,l} = 0, n = -17, \ldots, -1, L_{SSS} - 1, \ldots, 270,$$

$$k = n - 127 + \frac{N_{RB}N_{SC}}{2}$$

where $N_{RB}$ is number of total RBs for transmission, and $N_{SC}$ is the number of subcarriers within a RB (e.g. $N_{SC}=12$). l corresponds to the OFDM symbol index where NR-SSS is transmitted.

In one embodiment of option 4, lLength-127 M-sequences with cyclic shifts, the sequence $d_{SSS}(n)$ used for NR-SSS is generated from a BPSK modulated frequency-domain M-sequence $d_M(m)$ with length 127 as in option 3 of component II.B, but mapped to central and interleaved subcarriers within the 288 subcarriers. For example, the length-127 NR-SSS sequence is mapped to even subcarrier #14, #16, ..., #266 (subcarrier starting with #0). For another example, the length-127 NR-SSS sequence is mapped to even subcarrier #12, #14, ..., #264 (subcarrier starting with #0). For yet another example, the length-127 NR-SSS sequence is mapped to odd subcarrier #13, #15, ..., #265 (subcarrier starting with #0). For yet another example, the length-127 NR-SSS sequence is mapped to odd subcarrier #11, #13, ..., #263 (subcarrier starting with #0).

In some embodiments of component II.B, design of One-port NR-SSS Sequence for 144 REs, the maximum number of resource elements available within one OFDM symbol for transmitting NR-SSS is 144 (equivalent to 12 RBs), which corresponds to (note that the bandwidth contains guard band, and actual transmission bandwidth can be a little bit smaller): frequency range A associated with 15 kHz subcarrier spacing and 2.5 MHz NR-PSS transmission bandwidth (including guard band); frequency range B associated with 30 kHz subcarrier spacing and 5 MHz NR-PSS transmission bandwidth (including guard band); frequency range C associated with 60 kHz subcarrier spacing and 10 MHz NR-PSS transmission bandwidth (including guard band); frequency range D associated with 120 kHz subcarrier spacing and 20 MHz NR-PSS transmission bandwidth (including guard band); and frequency range E associated with 240 kHz subcarrier spacing and 40 MHz NR-PSS transmission bandwidth (including guard band).

For example, frequency range A can be around 0 to 2 GHz, frequency range B can be around 2 to 6 GHz, frequency range D can be above 6 GHz. For another example, frequency range A can be around 0 to 2 GHz, frequency range B can be around 2 to 6 GHz, frequency range E can be above 6 GHz. For yet another example, frequency range A can be around 0 to 6 GHz, frequency range D can be above 6 GHz. For yet another example, frequency range A can be around 0 to 6 GHz, frequency range E can be above 6 GHz.

In one embodiment, the same NR-SSS sequence(s) is utilized for the frequency ranges A to E by scaling the subcarrier spacing. Note that the numerology of NR-SSS can be different from data multiplexed in the same symbol, so guard band is needed on both side of NR-SSS sequence in frequency domain, and the size of guard band is around 10% (which correspond to around 14 REs in this sub-embodiment) such that the maximum number of REs for transmitting NR-SSS may be reduced to around 130, and the same as NR-PSS. Based on this consideration, the design of one-port based NR-SSS sequence can be selected as one of the following options.

In one embodiment of option 1, interleaved two M-sequences, for the design of one-port based NR-SSS sequence for 144 REs using M-sequences, the NR-SSS sequence is with length 126, and the sequence $d_{SSS}(0), \ldots, d_{SSS}(125)$ is an interleaved concatenation of two length-63 binary sequences, where each of the binary sequence is constructed based on length-63 M-sequences. The concatenated sequence is scrambled with a scrambling sequence using the cell ID information in NR-PSS if there is such information in NR-PSS, or scrambled by an all one sequence (equivalent as no scrambling) or a common scrambling sequence for all cell ID if there is no cell ID information in NR-PSS.

More precisely, the combination of two length-63 sequences defining the NR-SSS is according to $d_{SSS}(2n)=s_{m_0}(n)c_0(n)z_x(n)$ and $d_{SSS}(2n+1)=s_{m_1}(n)c_1(n)z_y(n)$ where $0 \le n \le 62$, and the particular meaning of parameters and sequences in the equations are detailed as follow.

In one embodiment, NR-SSS only carries part of or the whole cell ID information and no timing information, or NR-SSS carries both part of or the whole cell ID information and timing information, but timing information is carried by $z_x(n)$, then the number of hypotheses to be supported by the combination of $m_0$ and $m_1$ is $N_{SSS}$ (note that $N_{SSS} \cdot N_{PSS}$ is the number of cell ID in this case). The combination of $m_0$ and $m_1$ to represent a hypotheses H can be according to (equivalent to TABLE 11)

$$m_0 = m' \bmod 63, m_1 = \left(m_0 + \left\lfloor \frac{m'}{63} \right\rfloor + 1\right) \bmod 63,$$

$$m' = H + q(q+1)/2,$$

$$q = \left\lfloor \frac{H + q'(q'+1)/2}{62} \right\rfloor, q' = \left\lfloor \frac{H}{63} \right\rfloor,$$

and the $N_{SSS}$ cell ID hypotheses can be selected from the 1953 hypotheses.

In one sub-embodiment, $N_{ID}^{(1)}$ can be chosen as the first $N_{SSS}$ hypotheses in TABLE 11, i.e., $H=N_{ID}^{(1)}$ for $0 \le$ $N_{ID}^{(1)} \leq N_{SSS}-1$. In another sub-embodiment, $N_{ID}^{(1)}$ can be uniformed selected from the 1953 hypotheses in TABLE 11, e.g. $H = a \cdot N_{ID}^{(1)} + b$ for $0 \leq N_{ID}^{(1)} \leq N_{SSS}-1$, and a can be 2 or 3 or . . . or $\lfloor 1953/N_{SSS} \rfloor$, and b can be 0 or 1 or . . . or a-1.

TABLE 11

Hypotheses

| H | $m_0$ | $m_1$ | H | $m_0$ | $m_1$ | H | $m_0$ | $m_1$ | H | $m_0$ | $m_1$ |
|---|---|---|---|---|---|---|---|---|---|---|---|
| 0 | 0 | 1 | 123 | 0 | 3 | ... | ... | ... | ... | ... | ... |
| 1 | 1 | 2 | 124 | 1 | 4 | ... | ... | ... | ... | ... | ... |
| ... | ... | ... | ... | ... | ... | ... | ... | ... | 1948 | 0 | 60 |
| 61 | 61 | 126 | 182 | 59 | 62 | ... | ... | ... | 1949 | 1 | 61 |
| 62 | 0 | 2 | 183 | 0 | 4 | ... | ... | ... | 1950 | 2 | 62 |
| 63 | 1 | 3 | 184 | 1 | 5 | ... | ... | ... | 1951 | 0 | 61 |
| ... | ... | ... | ... | ... | ... | ... | ... | ... | 1952 | 1 | 62 |
| 122 | 60 | 62 | 241 | 58 | 62 | ... | ... | ... | 1953 | 0 | 62 |

In another embodiment, NR-SSS carries both part of or the whole cell ID information and timing information, and the number of hypotheses to be supported by the combination of $m_0$ and $m_1$ is $N_{SSS} \cdot N_b$ (note that $N_{SSS} \cdot N_{PSS}$ is the number of cell ID in this case), where $N_b$ is the number of timing information hypotheses to be carried by the combination of $m_0$ and $m_1$. For example, in single beam system, if NR-SSS carries timing information indicating the NR-SSS symbol index when multiple NR-SSS are transmitted within a radio frame (similar to LTE specification), then $N_b$ can be the number of possible positions of NR-SSS within a radio frame. For another example, in multiple beam system, $N_b$ can be the number of SS block timing index to be indicated by current NR-SSS (note that it can be the whole SS block timing index information or part of it). The combination of $m_0$ and $m_1$ to represent a hypotheses H can be the same as the previous embodiment (also equivalent to TABLE 11) and the $N_{SSS} \cdot N_b$ hypotheses can be selected from the 8001 hypotheses in TABLE 11. In one sub-embodiment, the combination of cell ID hypothesis $N_{ID}^{(1)}$, and timing index $I_b$ can be chosen as the first $N_{SSS} \cdot N_{PSS}$ hypotheses in TABLE 11, e.g. $H = N_b \cdot N_{ID}^{(1)} + I_b$ for $0 \leq N_{ID}^{(1)} \leq N_{SSS}-1$ and $0 \leq I_b \leq N_b-1$, or $H = I_b \cdot N_{SSS} + N_{ID}^{(1)}$ for $0 \leq N_{ID}^{(1)} \leq N_{SSS}-1$ and $0 \leq I_b \leq N_{b-1}$.

The two sequences $s_{m_0}(n)$ and $s_{m_1}(n)$ are defined as two different cyclic shifts of the M-sequence $\tilde{s}(n)$ with length 127 according to $s_{m_0}(n) = \tilde{s}((n+m_0) \mod 63)$ and $s_{m_1}(n) = \tilde{s}((n+m_1) \mod 63)$, and $\tilde{s}(n)$ can be constructed based one of the M-sequence specified in TABLE 12 according to $\tilde{s}(n) = 1 - 2 \ast d_M(n)$ for $0 \leq n \leq 62$ with a proper initial condition. For example, No. 1 in TABLE 12 is utilized, then $d_M(i+6) = [d_M(i+5) + d_M(i)] \mod 2$, $0 \leq i \leq 56$ and $d_M(0) = d_M(1) = d_M(2) = d_M(3) = d_M(4) = 0$, $d_M(5) = 1$.

For another example, No. 2 in TABLE 12 is utilized, then $d_M(i+6) = [d_M(i+1) + d_M(i)] \mod 2$, $0 \leq i \leq 56$ and $d_M(0) = d_M(1) = d_M(2) = d_M(3) = d_M(4) = 0$, $d_M(5) = 1$.

TABLE 12

Recursive construction method

| No. | Recursive construction method | Corresponding polynomial | Corresponding taps of register |
|---|---|---|---|
| 1 | $d_M(i+6) = [d_M(i+5) + d_M(i)] \mod 2, 0 \leq i \leq 56$ | $x^6 + x^5 + 1$ | [1, 6] |
| 2 | $d_M(i+6) = [d_M(i+1) + d_M(i)] \mod 2, 0 \leq i \leq 56$ | $x^6 + x + 1$ | [1, 5] |
| 3 | $d_M(i+6) = [d_M(i+5) + d_M(i+4) + d_M(i+1) + d_M(i)] \mod 2, 0 \leq i \leq 56$ | $x^6 + x^5 + x^4 + x + 1$ | [1, 2, 5, 6] |
| 4 | $d_M(i+6) = [d_M(i+5) + d_M(i+2) + d_M(i+1) + d_M(i)] \mod 2, 0 \leq i \leq 56$ | $x^6 + x^5 + x^2 + x + 1$ | [1, 3, 4, 6] |
| 5 | $d_M(i+6) = [d_M(i+5) + d_M(i+3) + d_M(i+2) + d_M(i)] \mod 2, 0 \leq i \leq 56$ | $x^6 + x^5 + x^3 + x^2 + 1$ | [1, 3, 4, 6] |
| 6 | $d_M(i+6) = [d_M(i+4) + d_M(i+3) + d_M(i+1) + d_M(i)] \mod 2, 0 \leq i \leq 56$ | $x^6 + x^4 + x^3 + x + 1$ | [2, 3, 5, 6] |

In one embodiment, the two scrambling sequences $c_0(n)$ and $c_1(n)$ depend on the cell ID information in NR-PSS (e.g. $N_{ID}^{(2)}$ and note that even no cell ID information is carried by NR-PSS, the construction method in this embodiment still work by considering $N_{ID}^{(2)}=0$) and are defined by different cyclic shifts of the M-sequence $\tilde{c}(n)$ with length 63 according to $c_0(n)=\tilde{c}((n+N_{ID}^{(2)}) \bmod 63)$ and $c_1(n)=\tilde{c}((n+N_{ID}^{(2)}+N_{PSS}) \bmod 63)$ where $N_{PSS}$ is the number of NR-PSS sequences (or equivalent to the number of hypotheses of cell ID carried by NR-PSS), and $\tilde{c}(n)$ can be constructed based one of the M-sequence specified in TABLE 12 (must be different from the one generating $\tilde{s}(n)$) according to $\tilde{c}(n)=1-2*d_M(n)$ for $0 \le n \le 62$ with a proper initial condition. For example, if No. 1 in TABLE 12 is utilized for generating $\tilde{s}(n)$, then No. 2 can be utilized for generating $\tilde{c}(n)$ as $d_M(i+6)=[d_M(i+1)+d_M(i)] \bmod 2$, $0 \le i \le 56$ and $d_M(0)=d_M(1)=d_M(2)=d_M(3)=d_M(4)=0$, $d_M(5)=1$.

For another example, No. 2 in TABLE 12 is utilized for generating $\tilde{s}(n)$, then No. 1 can be utilized for generating $\tilde{c}(n)$ as $d_M(i+6)=[d_M(i+5)+d_M(i)] \bmod 2$, $0 \le i \le 63$ and $d_M(0)=d_M(1)=d_M(2)=d_M(3)=d_M(4)=0$, $d_M(5)=1$.

In another embodiment, if there is no cell ID information is carried by NR-PSS, the two scrambling sequences $c_0(n)$ and $c_1(n)$ can be independent from cell ID information in NR-PSS and constructed the same way using M-sequence $\tilde{c}(n)$ with length 63 according to $c_0(n)=c_1(n)=\tilde{c}(n)$ where $\tilde{c}(n)$ can be constructed based one of the M-sequence specified in TABLE 12 (must be different from the one generating $\tilde{s}(n)$) according to $\tilde{c}(n)=1-2*d_M(n)$ for $0 \le n \le 62$ with a proper initial condition. For example, if No. 1 in TABLE 12 is utilized for generating $\tilde{s}(n)$, then No. 2 can be utilized for generating $\tilde{c}(n)$ as $d_M(i+6)=[d_M(i+1)+d_M(i)] \bmod 2$, $0 \le i \le 56$ and $d_M(0)=d_M(1)=d_M(2)=d_M(3)=d_M(4)=0$, $d_M(5)=1$.

For another example, No. 2 in TABLE 12 is utilized for generating $\tilde{s}(n)$, then No. 1 can be utilized for generating $\tilde{c}(n)$ as $d_M(i+6)=[d_M(i+5)+d_M(i)] \bmod 2$, $0 \le i \le 63$ and $d_M(0)=d_M(1)=d_M(2)=d_M(3)=d_M(4)=0$, $d_M(5)=1$.

In yet another embodiment, if there is no cell ID information is carried by NR-PSS, the two scrambling sequences $c_0(n)$ and $c_1(n)$ can be independent from cell ID information in NR-PSS and constructed the same way according to $c_0(n)=c_1(n)=1$ which is equivalent to no scrambling sequence performed.

In one embodiment, the sequence $z_x(n)$ and $z_y(n)$ are based on the cell ID information in NR-PSS (in this case $x=m_1$ and $y=m_0$), and defined by a cyclic shift of the M-sequence $\tilde{z}(n)$ with length-63 according to $z_y(n)=z_{m_0}(n)=\tilde{z}((n+(m_0 \bmod z)) \bmod 63)$ and $z_x(n)=z_{m_1}(n)=\tilde{z}((n+(m_1 \bmod z)) \bmod 63)$ where z is a parameter related the total number of hypotheses carried by combination of $m_0$ and $m_1$ (can refer to number of cell ID hypotheses or combination of cell ID and timing information), and $\tilde{z}(n)$ can be constructed based on one of the M-sequence specified in TABLE 12 (must be different from the ones generating $\tilde{s}(n)$ and $\tilde{c}(n)$) according to $\tilde{z}(n)=1-2*d_M(n)$ for $0 \le n \le 62$ with a proper initial condition. For example, if No. 1 in TABLE 12 is utilized for generating $\tilde{s}(n)$, and No. 2 is utilized for generating $\tilde{c}(n)$, then No. 6 can be utilized for generating $\tilde{z}(n)$ with a proper initial condition $d_M(i+6)=[d_M(i+4)+d_M(i+3)+d_M(i+1)+d_M(i)] \bmod 2$, $0 \le i \le 56$ and $d_M(0)=d_M(1)=d_M(2)=d_M(3)=d_M(4)=0$, $d_M(5)=1$.

For another example, if No. 2 in TABLE 12 is utilized for generating $\tilde{s}(n)$, and No. 1 is utilized for generating $\tilde{c}(n)$, then No. 5 can be utilized for generating $\tilde{z}(n)$ with a proper initial condition $d_M(i+6)=[d_M(i+5)+d_M(i+3)+d_M(i+2)+d_M(i)] \bmod 2$, $0 \le i \le 56$ and $d_M(0)=d_M(1)=d_M(2)=d_M(3)=d_M(4)=0$, $d_M(5)=1$.

In another embodiment, one of the sequence $z_x(n)$ and $z_y(n)$ are based on the cell ID information in NR-PSS (in this case y=$m_0$), and defined by a cyclic shift of the M-sequence $\tilde{z}(n)$ with length-63 according to $z_x(n)=1$ and $z_y(n)=z_{m_0}(n)=\tilde{z}((n+(m_0 \bmod z)) \bmod 63)$ where z is a parameter related the total number of hypotheses carried by combination of $m_0$ and $m_1$ (can refer to number of cell ID hypotheses or combination of cell ID and timing information), and $\tilde{z}(n)$ can be constructed based on one of the M-sequence specified in TABLE 12 (must be different from the ones generating $\tilde{s}(n)$ and $\tilde{c}(n)$) according to $\tilde{z}(n)=1-2*d_M(n)$ for $0 \le n \le 62$ with a proper initial condition. For example, if No. 1 in TABLE 12 is utilized for generating $\tilde{s}(n)$, and No. 2 is utilized for generating $\tilde{c}(n)$, then No. 6 can be utilized for generating $\tilde{z}(n)$ with a proper initial condition $d_M(i+6)=[d_M(i+4)+d_M(i+3)+d_M(i+1)+d_M(i)] \bmod 2$, $0 \le i \le 56$ and $d_M(0)=d_M(1)=d_M(2)=d_M(3)=d_M(4)=0$, $d_M(5)=1$.

In another example, if No. 2 in TABLE 12 is utilized for generating $\tilde{s}(n)$, and No. 1 is utilized for generating $\tilde{c}(n)$, then No. 5 can be utilized for generating $\tilde{z}(n)$ with a proper initial condition $d_M(i+6)=[d_M(i+5)+d_M(i+3)+d_M(i+2)+d_M(i)] \bmod 2$, $0 \le i \le 56$ and $d_M(0)=d_M(1)=d_M(2)=d_M(3)=d_M(4)=0$, $d_M(5)=1$.

In yet another embodiment, the sequence $z_x(n)$ and $z_y(n)$ are based on the timing information, e.g. part of or the whole SS block timing index $I_b$ (in this case x=y=b), and defined by a cyclic shift of the M-sequence $\tilde{z}(n)$ with length-63 according to $z_x(n)=z_y(n)=z_b(n)=\tilde{z}((n+b) \bmod 63)$ where $\tilde{z}(n)$ can be constructed based on one of the M-sequence specified in TABLE 12 (must be different from the ones generating $\tilde{s}(n)$ and $\tilde{c}(n)$) according to $\tilde{z}(n)=1-2*d_M(n)$ for $0 \le n \le 62$ with a proper initial condition. For example, if No. 1 in TABLE 12 is utilized for generating $\tilde{s}(n)$, and No. 2 is utilized for generating $\tilde{c}(n)$, then No. 6 can be utilized for generating $\tilde{z}(n)$ with a proper initial condition $d_M(i+6)=[d_M(i+4)+d_M(i+3)+d_M(i+1)+d_M(i)] \bmod 2$, $0 \le i \le 56$ and $d_M(0)=d_M(1)=d_M(2)=d_M(3)=d_M(4)=0$, $d_M(5)=1$.

In yet another example, if No. 2 in TABLE 12 is utilized for generating $\tilde{s}(n)$, and No. 1 is utilized for generating $\tilde{c}(n)$, then No. 5 can be utilized for generating $\tilde{z}(n)$ with a proper initial condition $d_M(i+6)=[d_M(i+5)+d_M(i+3)+d_M(i+2)+d_M(i)] \bmod 2$, $0 \le i \le 56$ and $d_M(0)=d_M(1)=d_M(2)=d_M(3)=d_M(4)=0$, $d_M(5)=1$.

In yet another embodiment, one of the sequence $z_x(n)$ and $z_y(n)$ are based on the timing information, e.g. part of or the whole SS block timing index $I_b$ (in this case e.g. y=b), and defined by a cyclic shift of the M-sequence $\tilde{z}(n)$ with length-63 according to $z_x(n)=1$ and $z_y(n)=z_b(n)=\tilde{z}((n+b) \bmod 63)$ where $\tilde{z}(n)$ can be constructed based on one of the M-sequence specified in TABLE 12 (must be different from the ones generating $\tilde{s}(n)$ and $\tilde{c}(n)$) according to $\tilde{z}(n)=1-2*d_M(n)$ for $0 \le n \le 62$ with a proper initial condition. For example, if No. 1 in TABLE 12 is utilized for generating $\tilde{s}(n)$, and No. 2 is utilized for generating $\tilde{c}(n)$, then No. 6 can be utilized for generating $\tilde{z}(n)$ with a proper initial condition $d_M(i+6)=[d_M(i+4)+d_M(i+3)+d_M(i+1)+d_M(i)] \bmod 2$, $0 \le i \le 56$ and $d_M(0)=d_M(1)=d_M(2)=d_M(3)=d_M(4)=0$, $d_M(5)=1$.

In another example, if No. 2 in TABLE 12 is utilized for generating $\tilde{s}(n)$, and No. 1 is utilized for generating $\tilde{c}(n)$, then No. 5 can be utilized for generating $\tilde{z}(n)$ with a proper initial condition $d_M(i+6)=[d_M(i+5)+d_M(i+3)+d_M(i+2)+d_M(i)] \bmod 2$, $0 \le i \le 56$ and $d_M(0)=d_M(1)=d_M(2)=d_M(3)=d_M(4)=0$, $d_M(5)=1$.

In yet another embodiment, the sequence $z_x(n)$ is not related to the cell ID information or timing information, and is defined by $z_x(n)=1$ for $0 \le n \le 62$ which is equivalent to no scrambling sequence performed.

The sequence $d_{SSS}(n)$ is mapped to the resource elements according to $$a_{k,l} = d_{SSS}(n), n = 0, \ldots, 125, k = n - 63 + \frac{N_{RB}N_{SC}}{2} \text{ and}$$

$$a_{k,l} = 0, n = -9, \ldots, -1, 126, \ldots, 134,$$

$$k = n - 63 + \frac{N_{RB}N_{SC}}{2}$$

where $N_{RB}$ is number of total RBs for transmission, and $N_{SC}$ is the number of subcarriers within a RB (e.g. $N_{SC}=12$). 1 corresponds to the OFDM symbol index where NR-SSS is transmitted.

In one embodiments of option 2, ZC-sequences with cyclic shifts, for the design of one-port based NR-SSS sequence for 144 REs using ZC-sequences with cyclic shifts, defining the NR-SSS is according to $$d_{SSS}(n) = \begin{cases} d_{ZC}^{(u,v)}(n), n = 0, 1, \ldots, \frac{L_{PSS} - 3}{2} \\ d_{ZC}^{(u,v)}(n+1), n = \frac{L_{PSS} - 1}{2}, \ldots, L_{PSS} - 2 \end{cases}$$

where $L_{SSS}$ is the length of NR-SSS sequence, and $L_{SSS}$ is an odd number smaller than 130. For example, $L_{SSS}=127$. For another example, $L_{SSS}=129$. $d_{ZC}^{(u,v)}(n)$ is a length-$L_{SSS}$ ZC-sequence with root index u $\in$ U and cyclic shift value v$\in$V, according to $$d_{ZC}^{(u,v)}(n) = d_{ZC}^{(u)}((n+v) \bmod L_{SSS}) \text{ and } d_{ZC}^{(u)} = e^{-j\frac{\pi u n(n+1)}{L_{SSS}}}$$

for n=0, 1, . . . , $L_{SSS}$−1.

In one embodiment, if NR-SSS only carries part of or the whole cell ID hypotheses, then the combination of u and v may be large enough to cover the number of cell ID hypotheses (e.g. $N_{SSS} \leq |U| \cdot |V|$, where |U| and |V| mean the size of sets U and V correspondingly). The mapping of $N_{ID}^{(1)}$ ($0 \leq N_{ID}^{(1)} \leq N_{SSS}-1$) to u and v is according to u=U($\lfloor N_{ID}^{(1)}/|V| \rfloor$+1) and v=V($(N_{ID}^{(1)} \bmod |V|)$+1), or v=V($\lfloor N_{ID}^{(1)}/|U| \rfloor$+1) and u=U($(N_{ID}^{(1)} \bmod |U|)$+1) where the set U can be a subset of {0, 1, . . . , 126} when $L_{SSS}=255$ considering the sequences' maximum cross-correlation within the set, and set V can be a subset of {0, 1, . . . , 126}. For $N_{SSS}=1000$ (or approximately 1000), the following combination of U and V in TABLE 13 can be used for $L_{SSS}=127$.

TABLE 13

| Combination of U and V | |
|---|---|
| U | V |
| [U] = 8, e.g. U = {53, 55, 57,59, 68, 70, 72, 74} | [V] = 127, e.g. V = {0, 1, . . . , 126} |
| [U] = 16, e.g. U = {53, 54, . . . , 60, 67, 68, . . . , 74} | [V] = 64, e.g. V = {0, 2, . . . , 126} or {0, 1, . . . , 63} |

In another embodiment, if NR-SSS carries part of or the whole cell ID hypotheses as well as timing information (e.g. SS block timing index or part of the SS block timing index), then the combination of u and v may be large enough to cover the number of cell ID hypotheses together with timing hypotheses (e.g. $N_{SSS} \cdot N_b \leq |U| \cdot |V|$, where |U| and |V| mean the size of sets U and V correspondingly, and $N_b$ is the number of timing hypotheses carried by NR-SSS). The mapping of $N_{ID}^{(1)}$ ($0 \leq N_{ID}^{(1)} \leq N_{SSS}-1$) and $I_b$ ($0 \leq I_b N_b-1$) to u and v is according to u=U($\lfloor (N_{ID}^{(1)} \cdot N_b+I_b)/|V| \rfloor$+1) and v=V($((N_{ID}^{(1)} \cdot N_b+I_b) \bmod |V|)$+1), or u=U($\lfloor (N_{ID}^{(1)}+I_b \cdot N_{SSS})/|V| \rfloor$+1) and v=V($((N_{ID}^{(1)} \cdot N_b+I_b \cdot N_{SSS}) \bmod |V|)$+1), or v=V($\lfloor (N_{ID}^{(1)} \cdot N_b+I_b)/|U| \rfloor$+1) and u=U($((N_{ID}^{(1)} \cdot N_b+I_b) \bmod |U|)$+1), or v=V($\lfloor (N_{ID}^{(1)}+I_b \cdot N_{SSS})/|U| \rfloor$+1) and u=U($((N_{ID}^{(1)}+I_b \cdot N_{SSS}) \bmod |U|)$+1) where the set U can be a subset of {0, 1, . . . , 126} when $L_{SSS}=127$ considering the sequences' maximum cross-correlation within the set, and set V can be a subset of {0, 1, . . . , 126}. For $N_{SSS}=1000$ (or approximately 1000), and for different value of $N_b$, the following combination of U and V in TABLE 14 can be used for $L_{SSS}=127$.

TABLE 14

| Combination of U and V | | |
|---|---|---|
| $N_b$ | U | V |
| 2 | [U] = 16, e.g. U = {53, 54, . . . , 60, 67, 68, . . . , 74} | [V] = 127, e.g. V ={0, 1, . . . , 126} |
| 2 | [U] = 32, e.g. U = {48, 49, . . . , 78, 79} | [V] = 64, e.g. V = {0, 2, . . . , 126} or {0, 1, . . . , 63} |
| 4 | [U] = 32, e.g. U = {48, 49, . . . , 78, 79} | [V] = 127, e.g. V = {0, 1, . . . , 126} |
| 4 | [U] = 64, e.g. U = {32, 33, . . . , 94, 95} | [V] = 64, e.g. V = {0, 2, . . . , 126} or {0, 1, . . . , 63} |
| 8 | [U] = 64, e.g. U = {32, 33, . . . , 94, 95} | [V] = 127, e.g. V = {0, 1, . . . , 126} |
| 8 | [U] = 127, e.g. U = {0, 1, . . . , 126} | [V] = 64, e.g. V = {0, 2, . . . , 126} or {0, 1, . . . , 63} |
| 16 | [U] = 127, e.g. U = {0, 1, . . . , 126} | [V] = 127, e.g. V = {0, 1, . . . , 126} |

The sequence $d_{SSS}(n)$ is mapped to the resource elements according to $$a_{k,l} = d_{SSS}(n), n = 0, \ldots, L_{SSS} - 2,$$

$$k = n - \frac{L_{SSS} - 1}{2} + \frac{N_{RB}N_{SC}}{2} \text{ and}$$

$$a_{k,l} = 0, n = -\frac{144 - L_{SSS} + 1}{2}, \ldots, -1,$$

$$L_{SSS} - 1, \ldots, \frac{144 + L_{SSS} + 1}{2} - 2, k = n - \frac{L_{SSS} - 1}{2} + \frac{N_{RB}N_{SC}}{2}$$

where $N_{RB}$ is number of total RBs for transmission, and $N_{SC}$ is the number of subcarriers within a RB (e.g. $N_{SC}=12$). 1 corresponds to the OFDM symbol index where NR-SSS is transmitted.

In one embodiment of Option 3, M-sequences with cyclic shifts, for the design of one-port based NR-SSS sequence for 144 REs using frequency-domain BPSK modulated length-127 M-sequences with cyclic shifts, where the cyclic shifts are determined by the combination of cell ID hypotheses carried by NR-SSS, or the combination of cell ID hypotheses carried by NR-PSS and NR-SSS.

In one embodiment, defining the NR-SSS is according to $$d_{SSS}(n) = \begin{cases} 2 * d_M^{(u,v)}(n) - 1, n = 0, 1, \ldots, 62 \\ 2 * d_M^{(u,v)}(n+1) - 1, n = 63, \ldots, 125 \end{cases}$$

where $d_M^{(u,v)}(n)$ is a length-127 M-sequence with number index u and cyclic shift value v$\in$V, according to $d_M^{(u,v)}$ $(n)=d_M^{(u)}((n+v) \bmod 127)$ and $d_M^{(u)}$ is the No.u ($1 \le u \le 18$) sequence defined in TABLE 4.

In one embodiment, if NR-SSS only carries part of or the whole cell ID hypotheses, then the combination of u and v may be large enough to cover the number of cell ID hypotheses in NR-SSS (e.g. $N_{SSS} \le |U| \cdot |V|$, where $|U|$ and $|V|$ mean the size of sets U and V correspondingly). The mapping of $N_{ID}^{(1)}$ ($0 \le N_{ID}^{(1)} \le N_{SSS}-1$) to u and v is according to $u=U(\lfloor N_{ID}^{(1)}/|V| \rfloor +1)$ and $v=V((N_{ID}^{(1)} \bmod |V|)+1)$, or $$v = V\left(\left\lfloor \frac{N_{ID}^{(1)}}{|U|} \right\rfloor + 1\right) \text{ and } u = U((N_{ID}^{(1)} \bmod |U|) + 1)$$

where the set U can be a subset of $\{1, \ldots, 18\}$ considering the sequences' maximum cross-correlation within the set, and set V can be a subset of $\{0, 1, \ldots, 126\}$. For $N_{SSS}=1000$ (or approximately 1000), the following combination of U and V in TABLE 15 can be used.

TABLE 15

Combination of U and V

| U | V |
|---|---|
| [U] = 8, e.g. U = {1, 2, 3, 4, 5, 6, 7, 8} | [V] = 127, e.g. V = {0, 1, . . . , 126} |
| [U] = 18, e.g. U = {1, 2, . . . , 17, 18} | [V] = 64, e.g. V = {0, 2, . . . , 126} or {0, 1, . . . , 63} |

In one embodiment, if NR-SSS carries part of cell ID hypotheses, and for $$N_{SSS} = \frac{1000}{N_{PSS}} \left(\text{or approximately} \frac{1000}{N_{PSS}}\right),$$

where $N_{PSS}$ is the number of NR-PSS sequences), the following combination of U and V in TABLE 16 can be used, where the mapping of $N_{ID}^{(1)}$ ($0 \le N_{ID}^{(1)} \le N_{SSS}-1$) to u and v is according to $$u = U\left(\left\lfloor \frac{N_{ID}^{(1)}}{|V|} \right\rfloor + 1\right) \text{ and } v = V((N_{ID}^{(1)} \bmod |V|) + 1), \text{ or}$$

$$v = V\left(\left\lfloor \frac{N_{ID}^{(1)}}{|U|} \right\rfloor + 1\right) \text{ and } u = U((N_{ID}^{(1)} \bmod |U|) + 1).$$

In this case, a scrambling sequence can be applied to represent the cell ID in NR-PSS, where the scrambling sequence is also a M-sequence with length 127. For example, $$d_{SSS}(n) = \begin{cases} c(n) * (2 * d_M^{(u,v)}(n) - 1), n = 0, 1, \ldots, 62 \\ c(n+1) * (2 * d_M^{(u,v)}(n+1) - 1), n = 63, \ldots, 125 \end{cases}$$

and $c(n)=\tilde{c}((n+C \cdot N_{ID}^{(2)}) \bmod 127)$ and $d_M^{(u,v)}(n)=d_M^{(u)}((n+v) \bmod 127)$ where $N_{ID}^{(2)}$ is cell ID in NR-PSS and $\tilde{c}(n)$ can be constructed based one of the M-sequence specified in TABLE 4 (must be different from the ones generating $d_M^{(u,v)}$) according to $\tilde{c}(n)=1-2*d_M(n)$, and C is a positive integer, e.g. C=1 (shifts are 0, 1, 2 in case of $N_{PSS}=3$) or C=43 (shifts are 0, 43, 86 in case of $N_{PSS}=3$).

TABLE 16

Combination of U and V

| U | V |
|---|---|
| $|U| = \lceil 1000/(N_{PSS} * 127) \rceil$, e.g. U = $\{1,2, \ldots, \lceil 1000/(N_{PSS} * 127) \rceil\}$ or other set such that correlation is minimized | $|V| = 127$, e.g. V = {0,1, . . . ,126} |
| $|U| = 2 * \lceil 1000/(N_{PSS} * 127) \rceil$, e.g. U = $\{1,2, \ldots, 2 * \lceil 1000/(N_{PSS} * 127) \rceil\}$ or other set such that correlation is minimized | $|V| = 64$, e.g. V = {0,2, . . . ,126} or {0,1, . . . ,63} |

In the case of $N_{PSS}=3$, $|U|=3$ and $|V|=127$, 3 M-sequences (each with 127 shifts) are scrambled by another M-sequence to generate the SSS sequences. In one sub-embodiment, the scrambling sequence $c(n)$ can be the same as NR-PSS sequences (if NR-PSS is constructed by shifts of one M-sequence, e.g. using No. 3 M-sequence in TABLE 4), and the 3 M-sequences are chosen such that the cross-correlation among NR-SSS sequences and cross-correlation between NR-PSS and NR-SSS are minimized. For example, U={1, 9, 14}.

In one embodiment, if NR-SSS carries part of cell ID hypotheses, and for $$N_{SSS} = \frac{1000}{N_{PSS}} \left(\text{or approximately} \frac{1000}{N_{PSS}}\right),$$

where $N_{PSS}$ is the number of NR-PSS sequences), the construction of NR-SSS is given in frequency domain by a product of two BPSK modulated M-sequences with cyclic shifts, where the cyclic shifts are determined by the combination of cell ID hypotheses carried by both NR-PSS and NR-SSS. For example, $$d_{SSS}(n) = \begin{cases} (2 * d_M^{(u1,v1)}(n) - 1) * (2 * d_M^{(u2,v2)}(n) - 1), n = 0, 1, \ldots, 62 \\ (2 * d_M^{(u2,v2)}(n+1) - 1) * (2 * d_M^{(u2,v2)}(n+1) - 1), n = 63, \ldots, 125 \end{cases}$$

if the DC subcarrier is truncated, and $d_{SSS}(n)=(2*d_M^{(u1,v1)}(n)-1)*(2*d_M^{(u2,v2)}(n)-1)$, n=0, 1, . . . , 126 if the DC subcarrier is not truncated, and $d_M^{(u1,v1)}(n)=d_M^{(u1)}((n+v1) \bmod 127)$ and $d_M^{(u2,v2)}(n)=d_M^{(u2)}((n+v2) \bmod 127)$ where the cyclic shifts v1, v2 are based on the cell ID $N_{ID}^{(2)}$ (cell ID in NR-PSS) and $N_{ID}^{(1)}$ (cell ID in NR-SSS). For example, choosing one of the M-sequence generator index u1=3 (corresponding M-sequence specified in TABLE 4, and initial condition after TABLE 4), choosing the other M-sequence generator index u2=2 (corresponding M-sequence specified in TABLE 4, and initial condition after TABLE 4), and v1∈V1={0, 15, 30, 45, 60, 75, 90, 105, 120} or V1={0, 1, 2, 3, 4, 5, 6, 7, 8}, and v2∈V2={0, 1, . . . , 126}, and v2=V2($(N_{ID}^{(1)} \bmod 127)+1$) and $$v1 = V1\left(\left\lfloor \frac{N_{ID}^{(1)}}{127} \right\rfloor \cdot 3 + 1\right).$$

In another embodiment, if NR-SSS carries part of or the whole cell ID hypotheses as well as timing information (e.g. SS block timing index or part of the SS block timing index), then the combination of u and v may be large enough to cover the number of cell ID hypotheses together with timing hypotheses (e.g. $N_{SSS} \cdot N_b \le |U| \cdot |V|$, where $|U|$ and $|V|$ mean the size of sets U and V correspondingly, and $N_b$ is the number of timing hypotheses carried by NR-SSS). The mapping of $N_{ID}^{(1)}$ ($0 \leq N_{ID}^{(1)} \leq N_{SSS}-1$) and $I_b$ ($0 \leq I_b \leq N_b-1$) to u and v is according to $u=U(\lfloor(N_{ID}^{(1)} \cdot N_b+I_b)/|V|\rfloor+1)$ and $v=V(((N_{ID}^{(1)} \cdot N_b+I_b) \bmod |V|)+1)$, or $u=U(\lfloor(N_{ID}^{(1)}+I_b \cdot N_{SSS})/|V|\rfloor+1)$ and $v=V(((N_{ID}^{(1)} \cdot N_b+I_b \cdot N_{SSS}) \bmod |V|)+1)$, or $v=V(\lfloor N_{ID}^{(1)} \cdot N_b+I_b)/|U|\rfloor+1)$ and $u=U(((N_{ID}^{(1)} \cdot N_b+I_b) \bmod |U|)+1)$, or $v=V(\lfloor(N_{ID}^{(1)}+I_b \, N_{SSS})/|U|\rfloor+1)$ and $u=U(((N_{ID}^{(1)}+I_b \cdot N_{SSS}) \bmod |U|)+1)$ where the set U can be a subset of $\{1, \ldots, 18\}$ considering the sequences' maximum cross-correlation within the set, and set V can be a subset of $\{0, 1, \ldots, 126\}$. For $N_{SSS}=1000$ (or approximately 1000), and for different value of $N_b$, the following combination of U and V in TABLE 17 can be used.

TABLE 17

Combination of U and V

| $N_b$ | U | V |
|---|---|---|
| 2 | \|U\| = 18, e.g. U = {1,2, . . . ,17,18} | \|V\| = 127, e.g. V = {0,1, . . . , 126} |

In another embodiment, if NR-SSS carries part of cell ID hypotheses as well as timing information (e.g. first or second 5 ms within a radio frame, and/or SS block timing index or part of the SS block timing index), and for $N_{SSS}=N_b \cdot 1000/N_{PSS}$ (or approximately $N_b \cdot 1000/N_{PSS}$, where $N_{PSS}$ is the number of NR-PSS sequences and $N_b$ is the number of timing hypotheses), the construction of NR-SSS is given by a product of two M-sequence with shift. For example, $$d_{SSS}(n) = \begin{cases} (2 * d_M^{(u1,v1)}(n) - 1) * (2 * d_M^{(u2,v2)}(n) - 1), n = 0, 1, \ldots, 62 \\ (2 * d_M^{(u2,v2)}(n+1) - 1) * (2 * d_M^{(u2,v2)}(n+1) - 1), n = 63, \ldots, 125 \end{cases}$$

and $d_M^{(u1,v1)}(n)=d_M^{(u1)}((n+v1) \bmod 127)$ and $d_M^{(u2,v2)}(n)=d_M^{(u2)}((n+v2) \bmod 127)$ where u1, u2, v1, v2 are based on the cell ID $N_{ID}^{(2)}$ (cell ID in NR-PSS) and $N_{ID}^{(1)}$ (cell ID in NR-SSS) and $N_b$. For example, u1=3 (corresponding M-sequence specified in TABLE 4), u2=2 (corresponding M-sequence specified in TABLE 4), and $v1 \in V1=\{(0, \lfloor 127/9/N_b \rfloor), \ldots, \lfloor 127/9/N_b \rfloor \cdot (9 \cdot N_b-1)\}$ or $V1=\{0, 1, \ldots 9*N_b-1\}$, and $v2 \in V2=\{0, 1, \ldots, 126\}$, and $v2=V2((N_{ID}^{(1)} \bmod 127)+1)$ and $$v1 = V1\left(\left\lfloor \frac{N_{ID}^{(1)}}{127} \right\rfloor \cdot 3 + N_{ID}^{(2)} + I_b \cdot 9 + 1\right)$$

where $I_b$ is the timing index ($0 \leq I_b \leq N_b-1$).

The sequence $d_{SSS}(n)$ is mapped to the central resource elements of the symbol for NR-SSS transmission according to $$a_{k,l} = d_{SSS}(n), n = 0, \ldots, 125, k = n - 63 + \frac{N_{RB}N_{SC}}{2} \text{ and}$$

$$a_{k,l} = 0, n = -9, \ldots, -1, L_{SSS} - 1, \ldots, 134, k = n - 63 + \frac{N_{RB}N_{SC}}{2}$$

if the DC subcarrier is truncated, and according to $$a_{k,l} = d_{PSS}(n), n = 0, \ldots, 126, k = n - 63 + \frac{N_{RB}N_{SC}}{2} \text{ and}$$

-continued $$a_{k,l} = 0, n = -9, \ldots, -1, 127, \ldots, 134,$$

$$k = n - 63 + \frac{N_{RB}N_{SC}}{2} \text{ or } a_{k,l} = d_{PSS}(n+1),$$

$$n = -1, \ldots, 125, k = n - 63 + \frac{N_{RB}N_{SC}}{2} a \text{ and}$$

$$a_{k,l} = 0, n = -9, \ldots, -2, 126, \ldots, 134, k = n - 63 + \frac{N_{RB}N_{SC}}{2}$$

if the DC subcarrier is not truncated, where $N_{RB}$ is number of total RBs for NR-SSS transmission (e.g. $N_{RB}=12$), and $N_{SC}$ is the number of subcarriers within a RB (e.g. $N_{SC}=12$). l corresponds to the OFDM symbol index where NR-SSS is transmitted. Note that in one sub-embodiment, no matter DC subcarrier is truncated or not, NR-PSS and NR-SSS are mapped to the same subcarriers in frequency domain, if their sequence lengths are the same.

In some embodiments of component IX, NR-PSS and NR-SSS mapping for different subcarrier spacing, NR-PSS and NR-SSS are mapped the same way regardless of the subcarrier spacing value. In another embodiment, the mapping method for NR-PSS and NR-SSS can be different, dependent on the subcarrier spacing value. One applicable scenario is, if two subcarrier spacing values are supported for a given carrier frequency range, e.g. X kHz and Y kHz, the sequence of NR-PSS and NR-SSS can be the same, but mapping the sequence to subcarriers can be different corresponding to each subcarrier spacing. For a particular example, if X=2*Y, which means one of the subcarrier spacing supported is twice of the other one, the mapping of NR-PSS and NR-SSS sequence to the subcarriers can be as follow: for subcarrier spacing X, NR-PSS and NR-SSS are mapped to the central 12 PRB (144 RE sequence design), while for subcarrier spacing Y, NR-PSS and NR-SSS are mapped to the whole 24 PRB (288 RE sequence design) but with a interleaved/comb pattern (e.g. mapped to the odd or even subcarrier indices only).

In this way, UE does not need to blindly decode the subcarrier spacing utilized by the NW, and can assume the default and single subcarrier spacing of X kHz (e.g. always assuming the larger subcarrier spacing) when performing the synchronization process. The actual utilized subcarrier spacing from the NW can be indicated to UE in the synchronization signals (e.g. indicated by NR-PSS sequence, or by NR-SSS sequence, or NR-SSS mapping pattern) or by other signal/channel (e.g. DMRS sequence or mapping pattern for NR-PBCH, or in NR-PBCH payload (in this case, UE needs to blindly decode the PBCH using two subcarrier spacing first)).

Figure 28:
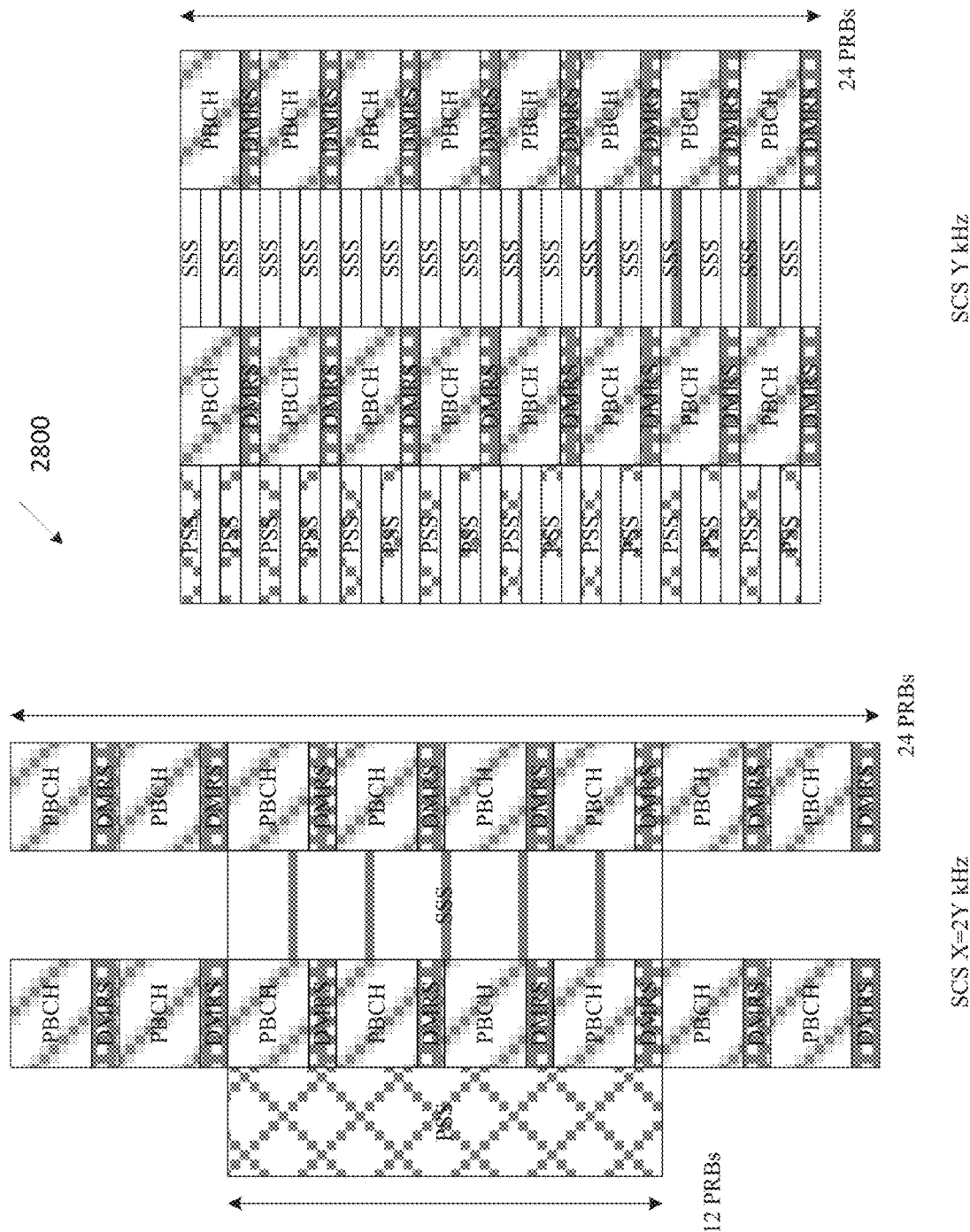
FIG. 28 illustrates an example mapping pattern according to embodiments of the present disclosure.

FIG. 28 illustrates an example mapping pattern 2800 according to embodiments of the present disclosure. The embodiment of the mapping pattern 2800 illustrated in FIG. 28 is for illustration only. FIG. 28 does not limit the scope of this disclosure to any particular implementation of the mapping pattern 2800. An illustration of the mapping pattern depending on subcarrier spacing is shown in FIG. 28.

In one sub-embodiment, NR-PSS and NR-SSS are mapped to the same subcarriers for subcarrier spacing Y. In another sub-embodiment, NR-PSS and NR-SSS are mapped to different subcarriers (e.g. one on even subcarriers and the other on odd subcarriers). In one example, for carrier frequency range 0 to 6 GHz, X=30 kHz, and Y=15 kHz. In another example, for carrier frequency range 6 to 52.6 GHz, X=240 kHz, and Y=120 kHz.

In the present disclosure, numerology refers to a set of signal parameters which can include subframe duration, sub-carrier spacing, cyclic prefix length, transmission bandwidth, or any combination of these signal parameters.

The present disclosure relates generally to wireless communication systems and, more specifically, to the design modulation scheme for NR secondary synchronization signals (NR-SSS).

For LTE system, primary and secondary synchronization signals (PSS and SSS, respectively) are used for coarse timing and frequency synchronization and cell ID acquisition. Since PSS/SSS is transmitted twice per 10 ms radio frame and time-domain enumeration is introduced in terms of System Frame Number (SFN, included in the MIB), frame timing is detected from PSS/SSS to avoid the need for increasing the detection burden from PBCH. In addition, cyclic prefix (CP) length and, if unknown, duplexing scheme can be detected from PSS/SSS. The PSS is constructed from a frequency-domain ZC sequence of length 63, with the middle element truncated to avoid using the d.c. subcarrier. Three roots are selected for PSS to represent the three physical layer identities within each group of cells. The SSS sequences are based on the maximum length sequences (also known as M-sequences). Each SSS sequence is constructed by interleaving two length-31 BPSK modulated sequences in frequency domain, where the two source sequences before modulation are different cyclic shifts of the same M-sequence. The cyclic shift indices are constructed from the physical cell ID group.

Since PSS/SSS detection can be faulty (due to, for instance, non-idealities in the auto- and cross-correlation properties of PSS/SSS and lack of CRC protection), cell ID hypotheses detected from PSS/SSS may occasionally be confirmed via PBCH detection. PBCH is primarily used to signal the Master Block Information (MIB) which includes DL and UL system bandwidth information (3 bits), PHICH information (3 bits), and SFN (8 bits). Adding 10 reserved bits (for other uses such as MTC), the MIB payload amounts to 24 bits. After appended with a 16-bit CRC, a rate-1/3 tail-biting convolutional coding, 4× repetition, and QPSK modulation are applied to the 40-bit codeword. The resulting QPSK symbol stream is transmitted across 4 subframes spread over 4 radio frames. Other than detecting MIB, blind detection of the number of CRS ports is also needed for PBCH.

For NR, the transmission bandwidth containing synchronization signals is expected to be larger than LTE system, such that a new design of NR synchronization signals, aiming for robustness against initial frequency offset and auto-correlation profile, is possible.

For NR, one construction method for NR-SSS can be message-based. For example, all information carried by NR-SSS is presented by one or more messages, and then potentially protected with CRC(s), encoded by channel coding codes, rate matched, modulated, precoded if multiple transmit ports are utilized, and mapped to resource elements. One general flowchart illustrating the data processing steps for message-based NR-SSS construction is shown in FIG. 17. Note that modules or part of the functionalities within the modules in this flow chart can be set as default values such that they do not have any impact. The focus of this disclosure is on the modulation module (highlight 1708 in FIG. 17), where the input to this module is a sequence of binary bits, denoted as $e_0^{(i)}, \ldots, e_{E(i)-1}^{(i)}$ (1707 in FIG. 17), where the range of index i is the codeword index output from the previous channel coding module (1706 in FIG. 17) (for example, i=1, 2 for 2 codewords case, and i=1 for single codeword case). The output from modulation module is a sequence of complex-valued modulated symbols, denoted as $d^{(i)}(0), \ldots, d^{(i)}(M(i)-1)$, where M(i) is the number of modulated symbols. For example, if the number of bits within in each modulated symbol is m(i) for codeword i, then M(i)=E(i)/m(i).

In some embodiments of component X, phase shift keying (PSK) modulation for NR-SSS, phase shift keying (PSK) schemes use modulation signals with different phases to represent different sets of bits. Several options of PSK for NR-SSS modulation are considered here, which take one or more binary bits in the input bit stream, denoted by $b_0, b_1, \ldots, b_{m(i)-1}$ (m(i) is number of bits mapped to one modulated symbol for codeword i, and $b_0, b_1, \ldots, b_{m(i)-1}$ are segment of the long sequence $e_0^{(i)}, \ldots, e_{E(i)-1}^{(i)}$ (1707 in FIG. 17)), to output a complex-valued modulation symbol s=I+Qj or a sequence of symbols, where I (inphase component) and Q (quadrature component) are real numbers. Then the modulation signal is transmitted at the carrier frequency $f_c$, i.e., with basis function $$\Theta(t) = \sqrt{\frac{2}{T_s}} \cos(2\pi f_c t),$$

where $T_s$ is the symbol duration of subcarriers.

The following options can be utilized for NR-SSS, where NR-SSS is message-based constructed. Note that the modulation schemes utilized for different codewords within NR-SSS can be the same or different. In one embodiment of option 1 of component X, binary phase shift keying (BPSK). In case of BPSK modulation, a single bit $b_0$ is mapped to the symbol s=I+Qj. An example of BPSK is illustrated in TABLE 18.

TABLE 18

An example of BPSK

| $b_0$ | I | Q |
|---|---|---|
| 0 | $1/\sqrt{2}$ | $1/\sqrt{2}$ |
| 1 | $-1/\sqrt{2}$ | $-1/\sqrt{2}$ |

In another embodiment of option 2 of component X, quadrature phase shift keying (QPSK). In case of QPSK modulation, a pair of two bits $b_0, b_1$ are mapped to the symbol s=I+Qj. An example of QPSK is illustrated in TABLE 19.

TABLE 19

An example of QPSK

| $b_0 b_1$ | I | Q |
|---|---|---|
| 00 | 1 | 0 |
| 01 | −1 | 0 |
| 10 | 0 | 1 |
| 11 | 0 | −1 |

TABLE 20

Another example of QPSK

| $b_0 b_1$ | I | Q |
|---|---|---|
| 00 | $1/\sqrt{2}$ | $1/\sqrt{2}$ |
| 01 | $1/\sqrt{2}$ | $-1/\sqrt{2}$ |

TABLE 20-continued

Another example of QPSK

| $b_0b_1$ | I | Q |
|---|---|---|
| 10 | $-1/\sqrt{2}$ | $1/\sqrt{2}$ |
| 11 | $-1/\sqrt{2}$ | $-1/\sqrt{2}$ |

In one embodiment of option 3 of component X, M-array phase shift keying (MPSK). In case of MPSK modulation, a group of $\log_2 M$ bits are mapped to the M-array symbol sequence $$s = \exp\left(j\left(\frac{2\pi}{M}k + \phi_0\right)\right) = \cos\left(\frac{2\pi}{M}k + \phi_0\right) + j\sin\left(\frac{2\pi}{M}k + \phi_0\right),$$

k=1, 2, . . . , M, where $\phi_0$ is an arbitrary constant phase. Note that Option 1 and 2 can be considered as special cases of MPSK. For the example of BPSK mapping as TABLE 18 in Option 1, $$M = 2, \phi_0 = -\frac{3\pi}{4},$$

and k=1, 2 corresponds to $b_0$=0, 1. For the example of QPSK mapping as TABLE 19 in Option 2, M=4, $$\phi_0 = -\frac{\pi}{2},$$

and k=1, 2, 3, 4 corresponds to $b_0b_1$=00, 10, 01, 11. For the example of QPSK mapping as TABLE 20 in Option 2, $$M = 4, \phi_0 = -\frac{\pi}{4},$$

and k=1, 2, 3, 4 corresponds to $b_0b_1$=00, 10, 11, 01. For one example of 8PSK mapping, M=8, $\phi_0$=0, and k=1, 2, . . . , 8 corresponds to $b_0b_1b_2$=000, 001, 011, 010, 011, 100, 101, 110, 111.

In one embodiment of option 4 of component X, differential phase shift keying (DPSK). DPSK is an example of PSK that facilitates the use of non-coherent demodulation, which does not require the knowledge of the actual carrier phase. This is done by differentially encoding the transmitted bits. The differential encoding includes changing the phase of the current transmit signal in accordance with the input bits $b_0, b_1, \ldots, b_{m(i)-1}$, relative to the phase of the previous transmit signal rather than to the carrier phase.

In one example is Differential BPSK (DBPSK), where the initial symbol is denoted as $x(0)=\exp(j\theta)$, and for the $i^{th}$ input bit $b_i$, where i ranges from 1 to the length of the bit stream: if $b_i$=1, then phase of the current signal is shifted by $\pi$, i.e., $x(i)=x(i-1)\cdot\exp(j\pi)-x(i-1)$; if $b_i$=0, then the current signal remains the same, i.e., $x(i)=x(i-1)$. In one case, $\theta$=0. In another case, $\theta=\pi/4$.

In another example is differential QPSK (DQPSK), where the initial symbol is denoted as $x(0)=\exp(j\theta)$, and for the $i^{th}$ pair of input bits $b_{2i-1}b_{2i}$, where i ranges from 1 to half of the length of the bit stream (0 can be appended if the length is odd): if $b_{2i-1}b_{2i}$=01, then phase of the current signal is shifted by $\pi/2$, i.e., $x(i)=x(i-1)\cdot\exp(j\pi/2)$; if $b_{2i-1}b_{2i}$=11, then phase of the current signal is shifted by $\pi$, i.e., $x(i)=x(i-1)\cdot\exp(j\pi)$; if $b_{2i-1}b_{2i}$=10, then phase of the current signal is shifted by $2\pi/3$, i.e., $x(i)=x(i-1)\cdot\exp(j2\pi/3)$; if $b_{2i-1}b_{2i}$=00, then the current signal remains the same, i.e., $x(i)=x(i-1)$. In one case, $\theta$=0. In another case, $\theta=\pi/4$.

In one embodiment of option 5 of component X, quadrature Amplitude Modulation (QAM). QAM can be considered as an extension of PSK. In the same way as in PSK the signal in QAM can be represented as a combination of in-phase (I) and quadrature (Q) components, but the constellation points are distributed over the entire region of the constellation diagram rather than along a circle like in PSK. In one example of QAM is 16QAM modulation, where quadruplets of bits, $b_0b_1b_2b_3$, are mapped to the symbol s=I+jQ according to TABLE 21.

TABLE 21

An example of QAM

| $b_0b_1b_2b_3$ | I | Q |
|---|---|---|
| 0000 | $1/\sqrt{10}$ | $1/\sqrt{10}$ |
| 0001 | $1/\sqrt{10}$ | $3/\sqrt{10}$ |
| 0010 | $3/\sqrt{10}$ | $1/\sqrt{10}$ |
| 0011 | $3/\sqrt{10}$ | $3/\sqrt{10}$ |
| 0100 | $1/\sqrt{10}$ | $-1/\sqrt{10}$ |
| 0101 | $1/\sqrt{10}$ | $-3/\sqrt{10}$ |
| 0110 | $3/\sqrt{10}$ | $-1/\sqrt{10}$ |
| 0111 | $3/\sqrt{10}$ | $-3/\sqrt{10}$ |
| 1000 | $-1/\sqrt{10}$ | $1/\sqrt{10}$ |
| 1001 | $-1/\sqrt{10}$ | $3/\sqrt{10}$ |
| 1010 | $-3/\sqrt{10}$ | $1/\sqrt{10}$ |
| 1011 | $-3/\sqrt{10}$ | $3/\sqrt{10}$ |
| 1100 | $-1/\sqrt{10}$ | $-1/\sqrt{10}$ |
| 1101 | $-1/\sqrt{10}$ | $-3/\sqrt{10}$ |
| 1110 | $-3/\sqrt{10}$ | $-1/\sqrt{10}$ |
| 1111 | $-3/\sqrt{10}$ | $-3/\sqrt{10}$ |

In another example of QAM is 64QAM modulation, where hextuplets of bits, $b_0b_1b_2b_3b_4b_5$, are mapped to the symbol s=I+jQ according to TABLE 22.

TABLE 22

Another example of QAM

| $b_0b_1b_2b_3b_4b_5$ | I | Q |
|---|---|---|
| 000000 | $3/\sqrt{42}$ | $3/\sqrt{42}$ |
| 000001 | $3/\sqrt{42}$ | $1/\sqrt{42}$ |
| 000010 | $1/\sqrt{42}$ | $3/\sqrt{42}$ |
| 000011 | $1/\sqrt{42}$ | $1/\sqrt{42}$ |
| 000100 | $3/\sqrt{42}$ | $5/\sqrt{42}$ |
| 000101 | $3/\sqrt{42}$ | $7/\sqrt{42}$ |
| 000110 | $1/\sqrt{42}$ | $5/\sqrt{42}$ |
| 000111 | $1/\sqrt{42}$ | $7/\sqrt{42}$ |
| 001000 | $5/\sqrt{42}$ | $3/\sqrt{42}$ |
| 001001 | $5/\sqrt{42}$ | $1/\sqrt{42}$ |
| 001010 | $7/\sqrt{42}$ | $3/\sqrt{42}$ |
| 001011 | $7/\sqrt{42}$ | $1/\sqrt{42}$ |
| 001100 | $5/\sqrt{42}$ | $5/\sqrt{42}$ |
| 001101 | $5/\sqrt{42}$ | $7/\sqrt{42}$ |
| 001110 | $7/\sqrt{42}$ | $5/\sqrt{42}$ |
| 001111 | $7/\sqrt{42}$ | $7/\sqrt{42}$ |
| 010000 | $3/\sqrt{42}$ | $-3/\sqrt{42}$ |
| 010001 | $3/\sqrt{42}$ | $-1/\sqrt{42}$ |
| 010010 | $1/\sqrt{42}$ | $-3/\sqrt{42}$ |
| 010011 | $1/\sqrt{42}$ | $-1/\sqrt{42}$ |
| 010100 | $3/\sqrt{42}$ | $-5/\sqrt{42}$ |
| 010101 | $3/\sqrt{42}$ | $-7/\sqrt{42}$ |
| 010110 | $1/\sqrt{42}$ | $-5/\sqrt{42}$ |
| 010111 | $1/\sqrt{42}$ | $-7/\sqrt{42}$ |
| 011000 | $5/\sqrt{42}$ | $-3/\sqrt{42}$ |
| 011001 | $5/\sqrt{42}$ | $-1/\sqrt{42}$ |

TABLE 22-continued

Another example of QAM

| $b_0b_1b_2b_3b_4b_5$ | I | Q |
|---|---|---|
| 011010 | $7/\sqrt{42}$ | $-3/\sqrt{42}$ |
| 011011 | $7/\sqrt{42}$ | $-1/\sqrt{42}$ |
| 011100 | $5/\sqrt{42}$ | $-5/\sqrt{42}$ |
| 011101 | $5/\sqrt{42}$ | $-7/\sqrt{42}$ |
| 011110 | $7/\sqrt{42}$ | $-5/\sqrt{42}$ |
| 011111 | $7/\sqrt{42}$ | $-7/\sqrt{42}$ |
| 100000 | $-3/\sqrt{42}$ | $3/\sqrt{42}$ |
| 100001 | $-3/\sqrt{42}$ | $1/\sqrt{42}$ |
| 100010 | $-1/\sqrt{42}$ | $3/\sqrt{42}$ |
| 100011 | $-1/\sqrt{42}$ | $1/\sqrt{42}$ |
| 100100 | $-3/\sqrt{42}$ | $5/\sqrt{42}$ |
| 100101 | $-3/\sqrt{42}$ | $7/\sqrt{42}$ |
| 100110 | $-1/\sqrt{42}$ | $5/\sqrt{42}$ |
| 100111 | $-1/\sqrt{42}$ | $7/\sqrt{42}$ |
| 101000 | $-5/\sqrt{42}$ | $3/\sqrt{42}$ |
| 101001 | $-5/\sqrt{42}$ | $1/\sqrt{42}$ |
| 101010 | $-7/\sqrt{42}$ | $3/\sqrt{42}$ |
| 101011 | $-7/\sqrt{42}$ | $1/\sqrt{42}$ |
| 101100 | $-5/\sqrt{42}$ | $5/\sqrt{42}$ |
| 101101 | $-5/\sqrt{42}$ | $7/\sqrt{42}$ |
| 101110 | $-7/\sqrt{42}$ | $5/\sqrt{42}$ |
| 101111 | $-7/\sqrt{42}$ | $7/\sqrt{42}$ |
| 110000 | $-3/\sqrt{42}$ | $-3/\sqrt{42}$ |
| 110001 | $-3/\sqrt{42}$ | $-1/\sqrt{42}$ |
| 110010 | $-1/\sqrt{42}$ | $-3/\sqrt{42}$ |
| 110011 | $-1/\sqrt{42}$ | $-1/\sqrt{42}$ |
| 110100 | $-3/\sqrt{42}$ | $-5/\sqrt{42}$ |
| 110101 | $-3/\sqrt{42}$ | $-7/\sqrt{42}$ |
| 110110 | $-1/\sqrt{42}$ | $-5/\sqrt{42}$ |
| 110111 | $-1/\sqrt{42}$ | $-7/\sqrt{42}$ |
| 111000 | $-5/\sqrt{42}$ | $-3/\sqrt{42}$ |
| 111001 | $-5/\sqrt{42}$ | $-1/\sqrt{42}$ |
| 111010 | $-7/\sqrt{42}$ | $-3/\sqrt{42}$ |
| 111011 | $-7/\sqrt{42}$ | $-1/\sqrt{42}$ |
| 111100 | $-5/\sqrt{42}$ | $-5/\sqrt{42}$ |
| 111101 | $-5/\sqrt{42}$ | $-7/\sqrt{42}$ |
| 111110 | $-7/\sqrt{42}$ | $-5/\sqrt{42}$ |
| 111111 | $-7/\sqrt{42}$ | $-7/\sqrt{42}$ |

In some embodiments of component XI, frequency shift keying (FSK) modulation for NR-SSS, frequency shift keying (FSK) schemes use modulation signals with different frequencies to represent different sets of bits. Several options of FSK for NR-SSS modulation are considered here, which take one or more binary bits in the input bit stream, denoted by $b_0, b_1, \ldots, b_{m(i)-1}$ (m(i) is number of bits mapped to one modulated symbol for codeword i, and $b_0, b_1, \ldots, b_{m(i)-1}$ are segment of the long sequence $e_0^{(i)}, \ldots, e_{E(i)-1}^{(i)}$ (1707 in FIG. 17)), to output a complex-valued modulation symbol $s = \cos \Phi_k + j \sin \Phi_k$, where $\Phi_k$'s are initial phases for different symbols ($k = 1, 2, \ldots, 2^{m(i)}$). Note that the initial phase of modulated symbols corresponding to different binary sequence can be either the same or different. Then modulated symbols are transmitted using different carrier frequency. For example, for $k = 1, 2, \ldots, 2^{m(i)}$, the symbol $s = \cos \Phi_k + j \sin \Phi_k$ is transmitted on using frequency $f_{c,k}$ (with basis functions $$\Theta_k(t) = \sqrt{\frac{2}{T_s}} \cos(2\pi f_{c,k} t)).$$

In one embodiment, to facilitate coherent detection, the initial phase of modulated symbols corresponding to different binary sequence can be the same ($\Phi_1 = \ldots = \Phi_{2^{m(i)}}$), and the modulated carrier frequency $f_{c,k}$ is an integer multiple of $\frac{1}{4}T_s$, and frequency spacing $f_{c,k_1} - f_{c,k_2}$ of any pair of modulated carrier frequencies $f_{c,k_1}$ and $f_{c,k_2}$ ($k_1, k_2 \in \{1, 2, \ldots, 2^{m(i)}\}$) is an integer multiple of $\frac{1}{2}T_s$, where $T_s$ is the symbol duration of subcarriers.

The following options can be utilized for NR-SSS, where NR-SSS is message-based constructed. Note that the modulation schemes utilized for different codewords within NR-SSS can be the same or different.

In one embodiment of component XI, coherent binary FSK (BFSK). Several examples of coherent BFSK modulation schemes are presented as follows. In one example for carrier frequency $f_c$ with $f_s$ subcarrier spacing is, $$\Phi_1 = \Phi_2 = 0, f_{c,1} = f_c - \left(\frac{1}{12} + \frac{1}{4}N_1\right)f_s, f_{c,2} = f_c + \left(\frac{5}{12} + \frac{1}{4}N_2\right)f_s,$$

and $N_1, N_2$ are integers such that $f_{c,1} \neq f_{c,2}$. Then a single bit $b_0$ is mapped to the two-dimensional signal space denoted as $(\Theta_1, \Theta_2)$ (see TABLE 23), of basis functions $$\Phi_1(t) = \sqrt{\frac{2}{T_s}} \cos(2\pi f_{c,1} t) \text{ and } \Theta_2(t) = \sqrt{\frac{2}{T_s}} \cos(2\pi f_{c,2} t).$$

In one case, $N_1 = 0, N_2 = 0$. In another case, $N_1 = 1, N_2 = 0$. In still another case, $N_1 = 1, N_2 = 1$. In still another case, $N_1 = 0, N_2 = 1$.

TABLE 23

A single bit $b_0$

| $b_0$ | Vector representation in $(\Theta_1, \Theta_2)$ |
|---|---|
| 0 | [1 0] |
| 1 | [0 1] |

In another example for carrier frequency $f_c$ with $f_s$ subcarrier spacing is, $$\Phi_1 = \Phi_2 = \pi/4,$$

$$f_{c,1} = f_c - \left(\frac{1}{12} + \frac{1}{4}N_1\right)f_s, f_{c,2} = f_c + \left(\frac{5}{12} + \frac{1}{4}N_2\right)f_s,$$

and $N_1, N_2$ are integers such that $f_{c,1} \neq f_{c,2}$. Then a single bit $b_0$ is mapped to the two-dimensional signal space denoted as $(\Theta_1, \Theta_2)$ (see TABLE 24, of basis functions $$\Theta_1(t) = \sqrt{\frac{2}{T_s}} \cos(2\pi f_{c,k} t) \text{ and } \Theta_2(t) = \sqrt{\frac{2}{T_s}} \cos(2\pi f_{c,2} t).$$

In one case, $N_1 = 0, N_2 = 0$. In another case, $N_1 = 1, N_2 = 0$. In still another case, $N_1 = 1, N_2 = 1$. In still another case, $N_1 = 0, N_2 = 1$.

TABLE 24

A single bit $b_0$

| $b_0$ | Vector representation in $(\Theta_1, \Theta_2)$ |
|---|---|
| 0 | [$1/\sqrt{2}$  $1/\sqrt{2}$] |
| 1 | [$-1/\sqrt{2}$  $1/\sqrt{2}$] |

In one embodiment of option 2 of component XI, coherent quadrature FSK (QFSK). Several examples of coherent QFSK modulation schemes are presented as follows. In one example for carrier frequency $f_c$ with $f_s$ subcarrier spacing is, $$\Phi_1 = \ldots = \Phi_4 = 0, f_{c,1} = f_c - \left(\frac{7}{12} + \frac{1}{4}N_1\right)f_s,$$

$$f_{c,2} = f_c - \left(\frac{1}{12} + \frac{1}{4}N_2\right)f_s, f_{c,3} = f_c + \left(\frac{5}{12} + \frac{1}{4}N_3\right)f_s,$$

$$f_{c,4} = f_c + \left(\frac{11}{12} + \frac{1}{4}N_4\right)f_s,$$

and $N_1$, $N_2$, $N_3$, $N_4$ are integers such that $f_{c,1}$, $f_{c,2}$, $f_{c,3}$, $f_{c,4}$ are different, and both $N_2-N_1$ and $N_4-N_3$ are even. Then a single bit $b_0$ is mapped to the four-dimensional signal space denoted as $(\Theta_1, \Theta_2, \Theta_3, \Theta_4)$ (see TABLE 25), of basis functions $$\Theta_1(t) = \sqrt{\frac{2}{T_s}}\cos(2\pi f_{c,1}t), \Theta_2(t) = \sqrt{\frac{2}{T_s}}\cos(2\pi f_{c,2}t),$$

$$\Theta_3(t) = \sqrt{\frac{2}{T_s}}\cos(2\pi f_{c,3}t), \text{ and } \Theta_4(t) = \sqrt{\frac{2}{T_s}}\cos(2\pi f_{c,4}t).$$

In one case, $N_1=0$, $N_2=0$, $N_3=0$, $N_4=0$. In another case, $N_1=2$, $N_2=0$, $N_3=0$, $N_4=2$. In still another case, $N_1=3$, $N_2=1$, $N_3=1$, $N_4=3$.

TABLE 25

A single bit $b_0$

| $b_0 b_1$ | Vector representation in $(\Theta_1, \Theta_2, \Theta_3, \Theta_4)$ |
|---|---|
| 00 | [1 0 0 0] |
| 01 | [0 1 0 0] |
| 10 | [0 0 1 0] |
| 11 | [0 0 0 1] |

In another embodiment, to facilitate non-coherent detection, the initial phase of modulated symbols corresponding to different binary sequence can be different ($\Phi_k$ are not the same) and the modulated carrier frequency $f_{c,k}$ is an integer multiple of $\frac{1}{2}T_s$, and frequency spacing $f_{c,k_1} - f_{c,k_2}$ of any pair of modulated carrier frequencies $f_{c,k_1}$ and $f_{c,k_2}$ ($k_1, k_2 \in \{1, 2, \ldots, m(i)\}$) is an integer multiple of $1/T_s$, where $T_s$ is the symbol duration of subcarriers.

The following options can be utilized for NR-SSS, where NR-SSS is message-based constructed. Note that the modulation schemes utilized for different codewords within NR-SSS can be the same or different.

In one embodiment of option 1, non-coherent Binary FSK (BFSK). Several examples of non-coherent BFSK modulation schemes are presented as follows. In one example for carrier frequency $f_c$ with $f_s$ subcarrier spacing is, $$\Phi_1 = 0, \Phi_2 = \pi,$$

$$f_{c,1} = f_c - \left(\frac{1}{3} + \frac{1}{2}N_1\right)f_s, f_{c,2} = f_c + \left(\frac{2}{3} + \frac{1}{2}N_2\right)f_s,$$

and $N_1$, $N_2$ are integers such that $f_{c,1} \neq f_{c,2}$. Then a single bit $b_0$ is mapped to the two-dimensional signal space denoted as $(\Theta_1, \Theta_2)$ (see TABLE 26), of basis functions $$\Theta_1(t) = \sqrt{\frac{2}{T_s}}\cos(2\pi f_{c,1}t) \text{ and } \Theta_2(t) = \sqrt{\frac{2}{T_s}}\cos(2\pi f_{c,2}t).$$

In one case, $N_1=0$, $N_2=0$. In another case, $N_1=1$, $N_2=0$. In still another case, $N_1=1$, $N_2=1$. In still another case, $N_1=0$, $N_2=1$.

TABLE 26

A single bit $b_0$

| $b_0$ | Vector representation in $(\Theta_1, \Theta_2)$ |
|---|---|
| 0 | [1 0] |
| 1 | [−1 0] |

In another example for carrier frequency $f_c$ with $f_s$ subcarrier spacing is, $$\Phi_1 = \pi/4,$$

$$\Phi_2 = 5\pi/4, f_{c,1} = f_c - \left(\frac{1}{3} + \frac{1}{2}N_1\right)f_s, f_{c,2} = f_c + \left(\frac{2}{3} + \frac{1}{2}N_2\right)f_s,$$

and $N_1$, $N_2$ are integers such that $f_{c,1} \neq f_{c,2}$. Then a single bit $b_0$ is mapped to the two-dimensional signal space denoted as $(\Theta_1, \Theta_2)$ (see TABLE 27), of basis functions $$\Theta_1(t) = \sqrt{\frac{2}{T_s}}\cos(2\pi f_{c,1}t) \text{ and } \Theta_2(t) = \sqrt{\frac{2}{T_s}}\cos(2\pi f_{c,2}t).$$

In one case, $N_1=0$, $N_2=0$. In another case, $N_1=1$, $N_2=0$. In still another case, $N_1=1$, $N_2=1$. In still another case, $N_1=0$, $N_2=1$.

TABLE 27

A single bit $b_0$

| $b_0$ | Vector representation in $(\Theta_1, \Theta_2)$ |
|---|---|
| 0 | [1/√2  1/√2] |
| 1 | [−1/√2  −1/√2] |

In one embodiment of option 2, non-coherent quadrature FSK (QFSK). Several examples of non-coherent QFSK modulation schemes are presented as follows. In one example for carrier frequency $f_c$ with $f_s$ subcarrier spacing is, $$\Phi_1 = \Phi_2 = 0, \Phi_3 = \Phi_4 = \pi, f_{c,1} = f_c - \left(\frac{4}{3} + \frac{1}{2}N_1\right)f_s,$$

$$f_{c,2} = f_c - \left(\frac{1}{3} + \frac{1}{2}N_2\right)f_s, f_{c,3} = f_c + \left(\frac{2}{3} + \frac{1}{2}N_3\right)f_s,$$

$$f_{c,4} = f_c + \left(\frac{5}{3} + \frac{1}{2}N_4\right)f_s,$$

and $N_1$, $N_2$, $N_3$, $N_4$ are integers such that $f_{c,1}$, $f_{c,2}$, $f_{c,3}$, $f_{c,4}$ are different, and both $N_2-N_1$ and $N_4-N_3$ are even. Then a single bit $b_0$ is mapped to the the four-dimensional signal space denoted as $(\Theta_1, \Theta_2, \Theta_3, \Theta_4)$ (see TABLE 28), of basis functions $$\Theta_1(t) = \sqrt{\frac{2}{T_s}} \cos(2\pi f_{c,1} t), \Theta_2(t) = \sqrt{\frac{2}{T_s}} \cos(2\pi f_{c,2} t),$$

$$\Theta_3(t) = \sqrt{\frac{2}{T_s}} \cos(2\pi f_{c,3} t), \text{ and } \Theta_4(t) = \sqrt{\frac{2}{T_s}} \cos(2\pi f_{c,4} t).$$

In one case, $N_1=0$, $N_2=0$, $N_3=0$, $N_4=0$. In another case, $N_1=2$, $N_2=0$, $N_3=0$, $N_4=2$. In still another case, $N_1=3$, $N_2=1$, $N_3=1$, $N_4=3$.

TABLE 28

| $b_0 b_1$ | Vector representation in $(\Theta_1, \Theta_2, \Theta_3, \Theta_4)$ |
|---|---|
| 00 | [1 0 0 0] |
| 01 | [0 1 0 0] |
| 10 | [0 0 −1 0] |
| 11 | [0 0 0 −1] |

In another example for carrier frequency $f_c$ with $f_s$ subcarrier spacing is, $$\Phi_1 = \Phi_2 = \pi/4, \Phi_3 = \Phi_4 = 5\pi/4, f_{c,1} = f_c - \left(\frac{4}{3} + \frac{1}{2}N_1\right)f_s,$$

$$f_{c,2} = f_c - \left(\frac{1}{3} + \frac{1}{2}N_2\right)f_s, f_{c,3} = f_c + \left(\frac{2}{3} + \frac{1}{2}N_3\right)f_s,$$

$$f_{c,4} = f_c + \left(\frac{5}{3} + \frac{1}{2}N_4\right)f_s,$$

and $N_1$, $N_2$, $N_3$, $N_4$ are integers such that $f_{c,1}$, $f_{c,2}$, $f_{c,3}$, $f_{c,4}$ are different, and both $N_2-N_1$ and $N_4-N_3$ are even. Then a single bit $b_0$ is mapped to the four-dimensional signal space denoted as $(\Theta_1, \Theta_2, \Theta_3, \Theta_4)$ (see TABLE 29), of basis functions $$\Theta_1(t) = \sqrt{\frac{2}{T_s}} \cos(2\pi f_{c,1} t), \Theta_2(t) = \sqrt{\frac{2}{T_s}} \cos(2\pi f_{c,2} t),$$

$$\Theta_3(t) = \sqrt{\frac{2}{T_s}} \cos(2\pi f_{c,3} t), \text{ and } \Theta_4(t) = \sqrt{\frac{2}{T_s}} \cos(2\pi f_{c,4} t).$$

In one case, $N_1=0$, $N_2=0$, $N_3=0$, $N_4=0$. In another case, $N_1=2$, $N_2=0$, $N_3=0$, $N_4=2$. In still another case, $N_1=3$, $N_2=1$, $N_3=1$, $N_4=3$.

TABLE 29

| $b_0 b_1$ | Vector representation in $(\Theta_1, \Theta_2, \Theta_3, \Theta_4)$ |
|---|---|
| 00 | [1/√2, 1/√2 0 0] |
| 01 | [0 1/√2 1/√2 0] |
| 10 | [0 0 −1/√2 −1/√2] |
| 11 | [1/√2 0 0 −1/√2] |

In some embodiments of component XII, amplitude shift keying (ASK) modulation for NR-SSS, amplitude shift keying (ASK) schemes use modulation signals with different amplitudes to represent different sets of bits. Several options of ASK for NR-SSS modulation are considered here, which take one or more binary bits in the input bit stream, denoted by $b_0, b_1, \ldots, b_{m(i)-1}$ (m(i) is number of bits mapped to one modulated symbol for codeword i, and $b_0, b_1, \ldots, b_{m(i)-1}$ are segment of the long sequence $e_0^{(i)}, \ldots, e_{E(i)-1}^{(i)}$ (1707 in FIG. 17)), to output a complex-valued modulation symbol s=I+jQ, where I (inphase component) and Q (quadrature component) are real numbers.

The following options can be utilized for NR-SSS, where NR-SSS is message-based constructed. Note that the modulation schemes utilized for different codewords within NR-SSS can be the same or different.

In one embodiment of option 1, on-off keying (OOK). In case of OOK modulation, a single bit $b_0$ is mapped to the symbol s=I+jQ according to TABLE 30. This is a version of non-coherent ASK.

TABLE 30

A single bit $b_0$

| $b_0$ | I | Q |
|---|---|---|
| 0 | 0 | 0 |
| 1 | √2 | 0 |

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A base station for identifying a synchronization signal (SS) in a communication system, the base station comprising:
   a transceiver; and
   a controller coupled with the transceiver and configured to:
   identify a primary synchronization signal (PSS) within one SS block based on one subcarrier spacing, wherein the PSS is identified based on second information for a physical layer cell identifier (id), and
   identify a secondary synchronization signal (SSS) within the one SS block based on the one subcarrier spacing, wherein the SSS is identified based on first information for the physical layer cell id and the second information for the physical layer cell id,
   wherein the PSS is located on central 127 subcarriers in a first orthogonal frequency division multiplexing (OFDM) symbol within resource blocks for the one SS block, and the SSS is located on the central 127 subcarriers in a second OFDM symbol within resource blocks for the one SS block, and
   wherein the subcarrier spacing is associated with a frequency range, and a length of the PSS and a length of the SSS are 127 for each of frequency ranges.

2. The base station of claim 1, wherein a first of the frequency ranges is below 6 GHz, and a second of the frequency ranges is above 6 GHz.

3. The base station of claim 2, wherein the first of the frequency ranges is associated with at least 15 KHz subcarrier spacing, and the second of the frequency ranges is associated with at least 120 KHz subcarrier spacing.

4. The base station of claim 2, wherein a bandwidth for the one SS block is proportional to a size of a subcarrier spacing.

5. The base station of claim 2, wherein the central 127 subcarriers are contiguous subcarriers.

6. A method of a base station for identifying a synchronization signal (SS) in a communication system, the method comprising:
  identifying a primary synchronization signal (PSS) within one SS block based on one subcarrier spacing, wherein the PSS is identified based on second information for a physical layer cell identifier (id); and
  identifying a secondary synchronization signal (SSS) within the one SS block based on the one subcarrier spacing, wherein the SSS is identified based on first information for the physical layer cell id and the second information for the physical layer cell id,
  wherein the PSS is located on central 127 subcarriers in a first orthogonal frequency division multiplexing (OFDM) symbol within resource blocks for the one SS block, and the SSS is located on the central 127 subcarriers in a second OFDM symbol within resource blocks for the one SS block, and
  wherein the subcarrier spacing is associated with a frequency range, and a length of the PSS and a length of the SSS are 127 for each of frequency ranges.

7. The method of claim 6, wherein a first of the frequency ranges is below 6 GHz, and a second of the frequency ranges is above 6 GHz.

8. The method of claim 7, wherein the first of the frequency ranges is associated with at least 15 KHz subcarrier spacing, and the second of the frequency ranges is associated with at least 120 KHz subcarrier spacing.

9. The method of claim 7, wherein a bandwidth for the one SS block is proportional to a size of a subcarrier spacing.

10. The method of claim 7, wherein the central 127 subcarriers are contiguous subcarriers.

11. A terminal for identifying a synchronization signal (SS) in a communication system, the terminal comprising:
  a transceiver; and
  a controller coupled with the transceiver and configured to:
    identify a primary synchronization signal (PSS) within one SS block based on one subcarrier spacing, wherein the PSS is identified based on second information for a physical layer cell identifier (id), and
    identify a secondary synchronization signal (SSS) within the one SS block based on the one subcarrier spacing, wherein the SSS is identified based on first information for the physical layer cell id and the second information for the physical layer cell id,
  wherein the PSS is located on central 127 subcarriers in a first orthogonal frequency division multiplexing (OFDM) symbol within resource blocks for the one SS block, and the SSS is located on the central 127 subcarriers in a second OFDM symbol within resource blocks for the one SS block, and
  wherein the subcarrier spacing is associated with a frequency range, and a length of the PSS and a length of the SSS are 127 for each of frequency ranges.

12. The terminal of claim 11, wherein a first of the frequency ranges is below 6 GHz, and a second of the frequency ranges is above 6 GHz.

13. The terminal of claim 12, wherein the first of the frequency ranges is associated with at least 15 KHz subcarrier spacing, and the second of the frequency ranges is associated with at least 120 KHz subcarrier spacing.

14. The terminal of claim 12, wherein a bandwidth for the one SS block is proportional to a size of a subcarrier spacing.

15. The terminal of claim 12, wherein the central 127 subcarriers are contiguous subcarriers.

16. A method of a user equipment for identifying a synchronization signal (SS) in a communication system, the method comprising:
  identifying a primary synchronization signal (PSS) within one SS block based on one subcarrier spacing, wherein the PSS is identified based on second information for a physical layer cell identifier (id); and
  identifying a secondary synchronization signal (SSS) within the one SS block based on the one subcarrier spacing, wherein the SSS is identified based on first information for the physical layer cell id and the second information for the physical layer cell id,
  wherein the PSS is located on central 127 subcarriers in a first orthogonal frequency division multiplexing (OFDM) symbol within resource blocks for the one SS block, and the SSS is located on the central 127 subcarriers in a second OFDM symbol within resource blocks for the one SS block, and
  wherein the subcarrier spacing is associated with a frequency range, and a length of the PSS and a length of the SSS are 127 for each of frequency ranges.

17. The method of claim 16, wherein a first of the frequency ranges is below 6 GHz, and a second of the frequency ranges is above 6 GHz.

18. The method of claim 17, wherein the first of the frequency ranges is associated with at least 15 KHz subcarrier spacing, and the second of the frequency range is associated with at least 120 KHz subcarrier spacing.

19. The method of claim 17, wherein a bandwidth for the one SS block is proportional to a size of a subcarrier spacing.

20. The method of claim 17, wherein the central 127 subcarriers are contiguous subcarriers.

* * * * *